US012659260B2

(12) United States Patent

Ma et al.

(10) Patent No.: US 12,659,260 B2

(45) Date of Patent: Jun. 16, 2026

(54) MESSAGE RECEIVING AND SENDING METHOD, INFORMATION OBTAINING, RECEIVING, AND SENDING METHOD, AND RELATED DEVICE

(71) Applicant: Huawei Technologies Co., Ltd., Shenzhen (CN)

(72) Inventors: Xiaoming Ma, Nanjing (CN); Zhifeng He, Shenzhen (CN); Shuxiang Wang, Beijing (CN)

(73) Assignee: Huawei Technologies Co., Ltd., Shenzen (CN)

( * ) Notice: Subject to any disclaimer, the term of this patent is extended or adjusted under 35 U.S.C. 154(b) by 18 days.

(21) Appl. No.: 18/599,817

(22) Filed: Mar. 8, 2024

(65) Prior Publication Data

US 2024/0214299 A1 Jun. 27, 2024

Related U.S. Application Data

(63) Continuation of application No. PCT/CN2022/117302, filed on Sep. 6, 2022.

(30) Foreign Application Priority Data

Sep. 11, 2021 (CN) .......................... 202111071422.4
Dec. 17, 2021 (CN) .......................... 202111555348.3

(51) Int. Cl.
*H04L 45/02* (2022.01)
*H04L 45/28* (2022.01)
*H04L 45/74* (2022.01)

(52) U.S. Cl.
CPC .............. *H04L 45/04* (2013.01); *H04L 45/28* (2013.01); *H04L 45/74* (2013.01)

(58) Field of Classification Search
CPC ..... H04W 76/25; H04W 76/20; H04W 36/12; H04L 67/145; H04L 41/0663; H04L 43/10; H04L 45/28
See application file for complete search history.

(56) References Cited

U.S. PATENT DOCUMENTS 9,860,188 B2 * 1/2018 Armstrong .............. H04L 47/78
10,356,184 B2 * 7/2019 Li ........................ H04L 41/0897
(Continued)

FOREIGN PATENT DOCUMENTS

| CN | 106685818 B | 7/2020 | |
| CN | 117221024 A | 12/2023 | |
| WO | WO-2020255686 A1 * | 12/2020 | ............. H04L 12/46 |

OTHER PUBLICATIONS

Jaya, Sanjeev Panem and Pant, Dhirendra, "Mechanism for Achieving Fast Failover of 5G User Plane Functions Deployed in an N:M Hot-Standby Mode", Oct. 28, 2020, Technical Disclosure Commons, (Oct. 28, 2020) https://www.tdcommons.org/dpubs_series/3704 (Year: 2020).*

(Continued)

*Primary Examiner* — Chirag R Patel

(74) *Attorney, Agent, or Firm* — Slater Matsil, LLP

(57) ABSTRACT

In accordance with an embodiment, a network device is configured to obtain keepalive information of a terminal device; receive a migration begin request message sent by a control plane network element; and in response to receiving the migration begin request message, after receiving a first keepalive request packet sent by the terminal device, send a first keepalive response packet for the first keepalive request packet to the terminal device based on the keepalive information.

20 Claims, 19 Drawing Sheets

(56) References Cited

U.S. PATENT DOCUMENTS

| | | | |
|---|---|---|---|
| 11,160,123 B2 * | 10/2021 | Huang-Fu | H04W 76/10 |
| 11,259,217 B2 * | 2/2022 | Lee | H04W 36/0011 |
| 11,412,412 B2 * | 8/2022 | Narath | H04W 76/12 |
| 12,108,350 B2 * | 10/2024 | Zhang | H04L 67/34 |
| 12,149,451 B2 * | 11/2024 | Varga | H04L 47/826 |
| 2018/0227699 A1 * | 8/2018 | Kim | H04W 48/16 |
| 2019/0036736 A1 * | 1/2019 | Gao | H04L 12/4633 |
| 2020/0137663 A1 * | 4/2020 | Albasheir | H04W 76/22 |
| 2021/0321469 A1 * | 10/2021 | Padebettu | H04W 76/12 |
| 2022/0021596 A1 * | 1/2022 | Li | H04W 24/08 |
| 2023/0353455 A1 * | 11/2023 | Zhu | H04L 41/0895 |

OTHER PUBLICATIONS

3rd Generation Partnership Project; Technical Specification Group Core Network and Terminals; Interface between the Control Plane and the User Plane Nodes; Stage 3 (Release 17), 3GPP TS 29.244 V17.1.0 (Jun. 2021), total 345 pages.
Broadband Forum, "TR-384 Cloud Central Office Reference Architectural Framework", Jan. 2018, total 80 pages.

* cited by examiner

BNG in which a forwarding function is
decoupled from a control function

| Bits | | | | | | | | |
|------|---|---|---|---|---|---|---|---|
| Octets | 8 | 7 | 6 | 5 | 4 | 3 | 2 | 1 |
| 1 to m | Message header | | | | | | | |
| m+1 to n | Zero or more information elements | | | | | | | |

| Bits | | | | | | | | |
|----------|---|---|---|---|---|---|---|---|
| Octets | 8 | 7 | 6 | 5 | 4 | 3 | 2 | 1 |
| 1 | Version number | | | Spare | Spare | FO | MP | S |
| 2 | Message type | | | | | | | |
| 3 | Message length (1st Octet) | | | | | | | |
| 4 | Message length (2nd Octet) | | | | | | | |
| m to k(m+7) | Field in which SEID is filled | | | | | | | |
| n to (n+2) | Sequence number | | | | | | | |
| (n+3) | Spare | | | | | | | |

| | Bits | | | | | | | |
|---|---|---|---|---|---|---|---|---|
| Octets | 8 | 7 | 6 | 5 | 4 | 3 | 2 | 1 |
| 1 | Version number | | | Spare | Spare | FO=0 | MP=0 | S=0 |
| 2 | Message type | | | | | | | |
| 3 | Message length (1st Octet) | | | | | | | |
| 4 | Message length (2nd Octet) | | | | | | | |
| 5 | Sequence number (1st Octet) | | | | | | | |
| 6 | Sequence number (2nd Octet) | | | | | | | |
| 7 | Sequence number (3rd Octet) | | | | | | | |
| 8 | Spare | | | | | | | |

FIG. 7

| | Bits | | | | | | | |
|---|---|---|---|---|---|---|---|---|
| Octet | 8 | 7 | 6 | 5 | 4 | 3 | 2 | 1 |
| 1 | Version number | | | Spare | Spare | FO | MP | S=1 |
| 2 | Message type | | | | | | | |
| 3 | Message length (1st Octet) | | | | | | | |
| 4 | Message length (2nd Octet) | | | | | | | |
| 5 | SEID (1st Octet) | | | | | | | |
| 6 | SEID (2nd Octet) | | | | | | | |
| 7 | SEID (3rd Octet) | | | | | | | |
| 8 | SEID (4th Octet) | | | | | | | |
| 9 | SEID (5th Octet) | | | | | | | |
| 10 | SEID (6th Octet) | | | | | | | |
| 11 | SEID (7th Octet) | | | | | | | |
| 12 | SEID (8th Octet) | | | | | | | |
| 13 | Sequence number (1st Octet) | | | | | | | |
| 14 | Sequence number (2nd Octet) | | | | | | | |
| 15 | Sequence number (3rd Octet) | | | | | | | |
| 16 | Message priority | | | | Spare | | | |

FIG. 8

| Octets | Bits | | | | | | | |
|---|---|---|---|---|---|---|---|---|
| | 8 | 7 | 6 | 5 | 4 | 3 | 2 | 1 |
| 1 to 2 | Type=xxx | | | | | | | |
| 3 to 4 | Length=n | | | | | | | |
| p to (p+1) | Enterprise identifier | | | | | | | |
| k to (n+4) | IE data part or sub-IE set | | | | | | | |

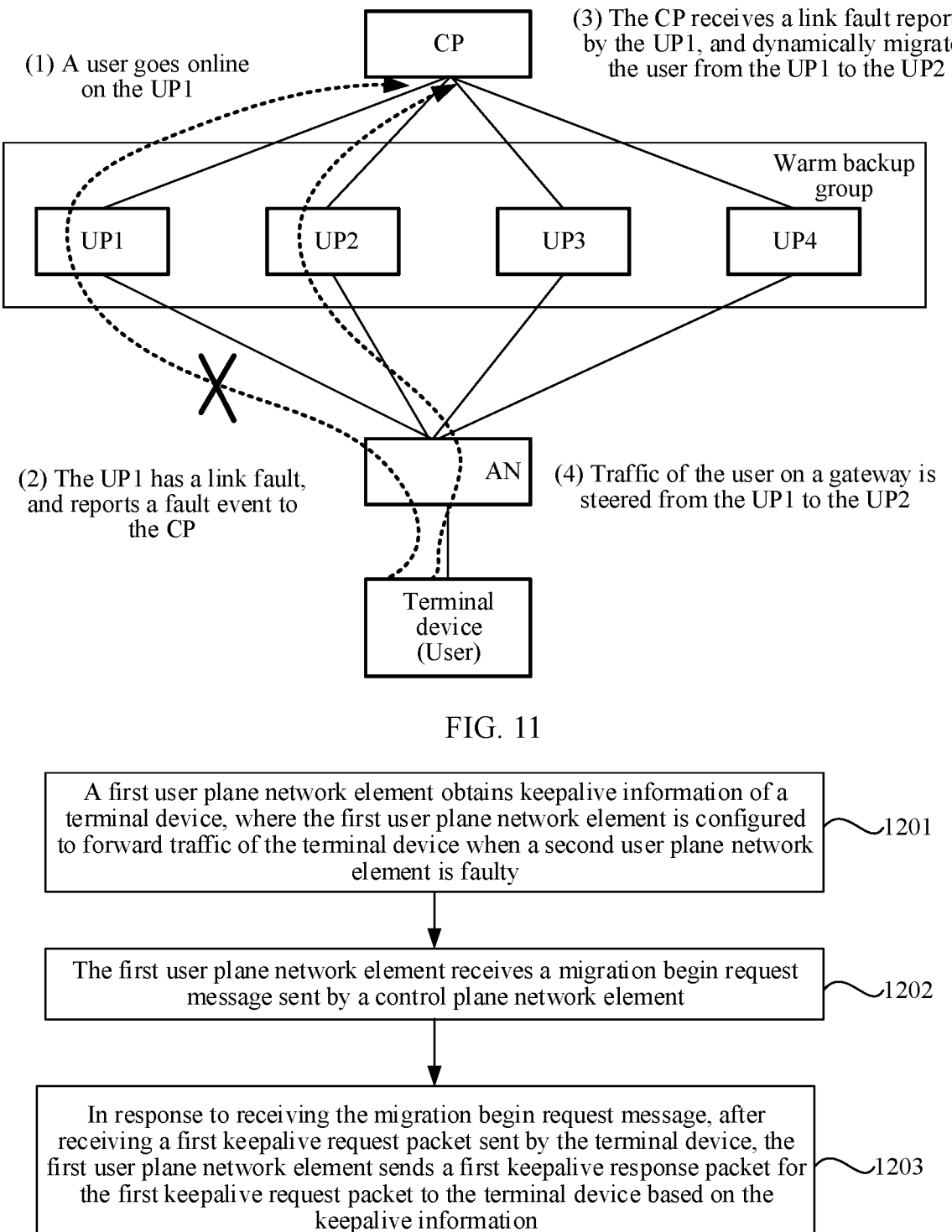

(1) A user goes online on the UP1

(3) The CP receives a link fault reported by the UP1, and dynamically migrates the user from the UP1 to the UP2

Warm backup group

CP

UP1     UP2     UP3     UP4

AN (2) The UP1 has a link fault, and reports a fault event to the CP (4) Traffic of the user on a gateway is steered from the UP1 to the UP2

Terminal device (User)

FIG. 11

A first user plane network element obtains keepalive information of a terminal device, where the first user plane network element is configured to forward traffic of the terminal device when a second user plane network element is faulty ⟶ 1201

The first user plane network element receives a migration begin request message sent by a control plane network element ⟶ 1202

In response to receiving the migration begin request message, after receiving a first keepalive request packet sent by the terminal device, the first user plane network element sends a first keepalive response packet for the first keepalive request packet to the terminal device based on the keepalive information ⟶ 1203

FIG. 12

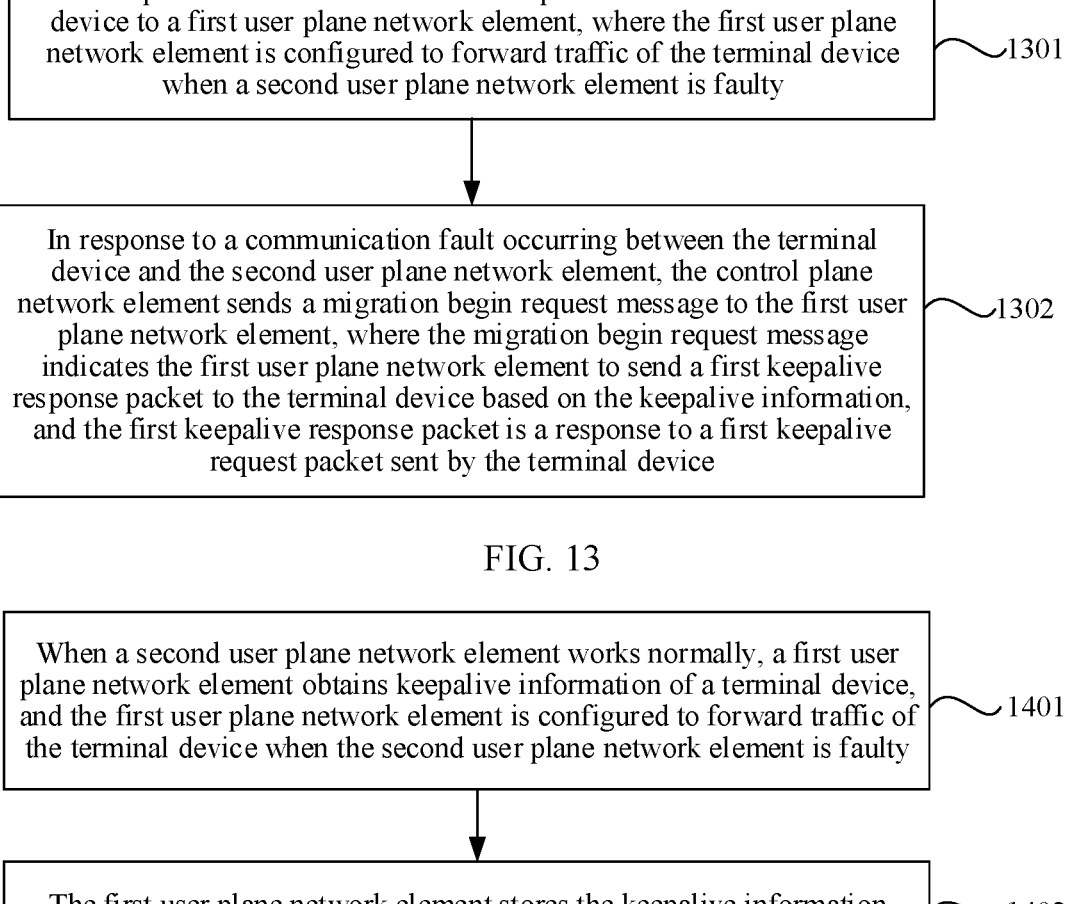

A control plane network element sends keepalive information of a terminal device to a first user plane network element, where the first user plane network element is configured to forward traffic of the terminal device when a second user plane network element is faulty ~1301

In response to a communication fault occurring between the terminal device and the second user plane network element, the control plane network element sends a migration begin request message to the first user plane network element, where the migration begin request message indicates the first user plane network element to send a first keepalive response packet to the terminal device based on the keepalive information, and the first keepalive response packet is a response to a first keepalive request packet sent by the terminal device ~1302

FIG. 13

When a second user plane network element works normally, a first user plane network element obtains keepalive information of a terminal device, and the first user plane network element is configured to forward traffic of the terminal device when the second user plane network element is faulty ~1401

The first user plane network element stores the keepalive information ~1402

FIG. 14

A control plane network element sends forwarding control entry information to a second user plane network element, where the forwarding control entry information is used by the second user plane network element to generate a first keepalive response packet, and the first keepalive response packet is a response to a first keepalive request packet sent by a terminal device     ~ 1501

When the second user plane network element works normally, the control plane network element sends keepalive information of the terminal device to a first user plane network element, where the keepalive information is used by the first user plane network element to generate a second keepalive response packet, the second keepalive response packet is a response to a second keepalive request packet sent by the terminal device, and the first user plane network element is configured to forward traffic of the terminal device when the second user plane network element is faulty     ~ 1502

FIG. 15

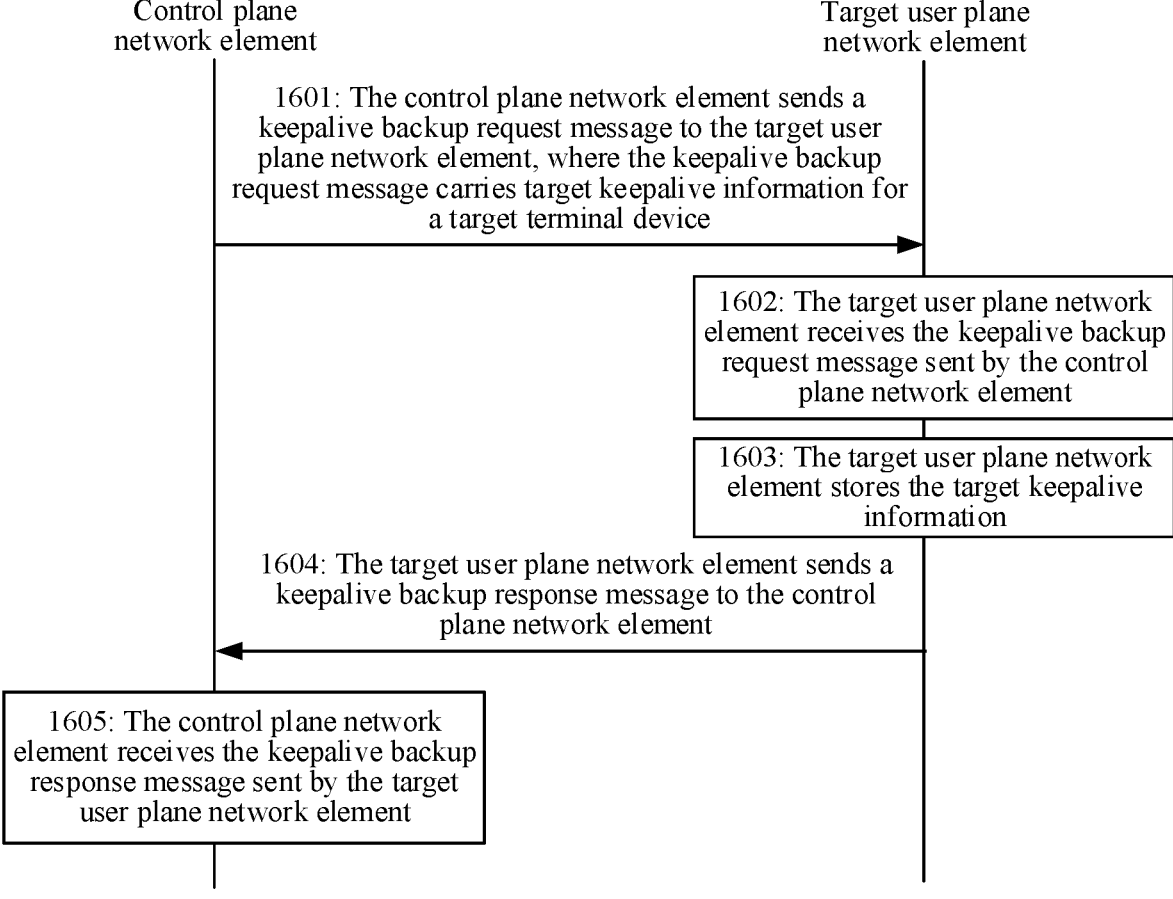

Control plane network element                                    Target user plane network element 1601: The control plane network element sends a keepalive backup request message to the target user plane network element, where the keepalive backup request message carries target keepalive information for a target terminal device 1602: The target user plane network element receives the keepalive backup request message sent by the control plane network element 1603: The target user plane network element stores the target keepalive information 1604: The target user plane network element sends a keepalive backup response message to the control plane network element 1605: The control plane network element receives the keepalive backup response message sent by the target user plane network element

FIG. 16

| Octets | Bits | | | | | | | |
|---|---|---|---|---|---|---|---|---|
| | 8 | 7 | 6 | 5 | 4 | 3 | 2 | 1 |
| 1 to 2 | Type=NN decimal | | | | | | | |
| 3 to 4 | Length=n | | | | | | | |
| 5 to 6 | Enterprise identifier (2100) | | | | | | | |
| 7 | Customer VLAN priority | | | | | | | |

FIG. 17

| Octets | Bits | | | | | | | |
|---|---|---|---|---|---|---|---|---|
| | 8 | 7 | 6 | 5 | 4 | 3 | 2 | 1 |
| 1 to 2 | Type=NN decimal | | | | | | | |
| 3 to 4 | Length=n | | | | | | | |
| 5 to 6 | Enterprise identifier (2100) | | | | | | | |
| 7 | Service VLAN priority | | | | | | | |

FIG. 18

| Octets | Bits | | | | | | | |
|---|---|---|---|---|---|---|---|---|
| | 8 | 7 | 6 | 5 | 4 | 3 | 2 | 1 |
| 1 to 2 | Type=NN decimal | | | | | | | |
| 3 to 4 | Length=n | | | | | | | |
| 5 to 6 | Enterprise identifier (2100) | | | | | | | |
| 7 to 10 | Warm backup group index | | | | | | | |

FIG. 19

| Octets | Bits | | | | | | | |
|---|---|---|---|---|---|---|---|---|
| | 8 | 7 | 6 | 5 | 4 | 3 | 2 | 1 |
| 1 to 2 | Type=XX (decimal) | | | | | | | |
| 3 to 4 | Length=n | | | | | | | |
| 5 to 6 | Enterprise identifier (2100) | | | | | | | |
| 7 | Spare | | | | | | V4 | V6 |
| m to (m+3) | IPv4 address | | | | | | | |
| p to (p+15) | IPv6 address | | | | | | | |

FIG. 20

| | | | | Bits | | | | |
|---|---|---|---|---|---|---|---|---|
| Octets | 8 | 7 | 6 | 5 | 4 | 3 | 2 | 1 |
| 1 to 2 | Type=NN decimal | | | | | | | |
| 3 to 4 | Length=n | | | | | | | |
| 5 to 6 | Enterprise identifier (2100) | | | | | | | |
| 7 | Slot identifier | | | | | | | |

FIG. 22

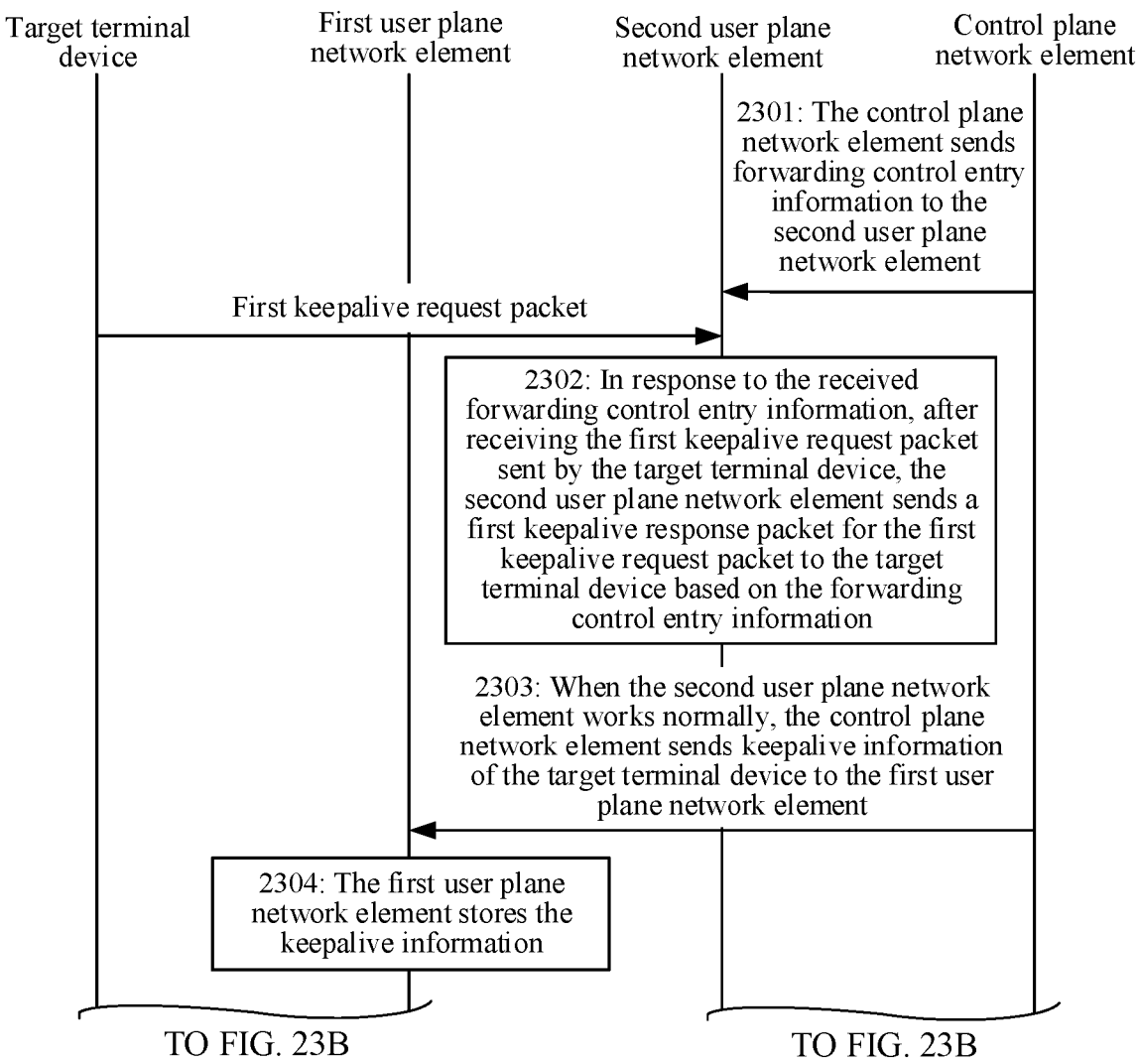

Target terminal device

First user plane network element

Second user plane network element

Control plane network element

2301: The control plane network element sends forwarding control entry information to the second user plane network element First keepalive request packet 2302: In response to the received forwarding control entry information, after receiving the first keepalive request packet sent by the target terminal device, the second user plane network element sends a first keepalive response packet for the first keepalive request packet to the target terminal device based on the forwarding control entry information 2303: When the second user plane network element works normally, the control plane network element sends keepalive information of the target terminal device to the first user plane network element 2304: The first user plane network element stores the keepalive information

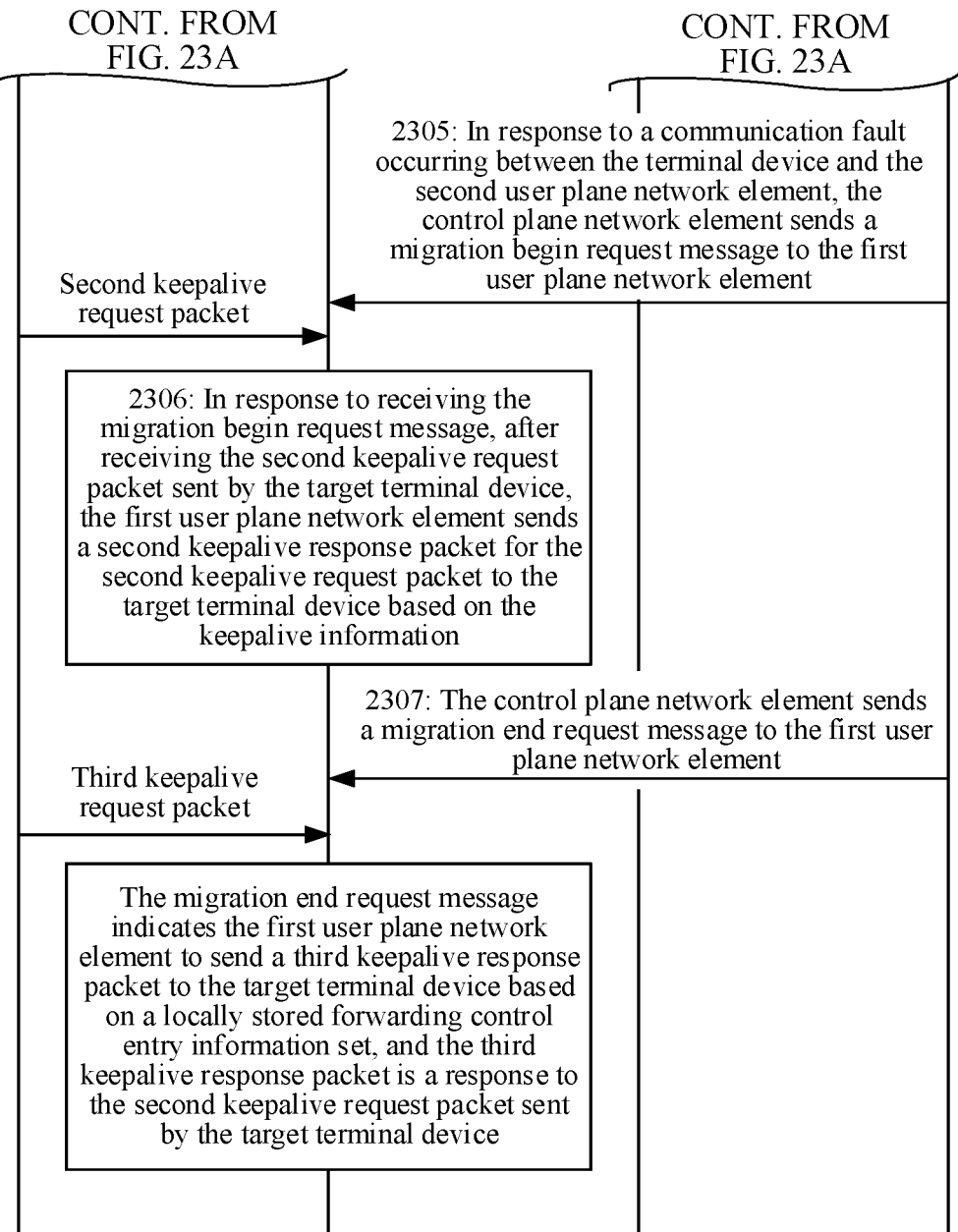

CONT. FROM
FIG. 23A

CONT. FROM
FIG. 23A

2305: In response to a communication fault occurring between the terminal device and the second user plane network element, the control plane network element sends a migration begin request message to the first user plane network element Second keepalive
request packet 2306: In response to receiving the migration begin request message, after receiving the second keepalive request packet sent by the target terminal device, the first user plane network element sends a second keepalive response packet for the second keepalive request packet to the target terminal device based on the keepalive information 2307: The control plane network element sends a migration end request message to the first user plane network element Third keepalive
request packet The migration end request message indicates the first user plane network element to send a third keepalive response packet to the target terminal device based on a locally stored forwarding control entry information set, and the third keepalive response packet is a response to the second keepalive request packet sent by the target terminal device

FIG. 23B

MESSAGE RECEIVING AND SENDING METHOD, INFORMATION OBTAINING, RECEIVING, AND SENDING METHOD, AND RELATED DEVICE

CROSS-REFERENCE TO RELATED APPLICATIONS

This application is a continuation of International Application No. PCT/CN2022/117302, filed on Sep. 6, 2022, which claims priority to Chinese Patent Application No. 202111071422.4, filed on Sep. 11, 2021, and Chinese Patent Application No. 202111555348.3, filed on Dec. 17, 2021. All of the aforementioned patent applications are hereby incorporated by reference in their entireties.

TECHNICAL FIELD

Embodiments of this application relate to the field of broadband network technologies, and in particular, to a message receiving and sending method, an information obtaining and sending method, and a related device.

BACKGROUND

Currently, a terminal device accesses a broadband network via a broadband network gateway (BNG). The BNG includes one control plane (CP) network element and a plurality of user plane (UP) network elements. The control plane network element is configured to manage the plurality of user plane network elements, and any user plane network element is configured to forward traffic of the terminal device. After the terminal device accesses a user plane network element of the BNG, to maintain a keepalive state between the user plane network element and the terminal device, a link fault and a peer end fault need to be detected.

For ease of subsequent description, the user plane network element currently accessed by the terminal device is referred to as a second user plane network element. During fault detection, the terminal device sends a keepalive request packet to the second user plane network element. The second user plane network element receives the keepalive request packet, and then queries local forwarding control entry information based on related information of the terminal device carried in the keepalive request packet. If forwarding control entry information corresponding to the terminal device can be found, the second user plane network element sends a keepalive response packet to the terminal device. Therefore, the terminal device subsequently determines whether a link between the terminal device and the second user plane network element or the second user plane network element is faulty.

In the foregoing technology, if communication between the terminal device and the second user plane network element is faulty, the terminal device is migrated from the second user plane network element to a first user plane network element, to access a network via the first user plane network element. In a migration process of the terminal device, the first user plane network element needs to obtain the forwarding control entry information corresponding to the terminal device. For example, the forwarding control entry information may be delivered by the control plane network element to the first user plane network element based on a fault of the second user plane network element. If there are a large quantity of terminal devices that are currently migrated to the first user plane network element, the first user plane network element needs to obtain a large amount of forwarding control entry information. In this scenario, when the first user plane network element has not obtained forwarding control entry information of a terminal device, the first user plane network element may have received a keepalive request packet sent by the terminal device. In this case, because the first user plane network element cannot locally find the forwarding control entry information of the terminal device, the first user plane network element cannot respond to the keepalive request packet of the terminal device. Consequently, a failure occurs in fault detection of the terminal device.

SUMMARY

Embodiments of this application provide a message receiving and sending method, an information obtaining, receiving, and sending method, and a related device, to resolve a problem that a terminal device goes offline because no response is received for keepalive detection in a migration process of the terminal device. Technical solutions are as follows.

According to a first aspect, a message receiving method is provided. The method is performed by a first user plane network element included in a BNG system. The BNG system further includes a second user plane network element and a control plane network element. The first user plane network element is configured to forward traffic of a terminal device when the second user plane network element is faulty.

In the method, the first user plane network element obtains keepalive information of the terminal device; the first user plane network element receives a migration begin request message sent by the control plane network element; and in response to receiving the migration begin request message, after receiving a first keepalive request packet sent by the terminal device, the first user plane network element sends a first keepalive response packet for the first keepalive request packet to the terminal device based on the keepalive information.

When a communication fault occurs between the terminal device and the second user plane network element, the terminal device is migrated from the second user plane network element to the first user plane network element, and the first user plane network element forwards the traffic of the terminal device. In a migration process of the terminal device, the first user plane network element receives the migration begin request message delivered by the control plane network element, where the migration begin request message is used to notify the first user plane network element that the terminal device is currently in a migration process. In this scenario, if the terminal device sends the first keepalive request packet to the first user plane network element, even if the first user plane network element has not obtained forwarding control entry information of the terminal device, for example, the first user plane network element has not received the forwarding control entry information of the terminal device delivered by the control plane network element, the first user plane network element can still send, based on the keepalive information, the first keepalive response packet used to respond to the first keepalive request packet. Therefore, a case that the terminal device goes offline due to a keepalive detection failure in a migration process of the terminal device is avoided.

It should be noted that the keepalive information may include some information in forwarding control entry information that corresponds to the terminal device and that is in a user plane network element, and the keepalive information includes content required by the user plane network element to respond to a keepalive request packet sent by the terminal device.

Optionally, the keepalive information includes a terminal identifier, a gateway identifier, and an interface identifier. The terminal identifier is used to identify the terminal device, the gateway identifier is used to identify the BNG system, and the interface identifier is used to identify an interface that is on the first user plane network element and exchanges traffic with the terminal device.

When receiving the first keepalive request packet sent by the terminal device, the first user plane network element needs to perform validity verification on the first keepalive request packet. If the validity verification succeeds, it indicates that the terminal device is a valid user, and the first user plane network element responds to the first keepalive request packet. The validity verification includes verification on a terminal identifier, a gateway identifier, and an interface identifier that are carried in the first keepalive request packet, so as to determine whether a source of the first keepalive request packet is valid. Therefore, the keepalive information delivered by the control plane network element needs to include the terminal identifier, the gateway identifier, and the interface identifier that correspond to the terminal device.

Optionally, an implementation process of sending the first keepalive response packet for the first keepalive request packet to the terminal device based on the keepalive information may be: when the first user plane network element does not store forwarding control entry information matching the first keepalive request packet, sending the first keepalive response packet to the terminal device based on the keepalive information. Before the first user plane network element sends the first keepalive response packet for the first keepalive request packet to the terminal device based on the keepalive information, the first user plane network element determines that the first keepalive request packet successfully matches the keepalive information of the terminal device (that is, the foregoing validity verification process).

In other words, when responding to the first keepalive request packet based on the keepalive information, the first user plane network element needs to first determine whether the first keepalive request packet can hit (that is, successfully match) the keepalive information. When the first keepalive request packet hits the keepalive information, the first keepalive response packet is sent to the terminal device. When the first keepalive request packet does not hit the keepalive information, the first keepalive request packet is discarded. The matching the first keepalive request packet with the keepalive information of the terminal device may include: matching the terminal identifier, the gateway identifier, and the interface identifier that are carried in the first keepalive request packet with corresponding content in the keepalive information, so as to verify validity of the first keepalive request packet. Therefore, this process may also be referred to as validity verification of the first keepalive request packet. For example, if the terminal identifier, the gateway identifier, and the interface identifier that are carried in the first keepalive request packet are respectively consistent with the terminal identifier, the gateway identifier, and the interface identifier in the keepalive information, it is determined that the first keepalive request packet successfully matches the keepalive information.

Optionally, when the first user plane network element stores the forwarding control entry information matching the first keepalive request packet, the first user plane network element sends the first keepalive response packet to the terminal device based on the forwarding control entry information. Before the first user plane network element sends the first keepalive response packet to the terminal device based on the forwarding control entry information, the first user plane network element determines that the first keepalive request packet successfully matches the forwarding control entry information of the terminal device. For example, if the terminal identifier, the gateway identifier, and the interface identifier that are carried in the first keepalive request packet are respectively consistent with the terminal identifier, the gateway identifier, and the interface identifier in the forwarding control entry information, it is determined that the first keepalive request packet successfully matches the keepalive information.

That is, in a migration process of the terminal device, if the first keepalive request packet is received, it is first determined whether the first keepalive request packet can hit the forwarding control entry information, and the first keepalive request packet is responded based on the keepalive information only when the first keepalive request packet does not hit the forwarding control entry information. This improves compatibility of this application.

Optionally, if the first user plane network element and the second user plane network element belong to a same warm backup group, the keepalive information further includes an index of the warm backup group.

In a warm backup scenario, when the first user plane network element receives the first keepalive request packet sent by the terminal device, the first user plane network element responds to the first keepalive request packet of the terminal device only when the terminal device is a user to be migrated to the first user plane network element. In the warm backup scenario, migrated users to be received by each user plane network element in the warm backup group are pre-determined based on a failover policy. Therefore, to-be-migrated users of each user plane network element in the warm backup group can be further determined based on the index of the warm backup group, to determine whether the terminal device is a user to be migrated to the first user plane network element. Therefore, the keepalive information may further include the index of the warm backup group.

Optionally, the terminal identifier includes a MAC address of the terminal device, and the gateway identifier includes a MAC address of the BNG system.

Optionally, in a case that the terminal device is a terminal device that sends traffic based on PPPOE, that is, the terminal device is a PPPOE user, the terminal identifier includes a PPPOE session identifier of the terminal device and a MAC address of the terminal device, and the gateway identifier includes a MAC address of the BNG system.

Optionally, in a case that the terminal device is a terminal device that sends traffic based on IPoE, that is, the terminal device is an IPoE user, the terminal identifier includes a MAC address of the terminal device, and the gateway identifier includes a MAC address and an IP address of the BNG system.

The terminal identifier and the gateway identifier are represented differently in different scenarios, so that flexibility of this application is improved.

Optionally, the keepalive information further includes a local magic number and a client magic number of the terminal device. In this scenario, the first keepalive response packet carries the local magic number.

The local magic number and the client magic number may be negotiated between the terminal device and the control plane network element in a process in which the terminal device goes online. After the terminal device goes online successfully, all PPP LCP packets sent by the terminal device need to carry the client magic number, and the BNG system checks whether the client magic number is consistent with the client magic number previously negotiated. All PPP LCP packets sent by the BNG system need to carry the local magic number, and the terminal device checks whether the local magic number is consistent with the local magic number previously negotiated.

Optionally, the keepalive information further includes an IP address of the terminal device.

The IP address may be used to check whether the IPoE user is a valid user. That is, when receiving a keepalive request packet sent by a target terminal device, a user plane network element needs to check whether an IP address carried in the keepalive request packet is consistent with an IP address previously allocated through negotiation.

Optionally, the keepalive information further includes a customer VLAN tag and/or a service VLAN tag.

The keepalive information may include at least one of the customer VLAN tag and the service VLAN tag, which is planned and determined by an operator. The customer VLAN tag and the service VLAN tag may be used to perform validity verification on the first keepalive request packet.

Optionally, when the keepalive information includes the customer VLAN tag, the keepalive information further includes a customer VLAN priority. In this scenario, the first keepalive response packet further carries the customer VLAN priority, to indicate a forwarding device between the first user plane network element and the terminal device to forward the first keepalive response packet based on the customer VLAN priority.

Optionally, when the keepalive information includes the service VLAN tag, the keepalive information further includes a service VLAN priority, and the first keepalive response packet further carries the service VLAN priority. In this scenario, the first keepalive response packet further carries the service VLAN priority, to indicate a forwarding device between the first user plane network element and the terminal device to forward the first keepalive response packet based on the service VLAN priority.

Optionally, the migration begin request message carries a slot identifier, and the slot identifier indicates a slot that is on the first user plane network element and exchanges traffic with the terminal device. The first user plane network element responds to the first keepalive request packet by using the slot indicated by the slot identifier.

Optionally, in the method, the first user plane network element further sends a migration begin response message to the control plane network element in response to receiving the migration begin request message.

After receiving the migration begin request message sent by the control plane network element, the first user plane network element needs to feed back the migration begin response message to the control plane network element.

Optionally, the migration begin response message carries a processing result of the first user plane network element for the migration begin request message. The processing result may be that the migration begin request message is successfully received currently, or the migration begin request message is not successfully received currently.

Optionally, both the migration begin request message and the migration begin response message are packet forwarding control protocol PFCP-based node messages. In this application, the migration begin request message and the migration begin response message may be extended based on the PFCP.

Optionally, after sending the first keepalive response packet, the first user plane network element updates a locally stored forwarding control entry information set based on an indication of the control plane network element.

In a migration process of the terminal device, the first user plane network element needs to obtain forwarding control entry information corresponding to the terminal device, so that the first user plane network element adds the forwarding control entry information of the terminal device to a local forwarding control entry information set, and subsequently forwards the traffic of the terminal device based on the forwarding control entry information. For example, the forwarding control entry information may be delivered by the control plane network element to the first user plane network element.

Optionally, in a scenario that the updated forwarding control entry information set includes forwarding control entry information matching a second keepalive request packet sent by the terminal device, the first user plane network element receives a migration end request message sent by the control plane network element, and after receiving the migration end request message, receives the second keepalive request packet; and the first user plane network element sends a second keepalive response packet for the second keepalive request packet to the terminal device based on the forwarding control entry information.

Correspondingly, in a scenario that the updated forwarding control entry information set does not include the forwarding control entry information matching the second keepalive request packet, the first user plane network element receives the migration end request message sent by the control plane network element, receives the second keepalive request packet sent by the terminal device after receiving the migration end request message, and discards the second keepalive request packet.

That is, in addition to the migration begin request message, the control plane network element further sends a migration end request message to the first user plane network element, to notify the first user plane network element that the migration process of the terminal device ends. After receiving the migration end request message, if receiving a third keepalive request packet, the first user plane network element queries stored forwarding control entry information based on the third keepalive request packet; when the third keepalive request packet successfully matches the locally stored forwarding control entry information, responds to the third keepalive request packet based on the forwarding control entry information; and when the third keepalive request packet fails to match the locally stored forwarding control entry information, discards the third keepalive request packet.

In other words, in this application, the first user plane network element responds to the keepalive request packet of the terminal device based on the keepalive information only in the migration process of the terminal device. After the terminal device is migrated, the first user plane network element responds to the keepalive request packet of the terminal device based on the locally stored forwarding control entry information, and cannot respond to the keepalive request packet of the terminal device based on the keepalive information.

Optionally, the first user plane network element sends a migration end response message to the control plane network element in response to receiving the migration end request message.

After receiving the migration end request message sent by the control plane network element, the first user plane network element needs to feed back the migration end response message to the control plane network element.

Optionally, the migration end response message further carries a processing result of the first user plane network element for the migration end request message. The processing result may be that the migration end request message is successfully received currently, or the migration end request message is not successfully received currently.

Optionally, both the migration end request message and the migration end response message are PFCP-based node messages. In this application, the migration end request message and the migration end response message may be extended based on the PFCP.

Optionally, an implementation process of obtaining the keepalive information of the terminal device may be as follows: The first user plane network element receives a keepalive backup request message sent by the control plane network element, where the keepalive backup request message carries the keepalive information.

The control plane network element may deliver the keepalive information of the terminal device to the user plane network element by delivering a keepalive backup request message.

Optionally, in the method, the first user plane network element sends a keepalive backup response message to the control plane network element in response to receiving the keepalive backup request message.

After receiving the keepalive backup request message sent by the control plane network element, the first user plane network element needs to feed back the keepalive backup response message to the control plane network element.

Optionally, the keepalive backup response message further carries a processing result of the first user plane network element for the keepalive backup request message.

Optionally, both the keepalive backup request message and the keepalive backup response message are packet forwarding control protocol PFCP-based session messages. In this application, the keepalive backup request message and the keepalive backup response message may be extended based on the PFCP.

A PFCP message includes information elements, which are classified into two types: grouped information elements and embedded information elements. Optionally, in the keepalive backup request message, the keepalive information is carried in a grouped information element, and a plurality of pieces of information in the keepalive information may be respectively carried in a plurality of embedded information elements in the grouped information element.

Optionally, in the method, the first user plane network element receives a keepalive deletion request message sent by the control plane network element, where the keepalive deletion request message carries identification information of the keepalive information; and deletes the keepalive information based on the identification information. After the terminal device accesses the first user plane network element, if the terminal device goes offline, some information (for example, an IP address) of the terminal device may change when the terminal device goes online next time, that is, the keepalive information of the terminal device may change. Therefore, to avoid a system disorder, the keepalive information stored in the first user plane network element may be deleted, so that the control plane network element re-delivers the keepalive information of the terminal device after the terminal device goes online next time. In the foregoing process, the first user plane network element may delete the locally stored keepalive information.

Optionally, the identification information includes the terminal identifier and the interface identifier in the keepalive information of the terminal device. That is, the terminal identifier and the interface identifier in the keepalive information may be used as the identification information.

Optionally, in the method, the first user plane network element sends a keepalive deletion response message to the control plane network element in response to receiving the keepalive deletion request message.

After receiving the keepalive deletion request message sent by the control plane network element, the first user plane network element needs to feed back the keepalive deletion response message to the control plane network element.

Optionally, the keepalive deletion response message further carries a processing result of the first user plane network element for the keepalive deletion request message.

Optionally, both the keepalive deletion request message and the keepalive deletion response message are PFCP-based session messages. In this application, the keepalive deletion request message and the keepalive deletion response message may be extended based on the PFCP.

Optionally, in the method, the first user plane network element determines, based on a quantity of received keepalive request packets sent by the terminal device and an interval duration, whether a communication fault exists between the first user plane network element and the terminal device.

Based on the foregoing implementation, the first user plane network element can implement fault detection on the terminal device.

According to a second aspect, a message sending method is provided. The method is performed by a control plane network element included in a broadband network gateway BNG system. The BNG system further includes a first user plane network element and a second user plane network element. The first user plane network element is configured to forward traffic of a terminal device when the second user plane network element is faulty.

For related technical effects of some content in the message sending method provided in the second aspect, refer to the method provided in the first aspect. For technical effects of other content, refer to the following descriptions.

In the method, the control plane network element sends keepalive information of the terminal device to the first user plane network element, and sends a migration begin request message to the first user plane network element in response to a communication fault occurring between the terminal device and the second user plane network element. The migration begin request message indicates the first user plane network element to send a first keepalive response packet to the terminal device based on the keepalive information, and the first keepalive response packet is a response to the first keepalive request packet sent by the terminal device.

When a communication fault occurs between the terminal device and the second user plane network element, the terminal device is migrated from the second user plane network element to the first user plane network element. In a process in which the terminal device is migrated from the second user plane network element to the first user plane network element, the control plane network element delivers the migration begin request message to the first user plane network element, to notify the first user plane network element that the terminal device is currently in a migration process. In this scenario, if the terminal device sends the first keepalive request packet to the first user plane network element, even if the first user plane network element has not obtained forwarding control entry information of the terminal device, for example, the first user plane network element has not received the forwarding control entry information of the terminal device delivered by the control plane network element, the first user plane network element can still send the first keepalive response packet based on the keepalive information. Therefore, a case that the terminal device goes offline due to a keepalive detection failure in a migration process of the terminal device is avoided.

Optionally, the keepalive information includes a terminal identifier, a gateway identifier, and an interface identifier, where the terminal identifier is used to identify the terminal device, the gateway identifier is used to identify the BNG system, and the interface identifier is used to identify an interface that is on the first user plane network element and exchanges traffic with the terminal device.

Optionally, after sending the migration begin request message to the first user plane network element, the control plane network element sends a migration end request message to the first user plane network element, where the migration end request message indicates the first user plane network element to send a second keepalive response packet to the terminal device based on a locally stored forwarding control entry information set, and the second keepalive response packet is a response to the second keepalive request packet sent by the terminal device.

Optionally, before sending the migration end request message to the first user plane network element, the control plane network element indicates the terminal device to update the locally stored forwarding control entry information set.

Optionally, both the migration begin request message and the migration end request message are packet forwarding control protocol PFCP-based node messages.

Optionally, the first user plane network element and the second user plane network element belong to a same warm backup group. In this scenario, the control plane network element sends the keepalive information to another user plane network element other than the first user plane network element in the warm backup group.

In the warm backup scenario, the control plane network element may send the keepalive information to all user plane network elements in the warm backup group. In this way, after the terminal device is migrated to the first user plane network element, if the first user plane network element is also faulty, the terminal device is migrated from the first user plane network element to another user plane network element. In this way, the another user plane network element can also respond to the keepalive request packet of the terminal device based on the keepalive information.

Optionally, an implementation process in which the control plane network element sends the keepalive information of the terminal device to the first user plane network element is as follows: The control plane network element sends a keepalive backup request message to the first user plane network element, where the keepalive backup request message carries the keepalive information.

Optionally, an implementation process in which the control plane network element sends the keepalive information of the terminal device to the first user plane network element is as follows: After receiving a going-online request of the terminal device, the control plane network element sends the keepalive information to the first user plane network element. To avoid a case in which the first user plane network element does not have the keepalive information of the terminal device when a communication fault occurs between the terminal device and the second user plane network element, the keepalive information of the terminal device may be delivered to the first user plane network element when the terminal device goes online.

Optionally, in the method, when determining that the terminal device goes offline, the control plane network element sends a keepalive deletion request message to the first user plane network element, where the keepalive deletion request message carries identification information of the keepalive information.

After the terminal device accesses a network, if the terminal device goes offline, some information (for example, an IP address) of the terminal device may change when the terminal device goes online next time, that is, the keepalive information of the terminal device may change. Therefore, to avoid a system disorder, when the terminal device goes offline, target keepalive information stored in the user plane network element may be deleted, so that the control plane network element re-delivers the keepalive information of the terminal device after the terminal device goes online next time.

Optionally, both the keepalive backup request message and the keepalive deletion request message are PFCP-based session messages.

According to a third aspect, an information obtaining method is provided. The method is performed by a first user plane network element included in a BNG system, the BNG system further includes a second user plane network element, and the first user plane network element is configured to forward traffic of a terminal device when the second user plane network element is faulty.

For related technical effects of some content in the method provided in the third aspect, refer to the method provided in the first aspect. For technical effects of other content, refer to the following descriptions.

In the method, when the second user plane network element works normally, the first user plane network element obtains keepalive information of the terminal device, and stores the keepalive information.

To avoid a case in which the first user plane network element does not have the keepalive information of the terminal device when a communication fault occurs between the terminal device and the second user plane network element, the first user plane network element needs to obtain the keepalive information of the terminal device when the second user plane network element works normally, so as to ensure that a keepalive request packet of the terminal device can be responded based on the keepalive information in a subsequent migration process of the terminal device. The keepalive information may include some information in forwarding control entry information that corresponds to the terminal device and that is in a user plane network element, and the keepalive information includes content required by the user plane network element to respond to a keepalive request packet sent by the terminal device.

Optionally, in the method, after receiving the first keepalive request packet sent by the terminal device, the first user plane network element sends a first keepalive response packet for the first keepalive request packet to the terminal device based on the keepalive information, to prevent the terminal device from going offline.

Optionally, the BNG system further includes a control plane network element, and an implementation process of obtaining the keepalive information of the terminal device is: receiving the keepalive information sent by the control plane network element.

According to a fourth aspect, an information sending method is provided. The method is performed by a control plane network element included in a BNG system, the BNG system further includes a first user plane network element and a second user plane network element, and the first user plane network element is configured to forward traffic of a terminal device when the second user plane network element is faulty.

In the method, the control plane network element sends forwarding control entry information to the second user plane network element, where the forwarding control entry information is used by the second user plane network element to generate a first keepalive response packet, and the first keepalive response packet is a response to a first keepalive request packet sent by the terminal device. When the second user plane network element works normally, the control plane network element sends keepalive information of the terminal device to the first user plane network element, where the keepalive information is used by the first user plane network element to generate a second keepalive response packet, and the second keepalive response packet is a response to a second keepalive request packet sent by the terminal device.

When the terminal device accesses a network, the control plane network element sends the forwarding control entry information to the second user plane network element, so that the second user plane network element forwards the traffic of the terminal device based on the forwarding control entry information, and responds to keepalive detection of the terminal device based on the forwarding control entry information. In addition, to enable the first user plane network element to respond to the keepalive detection of the terminal device in time when the second user plane network element is faulty, the control plane network element needs to deliver the keepalive information of the terminal device to the first user plane network element to which the terminal device is to be migrated when the second user plane network element works normally. In this way, when the second user plane network element is faulty, if the terminal device sends a keepalive request packet to the first user plane network element in a process of migrated from the second user plane network element to the first user plane network element, even if the first user plane network element has not obtained the forwarding control entry information, the first user plane network element can send a keepalive response packet based on the keepalive information, to avoid a case in which the terminal device goes offline due to a keepalive detection failure.

According to a fifth aspect, a message receiving method is provided. The method is performed by a BNG system, and the BNG system includes a first user plane network element, a second user plane network element, and a control plane network element. The first user plane network element is configured to forward traffic of a terminal device when the second user plane network element is faulty.

For related technical effects of the method provided in the fifth aspect, refer to the method provided in the first aspect.

In the method, the control plane network element sends keepalive information of the terminal device to the first user plane network element, and in response to a communication fault occurring between the terminal device and the second user plane network element, the control plane network element sends a migration begin request message to the first user plane network element; and in response to receiving the migration begin request message, after receiving a first keepalive request packet sent by the terminal device, the first user plane network element sends a first keepalive response packet for the first keepalive request packet to the terminal device based on the keepalive information.

Optionally, the keepalive information includes a terminal identifier, a gateway identifier, and an interface identifier, where the terminal identifier is used to identify the terminal device, the gateway identifier is used to identify the BNG system, and the interface identifier is used to identify an interface that is on the first user plane network element and exchanges traffic with the terminal device.

Optionally, after the first user plane network element sends the first keepalive response packet, the control plane network element indicates the first user plane network element to update a forwarding control entry information set locally stored by the first user plane network element.

Optionally, the updated forwarding control entry information set includes forwarding control entry information matching a second keepalive request packet sent by the terminal device. In this scenario, the control plane network element sends a migration end request message to the first user plane network element; after receiving the migration end request message, the first user plane network element receives the second keepalive request packet; and the first user plane network element sends a second keepalive response packet for the second keepalive request packet to the terminal device based on the forwarding control entry information.

Optionally, the updated forwarding control entry information set does not include forwarding control entry information matching a second keepalive request packet sent by the terminal device. In this scenario, the control plane network element sends a migration end request message to the first user plane network element; after receiving the migration end request message, the first user plane network element receives the second keepalive request packet; and the first user plane network element discards the second keepalive request packet.

Optionally, the first user plane network element and the second user plane network element belong to a same warm backup group, and the warm backup group further includes another user plane network element other than the first user plane network element and the second user plane network element. In this scenario, the control plane network element sends the keepalive information to the another user plane network element.

According to a sixth aspect, a BNG system is provided. The BNG system includes a first user plane network element, a second user plane network element, and a control plane network element.

For related technical effects of the BNG system provided in the sixth aspect, refer to the methods provided in the first aspect and the second aspect.

The control plane network element is configured to: send keepalive information of a terminal device to the first user plane network element, where the first user plane network element is configured to forward traffic of the terminal device when the second user plane network element is faulty; and send a migration begin request message to the first user plane network element in response to a communication fault occurring between the terminal device and the second user plane network element.

The first user plane network element is configured to: in response to receiving the migration begin request message, after receiving a first keepalive request packet sent by the terminal device, send a keepalive response packet for the first keepalive request packet to the terminal device based on the keepalive information.

Optionally, the keepalive information includes a terminal identifier, a gateway identifier, and an interface identifier, where the terminal identifier is used to identify the terminal device, the gateway identifier is used to identify the BNG system, and the interface identifier is used to identify an interface that is on the first user plane network element and exchanges traffic with the terminal device.

Optionally, the control plane network element is further configured to indicate the first user plane network element to update a forwarding control entry information set locally stored by the first user plane network element.

Optionally, the updated forwarding control entry information set includes forwarding control entry information matching a second keepalive request packet sent by the terminal device. In this scenario, the control plane network element is further configured to send a migration end request message to the first user plane network element; and the first user plane network element is further configured to: after receiving the migration end request message, receive the second keepalive request packet, and send a second keepalive response packet for the second keepalive request packet to the terminal device based on the forwarding control entry information.

Optionally, the updated forwarding control entry information set does not include forwarding control entry information matching a second keepalive request packet sent by the terminal device. In this scenario, the control plane network element is further configured to send a migration end request message to the first user plane network element; and the first user plane network element is further configured to: after receiving the migration end request message, receive the second keepalive request packet, and discard the second keepalive request packet.

Optionally, the first user plane network element and the second user plane network element belong to a same warm backup group, and the warm backup group further includes another user plane network element other than the first user plane network element and the second user plane network element. In this scenario, the control plane network element is further configured to send the keepalive information to the another user plane network element.

Optionally, the first user plane network element is further configured to send a migration begin response message to the control plane network element in response to receiving the migration begin request message. The control plane network element is further configured to receive the migration begin response message.

Optionally, the first user plane network element is further configured to send a migration end response message to the control plane network element in response to receiving the migration end request message. The control plane network element is further configured to receive the migration end response message.

Optionally, the control plane network element is configured to send a keepalive backup request message to the first user plane network element, where the keepalive backup request message carries the keepalive information. The first user plane network element is configured to receive the keepalive backup request message sent by the control plane network element.

Optionally, the first user plane network element is further configured to send a keepalive backup response message to the control plane network element in response to receiving the keepalive backup request message. The control plane network element is further configured to receive the keepalive backup response message.

Optionally, the control plane network element is further configured to send a keepalive deletion request message to the first user plane network element, where the keepalive deletion request message carries identification information of the keepalive information. The first user plane network element is configured to: receive the keepalive deletion request message sent by the control plane network element, and delete the keepalive information based on the identification information.

Optionally, the first user plane network element is further configured to send a keepalive deletion response message to the control plane network element in response to receiving the keepalive deletion request message. The control plane network element is further configured to receive the keepalive deletion response message.

According to a seventh aspect, a BNG system is provided. The BNG system includes a control plane network element, a first user plane network element, and a second user plane network element. The first user plane network element is configured to forward traffic of a terminal device when the second user plane network element is faulty.

For related technical effects of the BNG system provided in the seventh aspect, refer to the methods provided in the third aspect and the fourth aspect. Details are not described herein again.

The control plane network element is configured to send forwarding control entry information to the second user plane network element, where the forwarding control entry information is used by the second user plane network element to generate a first keepalive response packet, and the first keepalive response packet is a response to a first keepalive request packet sent by the terminal device.

The control plane network element is further configured to: when the second user plane network element works normally, send keepalive information of the terminal device to the first user plane network element, where the keepalive information is used by the first user plane network element to generate a second keepalive response packet, and the second keepalive response packet is a response to a second keepalive request packet sent by the terminal device.

The first user plane network element is configured to: when the second user plane network element works normally, obtain the keepalive information of the terminal device, and store the keepalive information.

Optionally, the control plane network element is further configured to send a migration begin request message to the first user plane network element in response to a communication fault occurring between the terminal device and the second user plane network element. The first user plane network element is configured to: in response to receiving the migration begin request message, after receiving the second keepalive request packet sent by the terminal device, send the second keepalive response packet for the second keepalive request packet to the terminal device based on the keepalive information.

Optionally, the keepalive information includes a terminal identifier, a gateway identifier, and an interface identifier, where the terminal identifier is used to identify the terminal device, the gateway identifier is used to identify the BNG system, and the interface identifier is used to identify an interface that is on the first user plane network element and exchanges traffic with the terminal device.

Optionally, the control plane network element is further configured to indicate the first user plane network element to update a forwarding control entry information set locally stored by the first user plane network element.

Optionally, the updated forwarding control entry information set includes forwarding control entry information matching a third keepalive request packet sent by the terminal device. In this scenario, the control plane network element is further configured to send a migration end request message to the first user plane network element; and the first user plane network element is further configured to: after receiving the migration end request message, receive the third keepalive request packet, and send a third keepalive response packet for the third keepalive request packet to the terminal device based on the forwarding control entry information.

Optionally, the updated forwarding control entry information set does not include forwarding control entry information matching a third keepalive request packet sent by the terminal device. In this scenario, the control plane network element is further configured to send a migration end request message to the first user plane network element; and the first user plane network element is further configured to: after receiving the migration end request message, receive the third keepalive request packet, and discard the third keepalive request packet.

Optionally, the first user plane network element and the second user plane network element belong to a same warm backup group, and the warm backup group further includes another user plane network element other than the first user plane network element and the second user plane network element. In this scenario, the control plane network element is further configured to send the keepalive information to the another user plane network element.

Optionally, the first user plane network element is further configured to send a migration begin response message to the control plane network element in response to receiving the migration begin request message. The control plane network element is further configured to receive the migration begin response message.

Optionally, the first user plane network element is further configured to send a migration end response message to the control plane network element in response to receiving the migration end request message. The control plane network element is further configured to receive the migration end response message.

Optionally, the control plane network element is configured to send a keepalive backup request message to the first user plane network element, where the keepalive backup request message carries the keepalive information. The first user plane network element is configured to receive the keepalive backup request message sent by the control plane network element.

Optionally, the first user plane network element is further configured to send a keepalive backup response message to the control plane network element in response to receiving the keepalive backup request message. The control plane network element is further configured to receive the keepalive backup response message.

Optionally, the control plane network element is further configured to send a keepalive deletion request message to the first user plane network element, where the keepalive deletion request message carries identification information of the keepalive information. The first user plane network element is configured to: receive the keepalive deletion request message sent by the control plane network element, and delete the keepalive information based on the identification information.

Optionally, the first user plane network element is further configured to send a keepalive deletion response message to the control plane network element in response to receiving the keepalive deletion request message. The control plane network element is further configured to receive the keepalive deletion response message.

According to an eighth aspect, a user plane network element is provided. The user plane network element has a function of implementing behavior of the method provided in the first aspect. The user plane network element includes at least a transceiver module and a processing module. The transceiver module is configured to implement a transceiving-related operation in the method provided in the first aspect, and the processing module is configured to implement an operation other than the transceiving-related operation in the method provided in the first aspect.

Optionally, the processing module is configured to perform an operation of obtaining keepalive information of a terminal device in the first aspect. The transceiver module is configured to perform an operation of receiving a migration begin request message sent by the control plane network element in the first aspect.

Optionally, the transceiver module and the processing module may further perform other operations in the first aspect. Details are not described herein again.

According to a ninth aspect, a control plane network element is provided. The control plane network element has a function of implementing behavior of the method provided in the second aspect. The control plane network element includes at least a transceiver module and a processing module. The transceiver module is configured to implement a transceiving-related operation in the method provided in the second aspect, and the processing module is configured to implement an operation other than the transceiving-related operation in the method provided in the second aspect.

Optionally, the transceiver module is configured to perform an operation of "sending keepalive information of a terminal device to the first user plane network element, and sending a migration begin request message to the first user plane network element in response to a communication fault occurring between the terminal device and the second user plane network element" in the second aspect.

Optionally, the transceiver module and the processing module may further perform other operations in the second aspect. Details are not described herein again.

According to a tenth aspect, a user plane network element is provided, and the user plane network element has a function of implementing behavior of the method provided in the third aspect. The user plane network element includes at least a transceiver module and a processing module. The transceiver module is configured to implement a transceiving-related operation in the method provided in the third aspect, and the processing module is configured to implement an operation other than the transceiving-related operation in the method provided in the third aspect.

Optionally, the processing module is configured to perform an operation of "obtaining keepalive information of the terminal device and saving the keepalive information when the second user plane network element works normally" in the third aspect.

Optionally, the transceiver module and the processing module may further perform other operations in the third aspect. Details are not described herein again.

According to an eleventh aspect, a control plane network element is provided, and the control plane network element has a function of implementing behavior of the method provided in the fourth aspect. The control plane network element includes at least a transceiver module and a processing module. The transceiver module is configured to implement a transceiving-related operation in the method provided in the fourth aspect, and the processing module is configured to implement an operation other than the transceiving-related operation in the method provided in the fourth aspect.

Optionally, the transceiver module is configured to perform an operation of "sending forwarding control entry information to the second user plane network element, where the forwarding control entry information is used by the second user plane network element to generate a first keepalive response packet, and the first keepalive response packet is a response to a first keepalive request packet sent by the terminal device; and when the second user plane network element works normally, the control plane network element sends keepalive information of the terminal device to the first user plane network element, where the keepalive information is used by the first user plane network element to generate a second keepalive response packet, and the second keepalive response packet is a response for a second keepalive request packet sent by the terminal device" in the fourth aspect.

Optionally, the transceiver module and the processing module may further perform other operations in the fourth aspect. Details are not described herein again.

According to a twelfth aspect, a network device is provided. The network device includes a memory and a processor.

The memory is configured to store a program that supports the network device in performing the method provided in any one of the first aspect to the fifth aspect, and store data used to implement the method provided in any one of the first aspect to the fifth aspect; and the processor is configured to execute the program stored in the memory.

According to a thirteenth aspect, a computer-readable storage medium is provided, where the computer-readable storage medium stores instructions, and when the instructions are run on a processor, the method provided in any one of the first aspect to the fifth aspect is implemented.

According to a fourteenth aspect, a computer program product including instructions is provided. When the computer program product is run on a processor, the method provided in any one of the first aspect to the fifth aspect is implemented.

Technical effects obtained in the seventh aspect to the twelfth aspect are similar to technical effects obtained by using corresponding technical means in the method provided in any one of the first aspect to the fifth aspect. Details are not described herein again.

BRIEF DESCRIPTION OF THE DRAWINGS

FIG. 7 is a schematic diagram of a general format of a message header of a node message according to an embodiment of this application;

FIG. 8 is a schematic diagram of a general format of a message header of a session message according to an embodiment of this application;

FIG. 11 is a schematic diagram of a warm backup group according to an embodiment of this application;

FIG. 12 is a flowchart of a message receiving method according to an embodiment of this application;

FIG. 13 is a flowchart of a message sending method according to an embodiment of this application;

FIG. 14 is a flowchart of an information obtaining method according to an embodiment of this application;

FIG. 15 is a flowchart of an information sending method according to an embodiment of this application;

FIG. 16 is a schematic flowchart of a keepalive information delivering method according to an embodiment of this application;

FIG. 17 is a schematic diagram of a format of an information element carrying a customer VLAN priority according to an embodiment of this application;

FIG. 18 is a schematic diagram of a format of an information element carrying a service VLAN priority according to an embodiment of this application;

FIG. 19 is a schematic diagram of a format of an information element carrying a warm backup group index according to an embodiment of this application;

FIG. 20 is a schematic diagram of a format of a gateway IP address information element according to an embodiment of this application;

FIG. 22 is a schematic flowchart of a terminal device migration method according to an embodiment of this application;

FIG. 23A and FIG. 23B are schematic diagrams of a format of an information element carrying slot identification information according to an embodiment of this application;

DETAILED DESCRIPTION OF THE EMBODIMENTS

To make the objectives, technical solutions, and advantages of this application clearer, the following further describes implementations of this application in detail with reference to the accompanying drawings.

It should be understood that "a plurality of" mentioned in this specification means two or more than two. In descriptions of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, to clearly describe the technical solutions in embodiments of this application, terms such as "first" and "second" are used in embodiments of this application to distinguish between same items or similar items that provide basically same effects or functions. A person skilled in the art may understand that the terms such as "first" and "second" do not limit a quantity or an execution sequence, and the terms such as "first" and "second" do not indicate a definite difference.

Before embodiments of this application are described in detail, an application scenario in embodiments of this application is first described.

Figure 1:
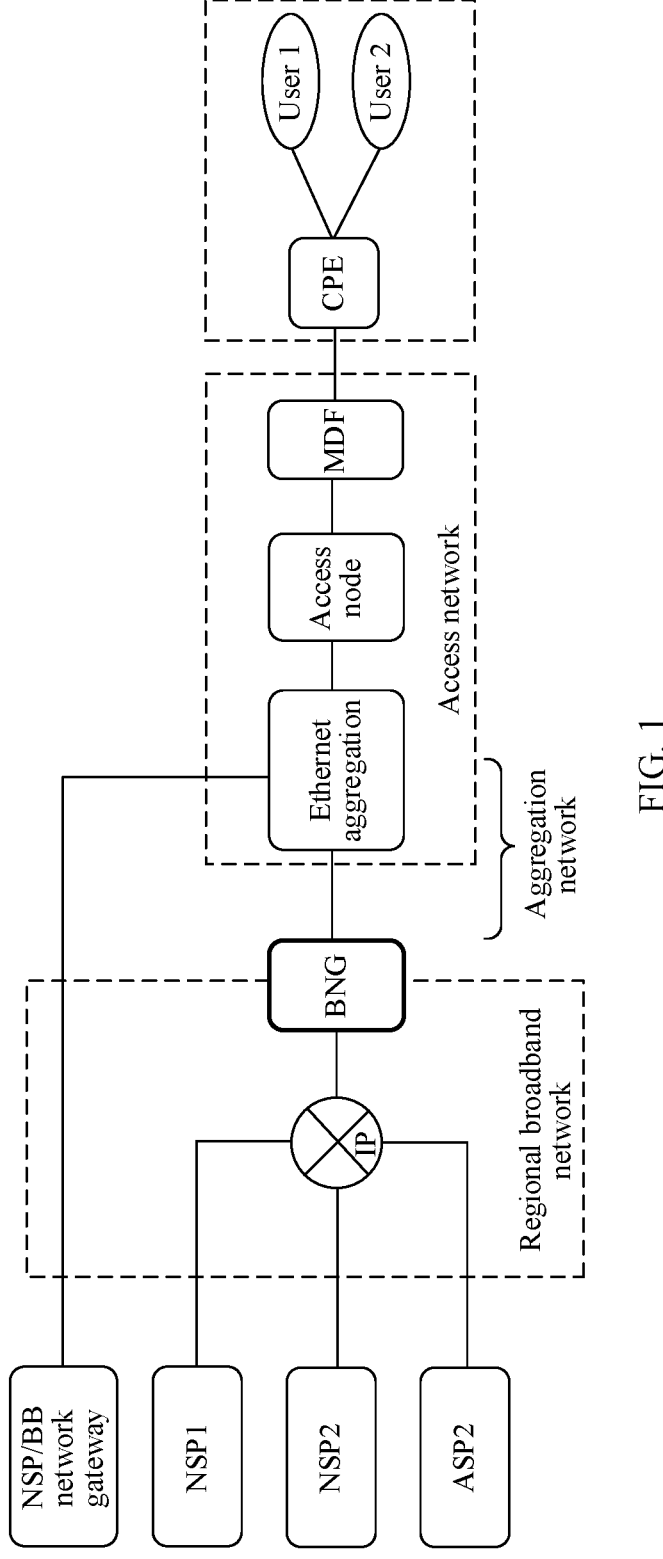
FIG. 1 is a schematic diagram of a network architecture according to an embodiment of this application.

Based on a network architecture defined in the technical report 101 (TR101), it can be learned that a BNG undertakes a function of accessing a network by a terminal device. FIG. 1 is a schematic diagram of a network architecture according to an embodiment of this application. As shown in FIG. 1, the BNG is located at an edge of a regional broadband network. A user (that is, a client) on a terminal device accesses the BNG through an access network and an aggregation network, and the BNG provides a broadband service for the user. For related explanations of other network elements in FIG. 1, refer to the TR101. Details are not described herein again.

The terminal device may access a network by using Internet protocol over Ethernet (IPoE) or point-to-point protocol over Ethernet (PPPOE). In other words, the terminal device may be an IPoE user, or may be a PPPOE user. The IPoE user includes a dynamic host configuration protocol (DHCP) user, a DHCPv6 user, or the like.

Figure 2:
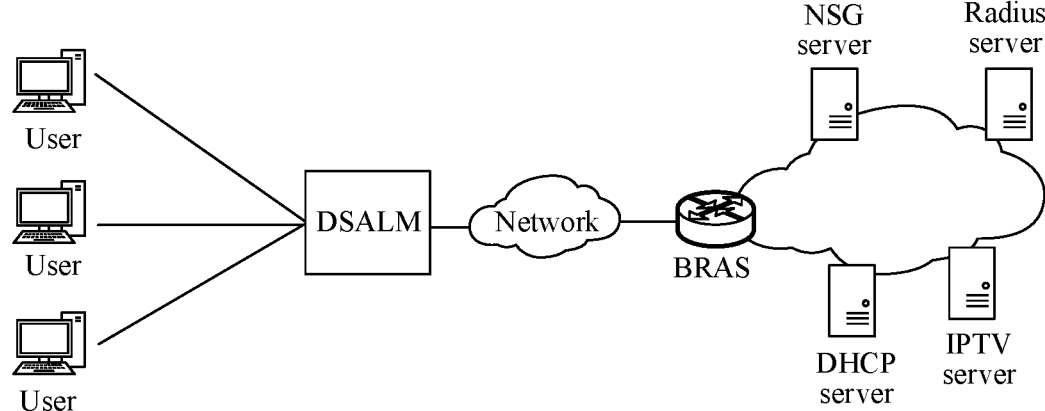
FIG. 2 is a schematic diagram of another network architecture according to an embodiment of this application.

FIG. 2 is a schematic diagram of another network architecture according to an embodiment of this application. The broadband remote access server (BRAS) in FIG. 2 is a BNG in a form. As shown in FIG. 2, the BRAS is connected to servers such as a next generation network (NGN) server, a Radius server, a DHCP server, and an IPTV server. When a terminal device accesses a network, the BRAS authenticates users, allocates IP addresses, controls access, and schedules traffic based on these servers. For example, the BRAS serves as a Radius client and interacts with the Radius server to complete user authentication of the terminal device.

In addition, after the terminal device goes online (that is, the terminal device accesses the BNG), in order to maintain a keepalive state between the BNG and the terminal device, a link fault and a peer end fault need to be detected, and generally a detection packet (for example, a keepalive request packet) is actively sent for detection.

For example, for a PPPOE user, the terminal device and the BNG respectively send a link control protocol echo-request (LCP Echo-Request) packet, and receive a PPP LCP Echo-Reply packet returned by the peer end for detection. The terminal device and BNG respectively define a quantity of times of detection and an interval for sending detection packets, send the LCP Echo-Request packet at the defined interval and accumulate a quantity of times that the LCP Echo-Reply packet is not received, consider that the peer end or the link is faulty when the quantity of times that the LCP Echo-Reply packet is not received reaches the defined quantity of times of detection, and triggers going-offline.

For another example, for a DHCP user, the terminal device and the BNG keep alive by using an address resolution protocol (ARP) packet and a neighbor discovery (ND) protocol packet. The ARP packet is used to detect an IPV4 link status. The terminal device and the BNG respectively send an ARP request packet and receive an ARP reply packet returned from the peer end to implement link fault detection and peer end fault detection. The ND protocol packet is used to detect an IPV6 link status. The terminal device and the BNG respectively send an ND request packet to each other and receive an ND reply packet returned from the peer end to implement link fault detection and peer end fault detection. For another example, a DHCP (including DHCPv4 and DHCPv6) renewal packet may also be used to keep alive, and a specific implementation is not described in detail herein.

In addition, with the development of SDN and NFV technologies, a network architecture of a metropolitan area network evolves from a conventional network-centric network architecture to a data center-centric network architecture. In this evolution process, conventional devices such as network elements evolve from professional network elements to universal network elements. A conventional network element needs to decouple a control function from a forwarding function during evolution from a professional network element to a general network element. As a conventional gateway device for accessing a broadband network, an SDN/NFV-based BNG architecture of the BNG also needs to decouple a control function from a forwarding function.

Figure 3:
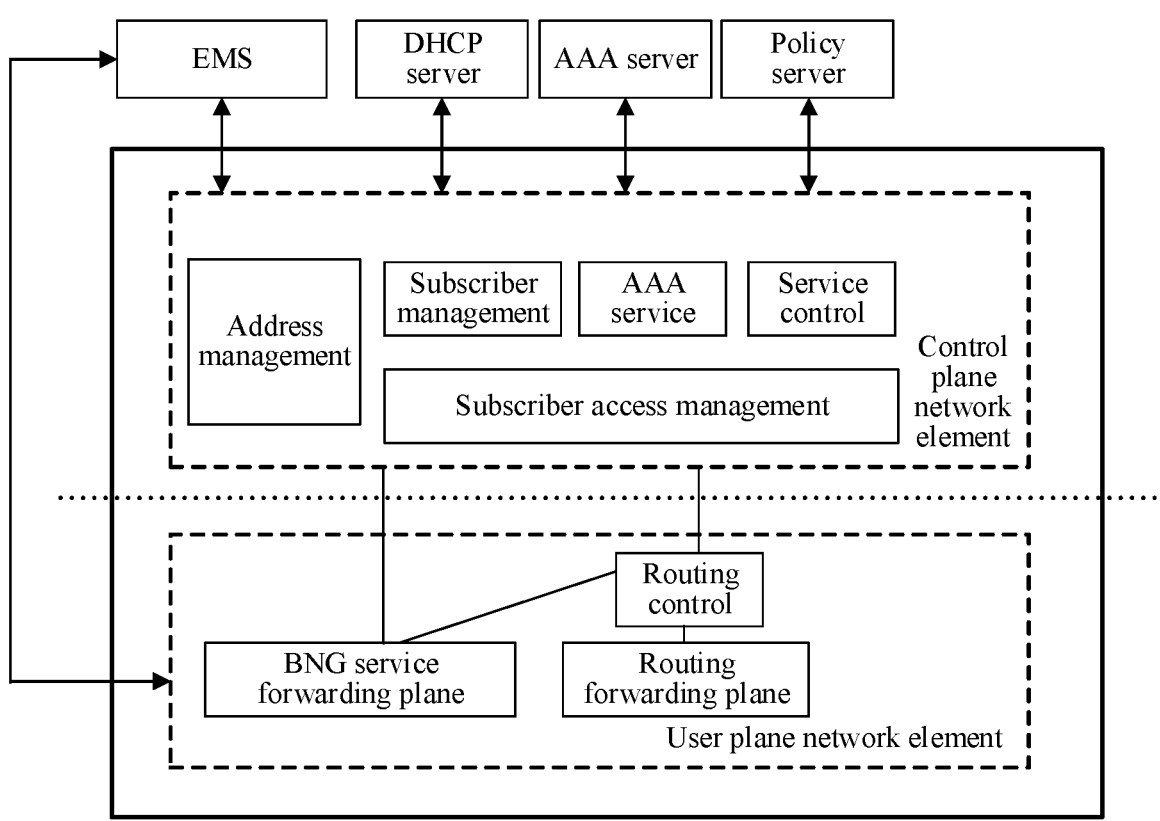
FIG. 3 is a schematic diagram of function distribution of a BNG system in which a forwarding function is decoupled from a control function according to an embodiment of this application.

FIG. 3 is a schematic diagram of function distribution of a BNG system in which a forwarding function is decoupled from a control function according to an embodiment of this application. A BNG system obtained after a forwarding function is decoupled from a control function includes one control plane (CP) network element and a plurality of user plane network elements. The BNG system obtained after a forwarding function is decoupled from a control function is also referred to as a CU separated BNG system.

As shown in FIG. 3, the control plane network element is configured to provide functions such as address management, subscriber management, an AAA service, service control, and subscriber access management (subscriber access management (including a PPPOE user and an IPoE user)). The subscriber access management is used to process a user access protocol packet. In addition, the control plane network element further needs to provide a user plane network element management (UP management) function (not shown in FIG. 3) required by the BNG system.

Any user plane network element is configured to implement forwarding processing of a terminal. Specifically, the user plane network element is configured to provide functions such as a routing forwarding plane and a BNG service forwarding plane required by the BNG system. The BNG service forwarding plane is configured to send an access request packet of a user to the control plane network element.

Figures 4, 5, 6:
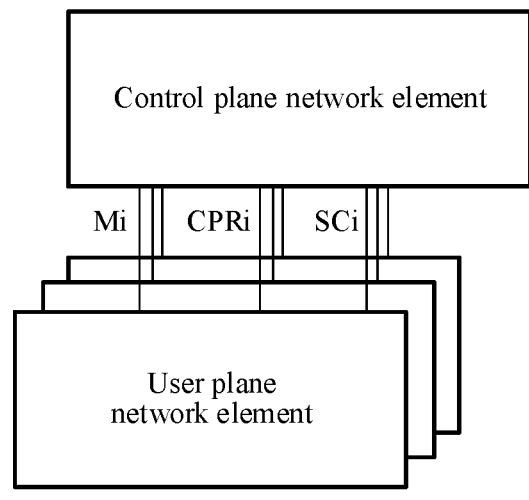
FIG. 4 is a schematic diagram of an interface according to an embodiment of this application.
FIG. 5 is a schematic diagram of a general format of a PFCP message according to an embodiment of this application.
FIG. 6 is a schematic diagram of a general format of a message header according to an embodiment of this application.

In addition, the control plane network element and the user plane network element may be connected by using three types of interfaces. FIG. 4 is a schematic diagram of an interface according to an embodiment of this application. As shown in FIG. 4, the three interfaces are respectively the following three interfaces.

(1) Management interface (management interface, Mi) The Mi may specifically use a network configuration (netconf) interface. The control plane network element uses this interface to deliver configurations to the user plane network element. The user plane network element uses this interface to report some running states and the like.

(2) Control packet redirection interface (control packet redirection interface, CPRi) The CPRi may specifically use a virtual extensible local area network-generic protocol encapsulation (virtual extensible local area network-generic protocol encapsulation, vxlan-GPE) interface. When receiving the user access protocol packet, the user plane network element encapsulates the user access protocol packet by using this interface, and then sends the encapsulated user access protocol packet to the control plane network element, and the control plane network element processes the user access protocol packet. The user access protocol packet is also referred to as a dial-up request. The control packet redirection interface is also referred to as a packet redirection interface.

(3) State control interface (state control interface, SCi), the SCi may specifically use a control plane and user plane separated protocol (control plane and user plane separated protocol, CUSP) interface. The control plane network element processes the user access protocol packet and completes protocol interaction of a user. After the user goes online, the control plane network element delivers a user entry to a corresponding user plane network element through this interface. The user entry carries user information of the terminal device, so that the user plane network element subsequently forwards traffic of the terminal device based on the user entry. Detailed functions of the user entry are described in subsequent embodiments.

Currently, the control plane network element and the user plane network element of the BNG transmit data based on a packet forwarding control protocol (PFCP)-defined message. The PFCP-defined message is classified into a session message and a node message. The session message is also referred to as a session-related message or a session-level message. The node message is also referred to as a node-related message or a node-level message.

For the control plane network element and a user plane network element, after different terminal devices go online by using the user plane network element, different sessions for the terminal devices are established between the control plane network element and the user plane network element. In other words, each terminal device corresponds to one session, and each session is used to deliver control data of a corresponding terminal device. Therefore, the session message is used to exchange information about a specific terminal device between the control plane network element and the user plane network element. The node message is information exchange between the control plane network element and the user plane network element at a user plane network element layer, and does not involve session-related information exchange.

FIG. 5 is a schematic diagram of a general format of a PFCP message according to an embodiment of this application. As shown in FIG. 5, the PFCP message includes a message header and zero or more information elements (IE), where the information element is also referred to as an attribute. One octet in FIG. 5 includes eight bits, and one octet is also referred to as one byte.

The message header is of a variable-length structure, the first four bytes are in a fixed format, and a flag field in the message header is used to identify whether additional information is carried. FIG. 6 is a schematic diagram of a general format of a message header according to an embodiment of this application. As shown in FIG. 6, the message header is in a 4-byte alignment format. Specifically, the message header includes an S field, a message priority (MP) field, a follow on (FO) field, a spare field, a version number field, a message type field, a message length field, a field used to fill in an SEID (session endpoint identifier), a sequence number field, and a spare field.

If a value of the S field is 0, k=0, m=0, and n=5, indicating that the current message header does not include the SEID field. If the value of the S field is 1, k=1, m=5, and n=13, indicating that the $5^{th}$ octet to the 12th octet in the current message header include the SEID field. The MP field in the first row: If a value is 1, a priority is stored in a message priority field corresponding to a bit 5 to a bit 8 of the 16th octet. When a system is overloaded, the MP parameter can be carried in a message. A recipient preferentially processes a message with a higher priority and may discard a message with a lower priority. The FO field: If a packet carries a plurality of messages, a value of the FO in a message header of the last message is 0, and a value of the FO in a message header of each previous message is 1. The spare field is used to supplement four bytes and needs to be set to 0. The version number field: A current version number is 1. The message type field indicates a message type of a current message. The message length field indicates a length of another part in the current message that does not include the first fixed 4-byte part of the message header. The sequence number field: If the value of the S field is 0, the SN value needs to move forward and begin from the fifth byte. The sequence number actually represents a transaction. That is, an SN of a group of request messages need to be the same as that of a group of response messages, so that a sender can confirm a matching relationship of the response messages. In the SEID field, one SEID uniquely identifies one session, and a length thereof is 8 bytes.

As shown in FIG. 6, beginning from the fifth octet, filled content is related to a sequence of the flag fields in the first octet. The corresponding content is filled only when the content is sequentially filled based on the sequence of the flag fields from the bit 1 to the bit 8 in the first octet and the corresponding bit is 1.

FIG. 7 is a schematic diagram of a general format of a message header of a node message according to an embodiment of this application. A value of each flag field in the first octet in the message header of the node message is 0. Therefore, the message header includes only a message type, a message length, and a sequence number.

The sequence number needs to meet the following requirement: After receiving a packet with an unsupported PFCP version, a recipient responds with a "Version Not Supported Response message". In this case, the sequence number may be set to any value, and the recipient needs to ignore the sequence number.

It should be noted that, the sequence number herein actually represents a transaction. That is, an SN of a group of request messages need to be the same as that of a group of response messages, so that a sender can confirm a matching relationship of the response messages. The sequence number cannot be simply understood as a sequence number for order preserving.

The PFCP is an application-layer protocol, and reliability and order preserving need to be sensed at the application layer. Therefore, only the sequence number mechanism is provided at the protocol layer. How to use the mechanism depends on different applications. The different applications may be distinguished by PFCP sessions or subscriber-sessions. This is a relatively abstract PFCP step, and details are not described in this embodiment of this application.

In addition, the spare field in FIG. 7 needs to meet the following requirement: The sender sets the field to 0, and the recipient ignores check on the spare field.

FIG. 8 is a schematic diagram of a general format of a message header of a session message according to an embodiment of this application. A value of the S field is 1, and a filled SEID begins from a fifth octet. For other fields, refer to the foregoing explanations. Details are not described herein again.

It should be noted that the SEID in the message header is an SEID of a remote peer, that is, an SEID of a recipient. In a 5G scenario, the SEID in the message header is set to 0 in the following cases:

1. A session establishment request message (PFCP session establishment request message) is sent based on Sxa/Sxb/Sxc.

2. If the recipient fails to find a local session by using the SEID in the message header and needs to respond with a session context not found cause ("Session context not found" cause), the recipient sets the SEID to 0 in a message header of a response message.

3. When a request message is received, but an error occurs in parsing the request message (for example, a length or an IE is incorrect), and a response message is required to indicate the error, the SEID is set to 0 in a message header of the response message.

In addition to the foregoing message header, the PFCP message may optionally include an information element, where the information element is an attribute. The information element is encapsulated in a TLV format. The information element is classified into a grouped information element (grouped IE) and an embedded information element (embedded IE) according to an embedding relationship, where the embedded information element is a smallest information element unit. In other words, the grouped information element may include a plurality of embedded information elements.

In the PFCP, the information element is classified as follows: An information element with a category M indicates that the information element needs to be carried in a message. An information element with a category C indicates that the information element needs to be carried when a condition is met. An information element with a category CO indicates that the information element may be optionally carried when a condition is met. An information element with a category O indicates that the information element may be optionally carried in a message.

Figures 9, 10:
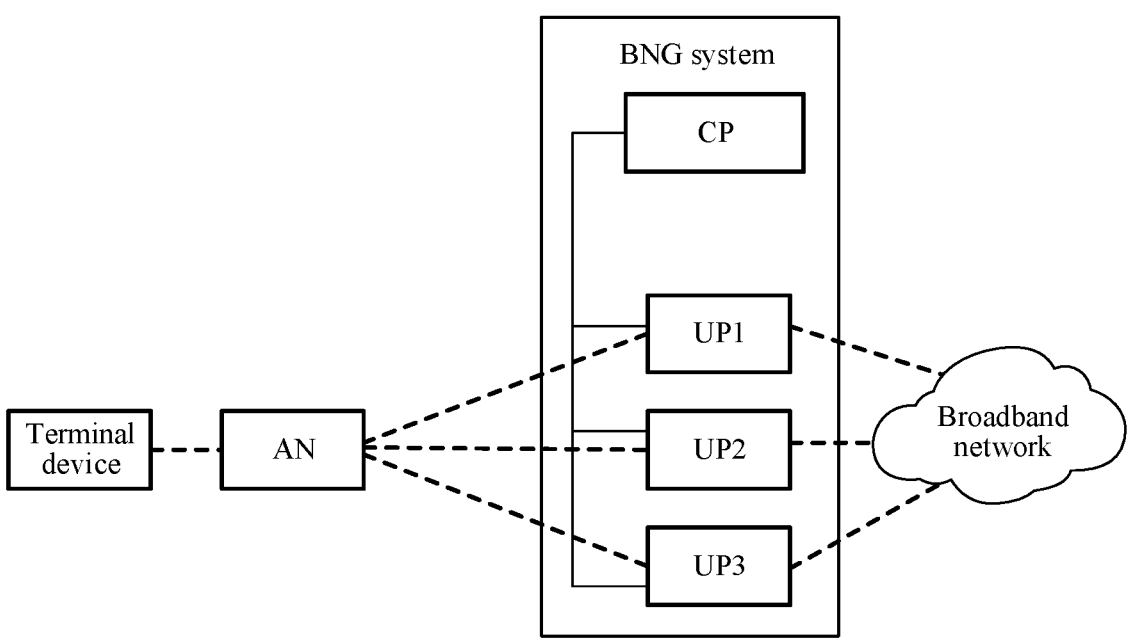
FIG. 9 is a schematic diagram of a general format of an information element in a PFCP message according to an embodiment of this application.
FIG. 10 is a schematic architectural diagram of a network system according to an embodiment of this application.

FIG. 9 is a schematic diagram of a general format of an information element in a PFCP message according to an embodiment of this application. As shown in FIG. 9, the information element includes a type field, which occupies two octets and is used to indicate a type of the information element. When a value of the type field ranges from 0 to 32767, the information element is a 3GPP standard IE; and when the value of the type field ranges from 32768 to 65535, the information element is an enterprise-customized IE. The information element further includes a length field, which occupies two octets and is a decimal number. The length indicates a length of other fields in the information element that do not include the Type+Length part. The information element further includes an enterprise identifier (Enterprise ID) field. For the 3GPP IE, this field does not exist. For the enterprise-customized IE, a value is an enterprise identifier in this case. The information element further includes an IE data part or a sub-IE set field. For a non-grouped information element, this field carries specific data of the information element (IE specific data). For a grouped information element, this field carries each embedded information element included in the grouped information element (content of a grouped IE).

In addition, in the packet forwarding control protocol (PFCP), the UP is referred to as a UP function (UPF), and the CP is referred to as a CP function (CPF). Names of the control plane network element and the user plane network element are not limited in this embodiment of this application. Optionally, the control plane network element may also be referred to as a CP device, and the user plane network element may be referred to as a UP device.

For the BNG system in which a forwarding function is decoupled from a control function, the broadband forum (BBF)-459 defines that a keepalive request packet sent by the terminal device is processed on the UP. In other words, the terminal device sends a request packet to an accessed UP, and the UP returns a keepalive response packet to the terminal device based on the keepalive request packet, so that the terminal device implements fault detection on a link and a peer end.

A message receiving and sending method, and an information obtaining, receiving, and sending method provided in embodiments of this application are applied to the foregoing BNG system in which a forwarding function is decoupled from a control function, to implement fault detection between a terminal device and a UP.

The following describes a system architecture provided in embodiments of this application.

FIG. 10 is a schematic architectural diagram of a network system according to an embodiment of this application. As shown in FIG. 10, the network system includes a terminal device, an access node (AN), and a virtual broadband network gateway system vBNG system, which is also referred to as a BNG system. The BNG system includes one control plane network element (the control plane network element is marked as a CP in FIG. 10) and a plurality of user plane network elements (the user plane network element is marked as a UP in FIG. 10). FIG. 10 includes three user plane network elements: a UP1, a UP2, and a UP3. For example, the CP and the UP may be located in different physical devices, and the plurality of UPs may be respectively located in different physical devices.

As shown in FIG. 10, the terminal device and the AN are connected to each other for communication. The AN is connected to any user plane network element for communication. Different physical sub-interfaces are configured on the AN. The different physical sub-interfaces match different virtual local area network (VLAN)/QinQ (QinQ is a representation manner of two layers of VLANs) ranges, and the different physical sub-interfaces are used to connect to different user plane network elements. In this way, the terminal device may send traffic to a user plane network element by using a physical sub-interface on the AN.

The control plane network element is separately connected to each user plane network element for communication. Specifically, communication is performed by using the three interfaces shown in FIG. 4. In addition, the control plane network element is further connected to a Radius server (not shown in FIG. 10) for communication, so that access of the terminal device is subsequently authenticated by using the Radius server.

In the system architecture shown in FIG. 10, it can be learned from the foregoing description that the control plane network element is configured to provide functions required by the BNG, such as subscriber management, an AAA service, address management, a Radius service, a PPPOE service, and a DHCP service. Any user plane network element is configured to provide functions required by the BNG, such as routing, a multicast service, quality of service (QoS), a forwarding service, an access control list (ACL) service, and a multi-protocol label switching (MPLS)/label distribution protocol (LDP) service. These functions are not described in detail in this embodiment of this application. For related content, refer to a standard document.

Specifically, the control plane network element is configured to: process a going-online request of the terminal device, and interact with the AAA server to perform user authentication, accounting, and authorization. The control plane network element may identify a user service level agreement (SLA) based on a user account of the terminal device, determine, by using access line information carried in the going-online request, that the terminal device goes online, and instruct user migration, to map the terminal device to a port accessed by the corresponding user plane network element.

The control plane network element delivers forwarding control entry information to the user plane network element after processing the user access. The user plane network element receives the forwarding control entry information delivered by the control plane network element, locally generates forwarding control entry information of the terminal device, executes a related service policy and forwards traffic, and advertises a route to the outside. A gateway learns the route, and steers traffic of the terminal device to the user plane network element based on the route.

The control plane network element and the user plane network element may have different forms. The control plane network element may run on an X86 server as a virtual network function (VNF), to implement virtualization. The user plane network element may have two forms. In one case, the user plane network element runs on an X86 server as a VNF. In this case, the user plane network element may also be referred to as a vUP. In another case, the user plane network element runs on a conventional hardware network device as a physical network function (PNF). In this case, the user plane network element may also be referred to as a pUP.

In addition, after the terminal device accesses a network by using a UP, once the UP is faulty or a connection link between the terminal device and the UP is faulty, services of all online users of the UP are interrupted. When the UP is faulty, user traffic on the UP needs to be steered to another user plane network element for forwarding. This process may also be referred to as user migration.

To improve UP device reliability, a UP backup function is provided for the UP. The UP backup function adds a plurality of UPs to a same UP backup group to implement backup or a load balancing relationship among the UPs. The UP backup function provides device-level redundancy protection for the UP, thereby improving UP reliability and ensuring uninterrupted transmission of user service data during user migration.

Warm backup is a common backup manner in the UP backup function. The warm backup refers to using a plurality of UPs managed by a same CP as a warm backup group. FIG. 11 is a schematic diagram of a warm backup group according to an embodiment of this application. As shown in FIG. 11, a UP1, a UP2, a UP3, and a UP4 form a warm backup group. A corresponding failover policy is configured for the warm backup group. As shown in FIG. 11, the failover policy may be as follows: when the UP1 is faulty, users on the UP1 are migrated to the UP2. For example, the failover policy may alternatively be: when the UP1 is faulty, users on the UP1 are migrated to the other three UPs in a load sharing manner. The failover policy is pre-defined, and subsequently, the UP1 in the warm backup group may dynamically migrate users based on the failover policy, so as to keep the users online.

It should be noted that, in a warm backup scenario, after the terminal device accesses the UP1, forwarding control entry information of the terminal device delivered by the control plane network element is delivered only to the UP1, and is not delivered to another UP in the failover policy. Subsequently, when the UP1 is faulty, the control plane network element perceives that the UP1 is faulty. In this case, if the control plane network element determines, based on the pre-defined failover policy, that a terminal device on the UP1 needs to be migrated to the UP2, the control plane network element delivers a dynamic media access control (MAC) update request to the UP2. After receiving the dynamic MAC update request, the UP2 sends an ARP packet to the AN in FIG. 10, where the ARP packet includes a MAC address and a VLAN tag of the BNG, the AN learns the MAC address and the VLAN tag of the BNG based on the ARP packet, and adds the MAC address and the VLAN tag of the BNG to a local MAC table. Subsequently, if the AN receives a keepalive request packet sent by the terminal device, the AN queries the local MAC table based on a destination MAC and a VLAN tag carried in the keepalive request packet. If the destination MAC and the VLAN tag carried in the keepalive request packet can hit the MAC and the VLAN tag learned from the received ARP packet in the local MAC table, the AN forwards the keepalive request packet by using an interface receiving the ARP packet, so that the AN forwards the keepalive request packet of the terminal device to the UP2.

In addition, after the control plane network element determines, based on the pre-defined failover policy, that the terminal device on the UP1 needs to be migrated to the UP2, the control plane network element further needs to indicate the UP2 to obtain the forwarding control entry information of the terminal device. For example, the control plane network element may deliver the forwarding control entry information of the terminal device to the UP2.

It should be noted that the foregoing process in which the AN forwards the keepalive request packet of the terminal device to the UP2 and the process in which the UP2 obtains the forwarding control entry information of the terminal device are independent of each other. Therefore, before the UP2 obtains the forwarding control entry information of the terminal device, the UP2 may first receive the keepalive request packet sent by the terminal device. In this case, the UP2 cannot respond to the keepalive request packet, and consequently the terminal device goes offline.

Based on this, an embodiment of this application provides a fault detection method. In the foregoing user migration scenario, if a terminal device performs keepalive detection, based on the method, it can be ensured that a user is not disconnected.

Based on the network system shown in FIG. 10, the following describes in detail the fault detection method provided in this embodiment of this application. In this embodiment of this application, to ensure that a user is not disconnected in a user migration process, when the terminal device goes online, keepalive information is delivered to another UP to which the terminal device is subsequently to be migrated. The keepalive information can ensure that the another UP responds to a keepalive request packet of the terminal device in a migration process of the terminal device. That is, the keepalive information is different from the forwarding control entry information, and the keepalive information only needs to include information required in the forwarding control entry information for responding to the keepalive request packet. In addition, when the terminal device goes offline, because a UP used by the terminal device to access a network next time is not clear, to avoid a system sending disorder, the keepalive information of the terminal device further needs to be deleted from the another UP. Based on the content, it can be learned that the fault detection method provided in this embodiment of this application includes content in three aspects: a first aspect is a process of delivering the keepalive information, a second aspect is a process of using the keepalive information, and a third aspect is a process of deleting the keepalive information. The content in the three aspects is respectively explained and described below by using three embodiments.

For ease of subsequent description, before the content in the foregoing three aspects is explained and described, the keepalive information in this embodiment of this application is first explained and described in detail. The following target keepalive information is keepalive information corresponding to a target terminal device. That is, different terminal devices correspond to different keepalive information. The keepalive information may also be referred to as user keepalive information, a user keepalive table, a keepalive table, or the like. For ease of subsequent description, keepalive information corresponding to a target terminal device is referred to as target keepalive information.

In some embodiments, the target keepalive information includes a terminal identifier, a gateway identifier, and an interface identifier. The terminal identifier is used to identify the target terminal device, the gateway identifier is used to identify the BNG system, and the interface identifier is used to identify an interface that is on the first user plane network element and exchanges traffic with the target terminal device. The first user plane network element is configured to forward traffic of the target terminal device when the second user plane network element is faulty. That is, in a scenario that the target terminal device accesses a network based on the second user plane network element, if the second user plane network element is faulty, the target terminal device is migrated from the second user plane network element to the first user plane network element, and the first user plane network element forwards the traffic of the target terminal device, so as to prevent the target terminal device from going offline. For both the first user plane network element and the second user plane network element in subsequent embodiments, refer to this explanation.

The terminal identifier includes a MAC address of the terminal. The gateway identifier includes a MAC address of the BNG.

For example, in a case that the target terminal device is a terminal device that sends traffic based on PPPOE, that is, the target terminal device is a PPPOE user, the terminal identifier includes a PPPOE session identifier (session ID) of the target terminal device and a MAC address of the terminal device, the gateway identifier is a MAC address of a gateway, and the interface identifier may be an index of an interface.

In a case that the target terminal device is a terminal device that sends traffic based on IPoE, that is, the target terminal device is an IPoE user, the terminal identifier includes a MAC address of the target terminal device, the gateway identifier includes a MAC address and an Internet protocol (IP) address of a gateway, and the interface identifier may be an index of an outbound interface.

When receiving a keepalive request packet sent by the target terminal device, the user plane network element needs to perform validity verification on the keepalive request packet. After the validity verification succeeds, it indicates that the target terminal device is a valid user, and the user plane network element responds to the keepalive request packet. The validity verification includes verification on a terminal identifier, a gateway identifier, and an interface identifier that are carried in the keepalive request packet, so as to determine whether a source of the keepalive request packet is valid. Therefore, the target keepalive information delivered by the control plane network element needs to include the terminal identifier, the gateway identifier, and the interface identifier that correspond to the target terminal device. In this way, the user plane network element can perform validity verification on the keepalive request packet based on the keepalive information. In other words, the terminal identifier, the gateway identifier, and the interface identifier are information that needs to be carried in the keepalive information.

It should be noted that, because a specific interface of the user plane network element from which the terminal device accesses the network is also pre-planned by an operator, the validity verification further includes verification on the interface identifier.

In addition, in a case that the target terminal device is a terminal device that sends traffic based on PPPOE, the target keepalive information further includes a local magic number and a client magic number that are negotiated when the target terminal device goes online.

The local magic number and the client magic number are negotiated between the target terminal device and the control plane network element in a process in which the target terminal device goes online. After the target terminal device goes online successfully, all PPP LCP packets sent by the target terminal device need to carry the client magic number, and the BNG checks whether the client magic number is consistent with the client magic number previously negotiated. All PPP LCP packets sent by the BNG need to carry the local magic number, and the target terminal device also checks whether the local magic number is consistent with the local magic number previously negotiated. In other words, the local magic number and the client magic number are also information that needs to be carried in the keepalive information. Detailed usage manners of the local magic number and the client magic number are described in subsequent embodiments.

Optionally, in some other embodiments, in a case that the target terminal device is a terminal device that sends traffic based on IPOE, if an IP address is allocated to the target terminal device when the target terminal device goes online, the target keepalive information further includes the IP address.

The IP address is also used to check whether the IPoE user is a valid user. That is, when receiving the keepalive request packet sent by the target terminal device, the user plane network element needs to check whether an IP address carried in the keepalive request packet is consistent with the IP address previously allocated through negotiation.

Similarly, if an IP address is allocated to the target terminal device in a process in which the target terminal device goes online, the target keepalive information includes the IP address. Correspondingly, if no IP address is allocated to the target terminal device in a process in which the target terminal device goes online, the target keepalive information does not include the IP address. In other words, the IP address is information that needs to be carried in the keepalive information when a condition is met.

Optionally, in some other embodiments, if the first user plane network element and the second user plane network element belong to a same warm backup group, the target keepalive information further includes an index of the warm backup group.

In a warm backup scenario, when the user plane network element receives the keepalive request packet sent by the target terminal device, the user plane network element responds to the keepalive request packet of the target terminal device only when the target terminal device is a user to be migrated to the user plane network element. Migrated users to be received by each user plane network element in the warm backup group are pre-determined based on a failover policy. Therefore, to-be-migrated users of each user plane network element in the warm backup group can be determined based on the index of the warm backup group, to determine whether the target terminal device is a user to be migrated to the user plane network element.

Similarly, in a warm backup scenario, the keepalive information carries the index of the warm backup group; and in other scenarios, the keepalive information does not need to carry the index of the warm backup group. In other words, the index of the warm backup group is information that needs to be carried in the keepalive information when a condition is met.

Optionally, in some other embodiments, if the target terminal device forwards traffic based on a virtual local area network (VLAN), the target keepalive information further includes a customer VLAN tag and/or a service VLAN tag.

A packet transmitted in QinQ (a layer 2 VPN protocol based on the IEEE 802.1Q technology) carries double layers of VLAN tags. An inner VLAN tag is a private VLAN tag of the user, that is, the customer VLAN tag (C-Tag for short). The terminal device transmits packets on a private network based on the inner VLAN tag. An outer VLAN tag is a public VLAN tag allocated by an operator to the user, that is, the service VLAN tag (S-Tag for short). The terminal device transmits packets on a public network based on the S-Tag.

In addition, both the customer VLAN tag and the service VLAN tag may not exist, or only one tag exists, or both the two tags exist, which is planned by the operator. That is, whether the keepalive information carries the customer VLAN tag and/or the service VLAN tag depends on whether the operator deploys a customer VLAN or a service VLAN. Therefore, the customer VLAN tag and the service VLAN tag are also information that needs to be carried in the keepalive information when a condition is met.

Optionally, in some other embodiments, in a case that the target keepalive information includes the customer VLAN tag, the target keepalive information may further include a customer VLAN priority, or certainly may not include the customer VLAN priority. In a case that the target keepalive information includes the service VLAN tag, the target keepalive information further includes a service VLAN priority, or certainly may not include the service VLAN priority. That is, in a case that the target keepalive information includes the customer VLAN tag, the customer VLAN priority is information that may be optionally carried in the keepalive information. In a case that the target keepalive information includes the service VLAN tag, the service VLAN priority is information that may be optionally carried in the keepalive information.

Based on the foregoing related descriptions of the keepalive information, the following describes in detail the message receiving and sending method, and the information obtaining, receiving, and sending method provided in embodiments of this application.

FIG. 12 is a flowchart of a message receiving method according to an embodiment of this application. As shown in FIG. 12, the message receiving method includes the following steps.

Step 1201. A first user plane network element obtains keepalive information of a terminal device, where the first user plane network element is configured to forward traffic of the terminal device when a second user plane network element is faulty.

Step 1202. The first user plane network element receives a migration begin request message sent by a control plane network element.

Step 1203. In response to receiving the migration begin request message, after receiving a first keepalive request packet sent by the terminal device, the first user plane network element sends a first keepalive response packet for the first keepalive request packet to the terminal device based on the keepalive information.

Detailed implementations of the foregoing steps are described in detail in subsequent embodiments, and are not described herein.

Based on the embodiment shown in FIG. 12, when a communication fault occurs between the terminal device and the second user plane network element, the terminal device is migrated from the second user plane network element to the first user plane network element. In a process in which the terminal device is migrated from the second user plane network element to the first user plane network element, the first user plane network element receives the migration begin request message delivered by the control plane network element. The migration begin request message is used to notify that the terminal device is currently in a migration process. In this scenario, if the terminal device sends the first keepalive request packet to the first user plane network element, even if the first user plane network element has not obtained forwarding control entry information of the terminal device, for example, the first user plane network element has not received the forwarding control entry information of the terminal device delivered by the control plane network element, the first user plane network element can still send the first keepalive response packet based on the keepalive information. Therefore, a case that the terminal device goes offline due to a keepalive detection failure in a migration process of the terminal device is avoided.

FIG. 13 is a flowchart of a message sending method according to an embodiment of this application. As shown in FIG. 13, the message receiving method includes the following steps.

Step 1301. A control plane network element sends keepalive information of a terminal device to a first user plane network element, where the first user plane network element is configured to forward traffic of the terminal device when a second user plane network element is faulty.

Step 1302. In response to a communication fault occurring between the terminal device and the second user plane network element, the control plane network element sends a migration begin request message to the first user plane network element, where the migration begin request message indicates the first user plane network element to send a first keepalive response packet to the terminal device based on the keepalive information, and the first keepalive response packet is a response to the first keepalive request packet sent by the terminal device.

Detailed implementations of the foregoing steps are described in detail in subsequent embodiments, and are not described herein.

Based on the embodiment shown in FIG. 13, when a communication fault occurs between the terminal device and the second user plane network element, the terminal device is migrated from the second user plane network element to the first user plane network element. In a process in which the terminal device is migrated from the second user plane network element to the first user plane network element, the control plane network element delivers the migration begin request message to the first user plane network element, to notify the first user plane network element that the terminal device is currently in a migration process. In this scenario, if the terminal device sends the first keepalive request packet to the first user plane network element, even if the first user plane network element has not obtained forwarding control entry information of the terminal device, for example, the first user plane network element has not received the forwarding control entry information of the terminal device delivered by the control plane network element, the first user plane network element can still send the first keepalive response packet based on the keepalive information. Therefore, a case that the terminal device goes offline due to a keepalive detection failure in a migration process of the terminal device is avoided.

FIG. 14 is a flowchart of an information obtaining method according to an embodiment of this application. As shown in FIG. 14, the information obtaining method includes the following steps.

Step 1401. When a second user plane network element works normally, a first user plane network element obtains keepalive information of a terminal device, and the first user plane network element is configured to forward traffic of the terminal device when the second user plane network element is faulty.

Step 1402. The first user plane network element stores the keepalive information.

Detailed implementations of the foregoing steps are described in detail in subsequent embodiments, and are not described herein.

To enable the first user plane network element to respond to keepalive detection of the terminal device in time when the second user plane network element is faulty, the first user plane network element needs to obtain the keepalive information of the terminal device when the second user plane network element works normally.

FIG. 15 is a flowchart of an information sending method according to an embodiment of this application. As shown in FIG. 15, the information sending method includes the following steps.

Step 1501. A control plane network element sends forwarding control entry information to a second user plane network element, where the forwarding control entry information is used by the second user plane network element to generate a first keepalive response packet, and the first keepalive response packet is a response to a first keepalive request packet sent by a terminal device.

Step 1502. When the second user plane network element works normally, the control plane network element sends keepalive information of the terminal device to a first user plane network element, where the keepalive information is used by the first user plane network element to generate a second keepalive response packet, the second keepalive response packet is a response to a second keepalive request packet sent by the terminal device, and the first user plane network element is configured to forward traffic of the terminal device when the second user plane network element is faulty.

Detailed implementations of the foregoing steps are described in detail in subsequent embodiments, and are not described herein.

When the terminal device accesses a network, the control plane network element sends the forwarding control entry information to the second user plane network element, so that the second user plane network element forwards the traffic of the terminal device based on the forwarding control entry information, and responds to keepalive detection of the terminal device based on the forwarding control entry information. In addition, to enable the first user plane network element to respond to the keepalive detection of the terminal device in time when the second user plane network element is faulty, the control plane network element needs to deliver the keepalive information of the terminal device to the first user plane network element to which the terminal device is to be migrated when the second user plane network element works normally.

A process in which the control plane network element delivers the keepalive information to the terminal device in FIG. 12 to FIG. 15 may be implemented by using an embodiment shown in FIG. 16. The target terminal device in the following embodiment is any terminal device. For clear description, keepalive information of the target terminal device is referred to as target keepalive information.

It should be noted that in the following embodiment, an example in which the control plane network element delivers a keepalive backup request message is used to describe how the first user plane network element obtains the keepalive information of the terminal device. Optionally, the control plane network element may alternatively deliver the keepalive information to the first user plane network element by using another type of packet. Optionally, the first user plane network element may obtain the keepalive information of the terminal device in another manner. For example, the first user plane network element obtains the keepalive information from another network element in advance. This is not limited in this embodiment of this application.

FIG. 16 is a schematic flowchart of a keepalive information delivering method according to an embodiment of this application. As shown in FIG. 16, the method includes the following steps.

Step 1601. A control plane network element sends a keepalive backup request message, or referred to as a keepalive information establishment request message, to a target user plane network element, where the keepalive backup request message carries target keepalive information for a target terminal device.

The keepalive backup request message further carries an identifier of the control plane network element, to indicate a sender of the keepalive backup request message.

The target user plane network element includes at least a first user plane network element. The first user plane network element is a user plane network element that replaces a second user plane network element to forward traffic of the target terminal device. That is, the first user plane network element is configured to forward the traffic of the terminal device when the second user plane network element is faulty, and the second user plane network element is a UP currently accessed by the target terminal device.

It should be noted that user migration is to migrate a terminal device on one user plane network element to another user plane network element, and a quantity of terminal devices on a single user plane network element is usually relatively large. That is, user migration is usually to migrate a batch of users from one user plane network element to another user plane network element. For ease of description, an example in which the target terminal device to be migrated in this embodiment of this application is only one terminal device is used for description.

For example, when the first user plane network element to which the target terminal device is to be migrated can be determined in advance, the target user plane network element is the first user plane network element. In this case, the target keepalive information is delivered only to the first user plane network element to which the target terminal device is to be migrated. For example, in the warm backup group scenario shown in FIG. 11, when it is determined that the UP1 is faulty based on the failover policy, a user on the UP1 is migrated to the UP2, so as to prevent the user from going offline. Therefore, in this scenario, the target keepalive information of the target terminal device may be only delivered to the UP2.

For another example, in the warm backup scenario shown in FIG. 11, the target user plane network element may be all user plane network elements other than the second user plane network element in the warm backup group, so that other user plane network elements subsequently respond to a keepalive request packet of the target terminal device based on the target keepalive information.

For another example, for ease of operation, in the warm backup scenario in FIG. 11, the target user plane network element may be all user plane network elements in the warm backup group.

In addition, in some embodiments, in step 1601, when detecting that the target terminal device goes online (that is, accesses a network by using the second user plane network element), the control plane network element may send the keepalive backup request message to the target user plane network element, so that the target user plane network element can subsequently quickly respond to a keepalive request packet of the target terminal device based on the stored target keepalive information.

For example, that the target terminal device goes online may include the following steps: The target terminal device sends a going-online request to the control plane network element based on a default user plane network element. The control plane network element performs authentication on the target terminal device based on the going-online request, after the authentication succeeds, determines a user plane network element (that is, the second user plane network element) to be accessed by the target terminal device, allocates an IP address to the target terminal device based on an address pool of the second user plane network element, delivers the IP address to the target terminal device, and then delivers forwarding control entry information of the target terminal device to the second user plane network element. The forwarding control entry information includes information such as an identifier and a next hop of the target terminal device, so that when receiving traffic of the target terminal device, the second user plane network element subsequently forwards the traffic based on the forwarding control entry information of the target terminal device.

That is, going online by the target terminal device is a process. Therefore, the control plane network element may deliver the target keepalive information of the target terminal device to the target user plane network element at any time point in the process in which the target terminal device goes online. For example, in a case that the target user plane network element is all the user plane network elements in the warm backup group, the control plane network element may deliver the target keepalive information to the target user plane network element when receiving the going-online request of the target terminal device. For another example, in a case that the target user plane network element is another user plane network element other than the second user plane network element, the control plane network element may alternatively deliver the target keepalive information to the target user plane network element after determining that the user plane network element to be accessed by the target terminal device is the second user plane network element. For another example, the control plane network element may alternatively deliver the target keepalive information to the target user plane network element after delivering the forwarding control entry information of the target terminal device to the second user plane network element.

Optionally, in some other embodiments, the control plane network element may alternatively deliver the target user keepalive information of the target terminal device to the target user plane network element after the target terminal device goes online. For example, the control plane network element may pre-configure a fixed duration, begin timing after the target terminal device goes online, and deliver the target keepalive information to the target user plane network element after a duration of the timing exceeds the fixed duration.

In other words, an occasion at which the control plane network element delivers the target keepalive information to the target user plane network element is not limited in this embodiment of this application, and the control plane network element may determine, based on a going-online status of the target terminal device, an occasion of delivering the target keepalive information to the target user plane network element. It only needs to be ensured that the target user plane network element can receive the target keepalive information subsequently before the second user plane network element or a link between the second user plane network element and the target terminal device is faulty. That is, in a case that the second user plane network element works normally, the target keepalive information is delivered to the target user plane network element.

Step 1602. The target user plane network element receives the keepalive backup request message sent by the control plane network element.

Based on related content of the interface between the control plane network element and the user plane network element in FIG. 1, the control plane network element may deliver the target keepalive information to the target user plane network element based on the management interface. Correspondingly, the target user plane network element receives the target keepalive information based on the management interface. Optionally, the control plane network element may deliver the target keepalive information to the target user plane network element based on the state control interface. Correspondingly, the target user plane network element receives the target keepalive information based on the state control interface.

Step 1603. The target user plane network element stores the target keepalive information.

That the target user plane network element stores the target keepalive information specifically means that the target user plane network element locally establishes a correspondence between the target keepalive information and the target terminal device. In other words, the target user plane network element may store a plurality of pieces of keepalive information, and the plurality of pieces of keepalive information is in a one-to-one correspondence with a plurality of terminal devices.

It should be noted that a taking-effect time period of the keepalive information (that is, a valid time period of the keepalive information) is limited only to a migration process of the target terminal device. In a scenario that the target terminal device is not migrated, each user plane network element still needs to respond to the keepalive request packet of the target terminal device based on local forwarding control entry information. This part of content is described in detail in a subsequent embodiment of how to use the keepalive information.

In addition, it can be learned from the foregoing description of the keepalive information that the keepalive information needs to include only information required in the forwarding control entry information for responding to the keepalive request packet. Therefore, in a process in which the target terminal device is migrated from the second user plane network element to the first user plane network element, the target user plane network element can respond to the keepalive request packet of the target terminal device based on the target keepalive information, but the target user plane network element cannot forward the traffic of the target terminal device based on the target keepalive information.

Step 1604. The target user plane network element sends a keepalive backup response message to the control plane network element.

After storing the target keepalive information, the target user plane network element needs to feed back a processing result to the control plane network element. Therefore, the target user plane network element returns the keepalive backup response message to the control plane network element.

In some embodiments, the keepalive backup response message carries a processing result of the target user plane network element for the keepalive backup request message, and the processing result of the target user plane network element for the keepalive backup request message may be that the keepalive backup request message is successfully stored, or the keepalive backup request message fails to be stored. Optionally, the keepalive backup response message does not carry the processing result. In this scenario, the keepalive backup response message may directly indicate the processing result, and therefore does not need to carry the processing result by using another field independently.

In addition, the keepalive backup response message further carries an identifier of the target user plane network element, which is used to indicate a sender of the keepalive backup response message.

In addition, the keepalive backup response message and the keepalive backup request message are sent through a same interface. That is, when the control plane network element sends the keepalive backup request message to the target user plane network element based on the management interface, the target user plane network element feeds back the keepalive backup response message to the control plane network element based on the management interface. Optionally, when the control plane network element sends the keepalive backup request message to the target user plane network element based on the state control interface, correspondingly, the target user plane network element feeds back the keepalive backup response message to the control plane network element based on the state control interface.

Step 1605. The control plane network element receives the keepalive backup response message sent by the target user plane network element.

After receiving the keepalive backup response message sent by the target user plane network element, the control plane network element may determine, based on the keepalive backup response message, whether the target user plane network element successfully stores the target keepalive information of the target terminal device. For example, when determining that the target user plane network element does not successfully store the target keepalive information of the target terminal device, the control plane network element may further resend the keepalive backup request message to the target user plane network element.

It can be learned that, in this embodiment of this application, the keepalive backup request message and the keepalive backup response message are extended, and keepalive information is delivered by using this pair of messages.

The following describes in detail packet formats of the keepalive backup request message and the keepalive backup response message.

It can be learned from the foregoing description of the PFCP message that, because the target keepalive information is keepalive information for the target terminal device, the keepalive backup request message and the keepalive backup response message in the embodiment in FIG. 16 may be PFCP-based session messages. It should be noted that the keepalive backup request message and the keepalive backup response message provided in this embodiment of this application may be messages based on another protocol. A specific protocol depends on a protocol that may be used for information exchange between the control plane network element and the user plane network element in the future.

Based on the explanation of each field in the message header of the session message in FIG. 8, the message type in a message header of the keepalive backup request message and the message type in a message header of the keepalive backup response message in the embodiment of FIG. 16 are both message types that need to be newly extended. The message type in the message header of the keepalive backup request message indicates that the current message is used for a PFCP user keepalive backup request (PFCP session keepalive backup request). The message type in the message header of the keepalive backup response message indicates that the current message is used for a PFCP user keepalive backup response (PFCP session keepalive backup response).

In addition to the message header, the PFCP message also includes an information element. Table 1 is information elements that need to be included in an information element of a keepalive backup request message according to an embodiment of this application. The information element includes a node identifier (Node ID) information element, a PPPOE keepalive backup information element, and an IPoE keepalive backup information element. The node identifier information element carries an identifier of a control plane network element, and the identifier of the control plane network element may be a device number of a CP, as shown in Table 1. The PPPOE keepalive backup information element carries keepalive information corresponding to a PPPOE user, and the IPOE keepalive backup information element carries keepalive information corresponding to an IPoE user.

An information element category of the node identifier information element in Table 1 is M. An information element category of the PPPOE keepalive backup information element and an information element category of the IPOE keepalive backup information element are C. For explanations of the information element category, refer to the foregoing content. Details are not described herein again.

In addition, as shown in Table 1, information element types of both the PPPOE keepalive backup information element and the IPOE keepalive backup information element are to-be-determined information element types.

TABLE 1

| Information element name (IE) | Information element category | Note | Information element type (IE Type) |
|---|---|---|---|
| Node identifier (Node ID) | M | Device number of a CP | Node ID |
| PPPoE keepalive backup | C | Add keepalive information of a PPPoE user | To be determined |
| IPoE keepalive backup | C | Add keepalive information of an IPoE user | To be determined |

It can be learned from the foregoing description of the keepalive information that the keepalive information may specifically include a plurality of pieces of different information. Therefore, in this embodiment of this application, the PPPOE keepalive backup information element and the IPoE keepalive backup information element may be specifically one grouped information element, and the grouped information element group includes a plurality of embedded information elements. That is, the keepalive backup request message includes a keepalive information grouped information element, where the keepalive information grouped information element includes a plurality of embedded information elements, and the plurality of embedded information elements carry the plurality of pieces of information in the keepalive information.

Table 2 shows embedded information elements corresponding to a PPPOE keepalive backup information element according to an embodiment of this application. Table 3 shows embedded information elements corresponding to an IPoE keepalive backup information element according to an embodiment of this application.

The embedded information elements corresponding to the PPPOE keepalive backup information element are information elements included in the keepalive information when the target terminal device is a PPPOE user. These information elements carry a terminal identifier, a gateway identifier, an interface identifier, a local magic number, and a client magic number. The terminal identifier includes a MAC address of the target terminal device and an SEID of the target terminal device, and the gateway identifier includes a MAC address of a gateway that forwards the traffic of the target terminal device to the BNG. The interface identifier includes an identifier of an interface that is on the target user plane network element and receives the traffic of the target terminal device. The identifier of the interface may be an index of the interface, and the index of the interface is reported by the target user plane network element to the control plane network element in advance. Information element categories of the information elements carrying the terminal identifier, the gateway identifier, the interface identifier, the local magic number, and the client magic number are M, which are information elements that need to be carried in the message.

In addition, the embedded information elements corresponding to the PPPOE keepalive backup information element further include information elements carrying a customer VLAN tag, a service VLAN tag, and a warm backup group index. Information element categories of the three information elements are C, which are information elements that need to be carried in the message when a condition is met. In addition, as shown in Table 2, the embedded information elements corresponding to the PPPOE keepalive backup information element further includes information elements carrying a customer VLAN priority (marked as C-Tag Priority in Table 1) and a service VLAN priority (marked as S-Tag Priority in Table 2). The two information elements are optional information elements.

Specifically, as shown in Table 2, the embedded information elements corresponding to the PPPOE keepalive backup information element include a MAC address information element, a PPPOE SEID information element, an Out-If-info information element, a C-Tag information element, an S-Tag information element, a PPP LCP magic number information element, a C-Tag Priority information element, an S-Tag Priority information element, and a warm backup group index information element.

The MAC address information element carries the MAC address of the target terminal device and the MAC address of the gateway. The PPPOE Session ID information element carries a PPPOE Session ID of the target terminal device. The Out-If-info information element carries the index of the interface. The C-Tag information element carries the customer VLAN tag. The S-Tag information element carries the service VLAN tag. The PPP LCP magic number information element carries the local magic number and the client magic number. The C-Tag Priority information element carries the customer VLAN priority. The S-Tag Priority information element carries the service VLAN priority. The warm backup group index information element carries the warm backup group index.

TABLE 2

| Octets 1 and 2 | Type of a PPPoE keepalive backup information element = XX |
|---|---|
| Octets 3 and 4 | Length = n |

TABLE 2-continued

| Octets 5 and 6 | | Enterprise identifier = XXXX | |
|---|---|---|---|
| Information element name | Information element category | Note (Explanation of information carried in the information element) | IE type |
| MAC address | M | MAC address, where this IE can carry both a MAC address of a target terminal device and a MAC address of a gateway | |
| PPPoE Session ID | M | PPPoE Session ID | |
| Out-If-info | M | Interface index, which needs to be reported by a UP to a CP | |
| C-Tag | C | Customer VLAN tag | |
| S-Tag | C | Service VLAN tag | |
| PPP LCP magic number | M | Client magic number and local magic number negotiated through PPP LCP | |
| C-Tag Priority | O | Customer VLAN priority, which is used for encapsulating a PPP LCP echo-reply packet | To be determined |
| S-Tag Priority | O | Service VLAN priority, which is used for encapsulating a PPP LCP echo-reply packet | To be determined |
| Warm backup group index | C | Warm backup group index used in a warm backup scenario. Whether a user is in a warm backup failover state is queried based on the index, and if yes, a processing result is that there is no user forwarding table and a client detection packet of a keepalive table is hit | To be determined |

In addition, it should be noted that, in the embedded information elements in Table 2, the information element carrying the customer VLAN priority, the information element carrying the service VLAN priority, and the information element carrying the warm backup group index are information elements to be extended. For a specific format of another information element, refer to a related technology. This is not limited in this embodiment of this application.

FIG. 17 is a schematic diagram of a format of an information element carrying a customer VLAN priority according to an embodiment of this application. For ease of description, the information element carrying a customer VLAN priority is referred to as a customer VLAN priority information element for short. As shown in FIG. 17, a type of the customer VLAN priority information element is a to-be-determined type (marked as NN decimal in FIG. 17), a length is to be determined (a value of the length is marked as n in FIG. 17), and values include an enterprise identifier (Enterprise ID) and a customer VLAN priority (C-Tag Priority). In FIG. 17, an example in which the enterprise identifier is 2011 is used for description. In addition, the customer VLAN priority ranges from 0 to 7.

FIG. 18 is a schematic diagram of a format of an information element carrying a service VLAN priority according to an embodiment of this application. For ease of description, the information element carrying a service VLAN priority is referred to as a service VLAN priority information element for short. As shown in FIG. 18, a type of the service VLAN priority information element is NN decimal, a length is n, and values include an enterprise identifier (Enterprise ID) and a service VLAN priority. In FIG. 18, an example in which the enterprise identifier is 2011 is used for description. In addition, the service VLAN Priority (S-Tag Priority) ranges from 0 to 7.

FIG. 19 is a schematic diagram of a format of an information element carrying a warm backup group index according to an embodiment of this application. For ease of description, the information element carrying a warm backup group index is referred to as a warm backup group index information element for short. As shown in FIG. 19, a type of the warm backup group index information element is NN decimal, a length is n, and values include an enterprise identifier (Enterprise ID) and a warm backup group index. In FIG. 19, an example in which the enterprise identifier is 2011 is used for description. In addition, the warm backup group index is encoded as a 32-bit unsigned integer.

Table 3 shows embedded information elements corresponding to an IPoE keepalive backup information element according to an embodiment of this application. The embedded information elements corresponding to the IPOE keepalive backup information element are information elements included in the keepalive information when the target terminal device is an IPoE user. The information elements carry a terminal identifier, a gateway identifier, and an interface identifier. The terminal identifier includes a MAC address of the target terminal device. The gateway identifier includes a MAC address and an IP address of a gateway that forwards the traffic of the target terminal device to the BNG. The interface identifier includes an identifier of an outbound interface that is on the target user plane network element and receives the traffic of the target terminal device. The identifier of the outbound interface may be an index of the outbound interface, and the index of the outbound interface is reported by the target user plane network element to the control plane network element in advance. Information element categories of the information elements carrying the terminal identifier, the gateway identifier, and the interface identifier are M, which are information elements that need to be carried in the message.

In addition, the embedded information elements corresponding to the IPOE keepalive backup information element further include an information element carrying a customer VLAN tag, an information element carrying a service VLAN tag, and a warm backup group index information element. Information element categories of the three information elements are C, which are information elements that need to be carried in the message when a condition is met. In addition, the embedded information elements corresponding to the PPPOE keepalive backup information element further include a customer VLAN priority information element and a service VLAN priority information element. The two information elements are optional information elements.

Specifically, as shown in Table 3, the embedded information elements corresponding to the IPOE keepalive backup information element include a MAC address information ment, and the warm backup group index information element are information elements to be extended. For a specific format of another information element, refer to a related technology. This is not limited in this embodiment of this application. For specific formats of the customer VLAN priority information element, the service VLAN priority information element, and the warm backup group index information element, refer to related content in Table 2, and details are not described herein again.

TABLE 3

| Octets 1 and 2 | Type of an IPoE keepalive backup information element = XX |
| Octets 3 and 4 | Length = n |
| Octets 5 and 6 | Enterprise identifier = XXXX |

| Information element name | Information element category | Note (Explanation of information carried in the information element) | IE type |
|---|---|---|---|
| MAC address | M | User MAC address, where this IE can carry both a MAC address of a user and a MAC address of a gateway | |
| Out-If-info | M | Outbound interface index, which needs to be reported by a UP to a CP | |
| C-Tag | C | Customer VLAN | |
| S-Tag | C | Service VLAN | |
| UE IP address | C | UE IP address | |
| Gateway IP address | M | Gateway IP address, which can carry both an IPv4 gateway address and an IPv6 gateway address, or any gateway address of the two gateway addresses | To be determined |
| C-Tag Priority | O | Customer VLAN priority, which is used for encapsulating ARP Reply and NS packets | To be determined |
| S-Tag Priority | O | Service VLAN priority, which is used for encapsulating ARP Reply and NS packets | To be determined |
| Warm backup group index (Warm Backup Group Index) | C | Warm backup group index used in a warm backup scenario. Whether a user is in a warm backup failover state is queried based on the index, and if yes, a processing result is that there is no user forwarding table and a client detection packet of a keepalive table is hit | To be determined | element, an Out-If-info information element, a user IP address (UE IP Address) information element, a gateway IP address (Gateway IP Address) information element, a C-Tag information element, an S-Tag information element, a C-Tag Priority information element, an S-Tag Priority information element, and a warm backup group index information element.

The MAC address information element carries the MAC address of the target terminal device and the MAC address of the gateway. The Out-If-info information element carries the index of the outbound interface. The user IP address (UE IP Address) information element carries the IP address of the target terminal device. The gateway IP address (Gateway IP Address) information element carries the IP address of the gateway. The C-Tag information element carries the customer VLAN tag. The S-Tag information element carries the service VLAN tag. The C-Tag Priority information element carries the customer VLAN priority. The S-Tag Priority information element carries the service VLAN priority. The warm backup group index information element carries the warm backup group index.

In addition, it should be noted that, in the embedded information elements in Table 3, the gateway IP address information element, the customer VLAN priority information element, the service VLAN priority information ele- FIG. 20 is a schematic diagram of a format of a gateway IP address information element according to an embodiment of this application. As shown in FIG. 20, a type of the gateway IP address information element is a to-be-determined type (marked as XX in FIG. 20), a length is to-be-determined (marked as n in FIG. 20), and values include an enterprise identifier (Enterprise ID, and in FIG. 20, an example in which the enterprise identifier is 2011 is used for description), a V4 field, a V6 field, an IPV4 address field, an IPV6 address field, and a spare field.

The seventh octet in the gateway IP address information element is a flag field, the V4 field corresponds to the first bit of the flag field, and a value 1 of the bit indicates that the IPV4 gateway address is carried. The V6 field corresponds to the second bit of the flag field, and a value 1 of the bit indicates that the IPV6 gateway address is carried. The third bit to the eighth bit in the seventh octet are spare fields. The IPV4 address field carries an IPV4 address of the gateway, and the IPV6 address field carries an IPV6 address of the gateway.

The foregoing content is used to explain a packet format of the keepalive backup request message. The following describes a packet format of the keepalive backup response message.

Table 4 is information elements that need to be included in an information element of a keepalive backup response message according to an embodiment of this application.

The information elements include a node identifier and a processing result. The node identifier information element carries an identifier of a target user plane network element, and the identifier of the target user plane network element may be a device number of a UP, as shown in Table 4. The processing result information element carries a processing result of the target user plane network element for the keepalive backup request message.

In addition, information element categories of the node identifier information element and the processing result information element in Table 4 are both M, indicating that the node identifier information element and the processing result information element are information elements that need to be carried in the keepalive backup response message.

TABLE 4

| Information element name | Information element category | Note (Explanation of information carried in an information element) | IE type |
|---|---|---|---|
| Node identifier (Node ID) | M | Device number of a UP | Node ID |
| Processing result (Cause) | M | Processing result | Cause |

After the keepalive information is delivered based on the foregoing embodiment, if the second user plane network element accessed by the target terminal device is faulty, or a link between the target terminal device and the second user plane network element is faulty, the control plane network element migrates the target terminal device from the second user plane network element to the first user plane network element according to a pre-defined failover policy. In a process in which the target terminal device is migrated from the second user plane network element to the first user plane network element, the first user plane network element may respond, by using the following embodiment, to the keepalive request packet sent by the target terminal device, so as to prevent the target terminal device from going offline.

Figure 21:
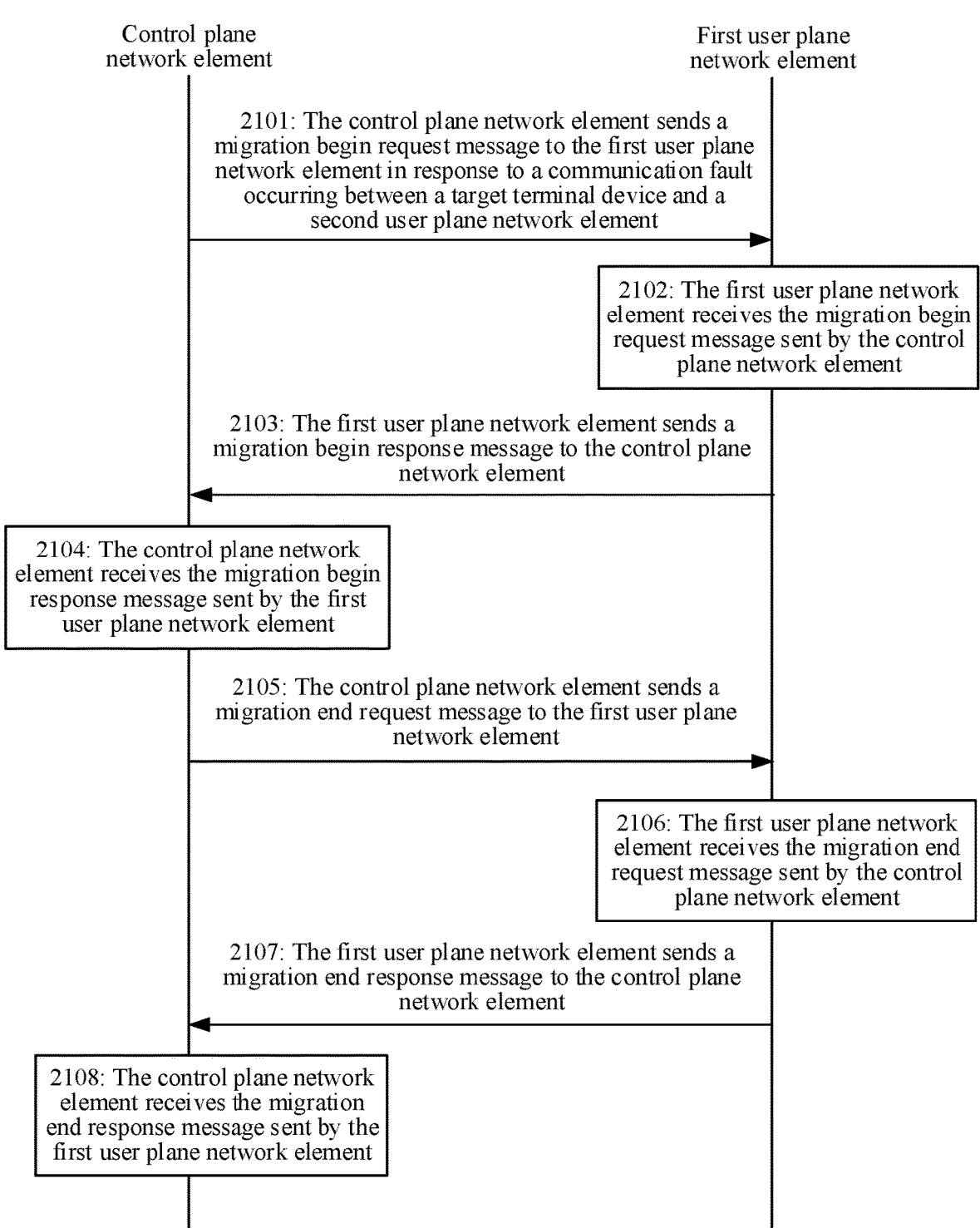
FIG. 21 is a process of delivering keepalive information by using an example in which a target terminal device is a DHCP user.

FIG. 21 is a schematic flowchart of a terminal device migration method according to an embodiment of this application. As shown in FIG. 21, the method includes the following steps.

Step 2101. The control plane network element sends a migration begin request message to the first user plane network element in response to a communication fault occurring between the target terminal device and the second user plane network element.

The migration begin request message is used to notify the target terminal device that migration begins.

That communication between the target terminal device and the second user plane network element is faulty may mean that the second user plane network element is faulty, or may mean that the link between the target terminal device and the second user plane network element is faulty. A detailed implementation of fault detection by the control plane network element is not limited in this embodiment of this application.

For example, the second user plane network element may report the fault to the control plane network element when detecting that the link between the second user plane network element and the target terminal device is faulty. When detecting that some functional modules of the second user plane network element are faulty, the second user plane network element reports the fault to the control plane network element. In these scenarios, when receiving the fault reported by the second user plane network element, the control plane network element may send the migration begin request message to the first user plane network element.

Optionally, in another fault detection scenario, for example, a third-party network element in a network detects the fault between the target terminal device and the second user plane network element. In this case, when receiving the fault reported by the third-party network element, the control plane network element may send the migration begin request message to the first user plane network element.

It should be noted that, if a current scenario is a warm backup scenario, that is, the first user plane network element and the second user plane network element belong to a same warm backup group, the control plane network element may deliver the migration begin request message to all user plane network elements other than the second user plane network element in the warm backup group.

In addition, the migration begin request message carries an identifier of the control plane network element, and is used to indicate a sender of the migration begin request message. The migration begin request message further carries mark information that can indicate that the user begins to migrate, and the first user plane network element may determine, based on the mark information, that the target terminal device begins to migrate. A packet format of the migration begin request message is described in detail subsequently, and is not described herein.

Step 2102. The first user plane network element receives the migration begin request message sent by the control plane network element.

Based on related content of the interface between the control plane network element and the user plane network element in FIG. 1, the control plane network element may deliver the migration begin request message to the first user plane network element based on the management interface. Correspondingly, the first user plane network element receives the migration begin request message based on the management interface. Optionally, the control plane network element may deliver the migration begin request message to the first user plane network element based on the state control interface. Correspondingly, the first user plane network element receives the migration begin request message based on the state control interface.

Step 2103. The first user plane network element sends a migration begin response message to the control plane network element.

Step 2104. The control plane network element receives the migration begin response message sent by the first user plane network element.

After receiving the migration begin request message sent by the control plane network element, the first user plane network element needs to feed back the migration begin response message to the control plane network element.

The migration begin response message carries an identifier of the first user plane network element, and is used to indicate a sender of the migration begin response message. The migration begin response message may further carry a processing result of the first user plane network element for the migration begin request message. The processing result may be that the migration begin request message is successfully received currently, or the migration begin request message is not successfully received currently. A packet format of the migration begin response message is described in detail subsequently, and is not described herein.

Optionally, the migration begin response message may not carry the processing result. In this scenario, the migration begin response message may directly indicate the processing result, and therefore does not need to carry the processing result by using another field independently.

In addition, the migration begin response message and the migration begin request message are sent through a same interface. That is, when the control plane network element sends the migration begin request message to the first user plane network element based on the management interface, the first user plane network element feeds back the migration begin response message to the control plane network element based on the management interface. Optionally, when the control plane network element sends the migration begin request message to the first user plane network element based on the state control interface, correspondingly, the first user plane network element feeds back the migration begin response message to the control plane network element based on the state control interface.

In a process in which the target terminal device is migrated from the second user plane network element to the first user plane network element, the control plane network element delivers forwarding control entry information of the target terminal device to the first user plane network element, so that the first user plane network element updates a locally stored forwarding control entry information set based on an indication of the control plane network element. Therefore, the updated forwarding control entry information set includes forwarding control entry information matching a second keepalive request packet sent by the target terminal device, that is, includes the forwarding control entry information of the target terminal device. In this way, migration of the target terminal device from the second user plane network element to the first user plane network element is completed. After migration of the target terminal device is completed, the first user plane network element may be notified, by using the following step 2105, that migration of the target terminal device is completed.

Step 2105. The control plane network element sends a migration end request message to the first user plane network element.

The migration end request message is used to notify the target terminal device that migration ends.

After the control plane network element sends the forwarding control entry information of the target terminal device to the first user plane network element, the first user plane network element may advertise a route based on the forwarding control entry information, so that the gateway steers the traffic of the target terminal device to the first user plane network element, thereby implementing migration of the target terminal device. Therefore, that the control plane network element sends the forwarding control entry information of the target terminal device to the first user plane network element may indicate that the target terminal device is successfully migrated. In this case, the control plane network element may send the migration end request message to the first user plane network element.

The migration end request message carries the identifier of the control plane network element, and is used to indicate a sender of the migration end request message. The migration end request message further carries mark information that can indicate that the user ends migration, and the first user plane network element may determine, based on the mark information, that the target terminal device ends migration. A packet format of the migration end request message is described in detail subsequently, and is not described herein.

Step 2106. The first user plane network element receives the migration end request message sent by the control plane network element.

Based on related content of the interface between the control plane network element and the user plane network element in FIG. 1, the control plane network element may deliver the migration end request message to the first user plane network element based on the management interface. Correspondingly, the first user plane network element receives the migration end request message based on the management interface. Optionally, the control plane network element may deliver the migration end request message to the first user plane network element based on the state control interface. Correspondingly, the first user plane network element receives the migration end request message based on the state control interface.

Step 2107. The first user plane network element sends a migration end response message to the control plane network element.

Step 2108. The control plane network element receives the migration end response message sent by the first user plane network element.

The migration end response message carries the identifier of the first user plane network element and a processing result of the first user plane network element for the migration end request message.

After receiving the migration end request message sent by the control plane network element, the first user plane network element needs to feed back the migration end response message to the control plane network element.

The migration end response message carries the identifier of the first user plane network element, and is used to indicate a sender of the migration end response message. The migration end response message further carries the processing result of the first user plane network element for the migration end request message. The processing result may be that the migration end request message is successfully received currently, or the migration end request message is not successfully received currently. A packet format of the migration end response message is described in detail subsequently, and is not described herein.

Optionally, the migration end response message may not carry the processing result. In this scenario, the migration end response message may directly indicate the processing result, and therefore does not need to carry the processing result by using another field independently.

In addition, the migration end response message and the migration end request message are sent through a same interface. In other words, when the control plane network element sends the migration end request message to the first user plane network element based on the management interface, the first user plane network element feeds back the migration end response message to the control plane network element based on the management interface. Optionally, when the control plane network element sends the migration end request message to the first user plane network element based on the state control interface, correspondingly, the first user plane network element feeds back the migration end response message to the control plane network element based on the state control interface.

Based on the embodiment shown in FIG. 21, the first user plane network element may determine when the target terminal device begins migration and when the target terminal device ends migration, so as to respond to the keepalive request packet based on the target keepalive information in the migration process of the target terminal device, and respond to the keepalive request packet based on the forwarding control entry information in another time period. In some embodiments, when the updated forwarding control entry information set includes the forwarding control entry information matching the second keepalive request packet, the first user plane network element receives the migration end request message sent by the control plane network element, receives the second keepalive request packet after receiving the migration end request message, and sends a second keepalive response packet for the second keepalive request packet to the terminal device based on the forwarding control entry information. When the updated forwarding control entry information set does not include the forwarding control entry information matching the second keepalive request packet, the first user plane network element receives the migration end request message sent by the control plane network element; after receiving the migration end request message, receives the second keepalive request packet sent by the terminal device; and discards the second keepalive request packet.

For example, after the UP receives the migration end request message delivered by the CP, if the UP receives the second keepalive request packet sent by the target terminal device, the UP discards the second keepalive request packet when the second keepalive request packet does not hit locally stored forwarding control entry information, and does not query the keepalive information.

In other words, the embodiment shown in FIG. 21 is used to help the first user plane network element determine a keepalive information valid time period of the target keepalive information. The keepalive information valid time period is after the first user plane network element receives the migration begin request message and before the first user plane network element receives the migration end request message. The first user plane network element is allowed to respond to the keepalive request packet based on the target keepalive information within the keepalive information valid time period, and the first user plane network element is not allowed to respond to the keepalive request packet based on the target keepalive information within a time period other than the keepalive information valid time period.

It can be learned that, in this embodiment of this application, the migration begin request message, the migration end request message, the migration begin response message, and the migration end response message are extended, to implement the valid time period of the keepalive information by using the two pairs of messages.

The following describes in detail packet formats of the migration begin request message, the migration end request message, the migration begin response message, and the migration end response message. It can be learned from the foregoing related descriptions of the PFCP that the node message in the PFCP is information exchange between a control plane network element and a user plane network element at a user plane network element layer, and does not involve session-related information exchange. When the control plane network element notifies a user to begin or end migration, it is unnecessary to notify a specific user to begin or end migration. Therefore, the migration begin request message, the migration end request message, the migration begin response message, and the migration end response message may be specifically PFCP-based node messages. In this way, the migration begin request message, the migration end request message, the migration begin response message, and the migration end response message all include a message header and an information element.

Table 5 shows message types in message headers of a PFCP-based migration begin request message, a PFCP-based migration end request message, a PFCP-based migration begin response message, and a PFCP-based migration end response message that are extended in this embodiment of this application. As shown in Table 5, the message types in the message headers of the migration begin request message, the migration end request message, the migration begin response message, and the migration end response message are all to-be-determined message types, and functions of corresponding messages may be determined by using the message types.

The message type of the PFCP-based migration begin request message is used to indicate that the current message is a PFCP user migration begin request message. The message type of the PFCP-based migration begin response message is used to indicate that the current message is a response message for the migration begin request message, that is, the current message is a PFCP migration begin response message.

The message type of the PFCP-based migration end request message is used to indicate that the current message is a PFCP user migration end request message. The message type of the PFCP-based migration end response message is used to indicate that the current message is a response message for the migration end request message, that is, the current message is a PFCP migration end response message.

TABLE 5

| Message type value | Message function |
|---|---|
| To be determined | Message: PFCP Session Migration Begin Request PFCP user migration begin request |
| To be determined | Message: PFCP Session Migration Begin Response PFCP user migration begin response |
| To be determined | Message: PFCP Session Migration End Request PFCP user migration end request |
| To be determined | Message: PFCP Session Migration End Response PFCP user migration end response |

Table 6 is a schematic table of information elements in a PFCP-based migration begin request message according to an embodiment of this application. As shown in Table 6, the PFCP-based migration begin request message includes two information elements, which are a node identifier (node ID) and a slot identifier (slot ID).

The node identifier carries an identifier of a control plane network element, and the identifier of the control plane network element may be a device number of a CP, as shown in Table 6. The node identifier is an information element that needs to be carried in the migration begin request message, and correspondingly, an information element category of the node identifier in Table 6 is M. The slot identifier carries a slot identifier on a first user plane network element, and the slot identifier indicates a slot that is on the first user plane network element and exchanges traffic with a target terminal device. The slot identifier is an information element that needs to be carried in the migration begin request message when a condition is met, and correspondingly, an information element category of the slot identifier in Table 6 is C. The condition herein is specifically as follows: If a recipient of the migration begin request message is used to receive the target terminal device after migration, that is, the recipient of the migration begin request message is the first user plane network element, the migration begin request message carries the slot identifier. If the recipient of the migration begin request message is not the first user plane network element, in this case, the migration begin request message does not carry the slot identifier. Therefore, as shown in Table 6, the slot identifier carries identifiers of o+ slots.

TABLE 6

| Information element name | Information element category | Note (Explanation of information carried in an information element) | IE type |
|---|---|---|---|
| Node identifier (node ID) | M | Device number of a CP | Node ID |
| Slot identifier (slot ID) | C | ID of a slot in which a migrated user is to be received, where o+ slot IDs may be carried | Slot ID |

The foregoing slots are explained as follows: A hardware device corresponding to a BNG is usually frame-shaped, and a frame may generally have a plurality of slots into which an interface board can be inserted. In this way, each slot may be inserted with one interface board, each interface board may provide 1 to n interfaces, and a forwarding plane and a control plane of each interface board are independent. In this way, one UP corresponds to one or more slots, and each UP corresponds to a forwarding plane and a control plane. An objective of carrying the slot identifier in the migration begin request message is as follows: The first user plane network element may determine, based on the migration begin request message, slots that currently receive a keepalive request packet sent by the terminal device, and subsequently may send a keepalive response packet to the terminal device based on these slots without sending the keepalive response packet to the terminal device by using all slots, thereby saving slot resources.

That is, the slot identifier carried in the migration begin request message is used to narrow a range affected by user migration. In this way, only a forwarding plane of a UP corresponding to an interface board of a slot on which user migration occurs needs to send the keepalive request packet that cannot hit the forwarding control entry information to a control plane of the UP. After receiving the keepalive request packet, the control plane of the UP queries locally stored keepalive information, and responds to the keepalive request packet only when the keepalive request packet hits the locally stored keepalive information.

Optionally, the migration begin request message may not carry the slot identifier. This is not limited in this embodiment of this application.

Table 7 is a schematic table of information elements in a PFCP-based migration begin response message according to an embodiment of this application. As shown in Table 7, the PFCP-based migration begin response message includes two information elements, which are a node identifier (node ID) and a processing result (Cause).

The node identifier carries an identifier of a first user plane network element, and the identifier of the first user plane network element may be a device number of a UP, as shown in Table 7. The processing result carries a processing result of the first user plane network element for the migration begin request message.

In Table 7, information element categories of the node identifier and the processing result are both M, indicating that the node identifier and the processing result are information elements that need to be carried in the migration begin response message.

TABLE 7

| Message name | Message category | Note (Explanation of information carried in an information element) | IE type |
|---|---|---|---|
| Node ID | M | Device number of a UP | Node ID |
| Cause | M | Processing result | Cause |

Table 8 is a schematic table of information elements in a PFCP-based migration end request message according to an embodiment of this application. As shown in Table 8, the PFCP-based migration end request message includes two information elements, which are a node identifier (node ID) and a slot identifier.

TABLE 8

| Message name | Message category | Note (Explanation of information carried in an information element) | IE type |
|---|---|---|---|
| Node ID | M | Device number of a CP | Node ID |
| Slot ID | C | ID of a slot in which user migration is completed, where o+ slot IDs may be carried | Slot ID |

The node identifier information element carries an identifier of a control plane network element, and the identifier of the control plane network element may be a device number of a CP, as shown in Table 8. The slot identifier also carries a slot identifier on a first user plane network element, and the slot identifier indicates a slot that is on the first user plane network element and exchanges traffic with a target terminal device. The slot identifier is also an information element that needs to be carried in the migration begin request message when a condition is met. Correspondingly, an information element category of the node identifier in Table 8 is C. Therefore, as shown in Table 8, the slot identifier carries identifiers of o+ slots.

Table 9 is a schematic table of information elements in a PFCP-based migration end response message according to an embodiment of this application. As shown in Table 9, the PFCP-based migration end response message includes two information elements, which are a node identifier (node ID) and a processing result (Cause).

The node identifier carries an identifier of a first user plane network element, and the identifier of the first user plane network element may be a device number of a UP, as shown in Table 9. The processing result indicates a processing result of the first user plane network element for the migration end request message.

In Table 9, information element categories of the node identifier and the processing result are both M, indicating that the node identifier and the processing result are information elements that need to be carried in the user migration data response message.

TABLE 9

| Message name | Message category | Note (Explanation of information carried in an information element) | IE type |
|---|---|---|---|
| Node ID | M | Device number of a UP | Node ID |
| Cause | M | Processing result | Cause |

In the information elements in Table 6 to Table 9, the slot identifier is a to-be-extended information element. FIG. 23A and FIG. 23B are schematic diagrams of a format of an information element carrying slot identification information according to an embodiment of this application. For ease of description, the information element carrying the slot identification information is referred to as a slot identification information element for short. As shown in FIG. 22, a type in the slot identification information element is a to-be-determined type (marked as NN decimal in FIG. 22), a length is to-be-determined (marked as n in FIG. 22), and values include an enterprise identifier (Enterprise ID, an example in which the enterprise identifier is 2011 is used for description in FIG. 22) and a slot identifier (slot ID) field.

Based on the embodiment shown in FIG. 21, the first user plane network element can determine a keepalive information valid time period of the target keepalive information. The keepalive information valid time period is after the first user plane network element receives the migration begin request message and before the first user plane network element receives the migration end request message. The first user plane network element may respond to the keepalive request packet by using the following embodiment shown in FIG. 23A and FIG. 23B within the keepalive information valid time period. The following describes this process in detail.

FIG. 23A and FIG. 23B are a flowchart of a method for responding to a keepalive request packet according to an embodiment of this application. As shown in FIG. 23A and FIG. 23B, the method includes the following steps.

Step 2301. A control plane network element sends forwarding control entry information to a second user plane network element.

When a terminal device accesses a network, if a current control plane network element determines that the terminal device needs to access the network by using the second user plane network element, the control plane network element sends the forwarding control entry information to the second user plane network element. The forwarding control entry information has two functions. One function is that when receiving a service packet sent by the terminal device, the second user plane network element searches for a next hop of the service packet based on the forwarding control entry information, and then continues to forward the service packet based on the next hop, thereby forwarding service traffic of the terminal device. Another function is that when receiving a first keepalive request packet sent by the terminal device, the second user plane network element sends a first keepalive response packet to the terminal device based on the forwarding control entry information, that is, the following step 2302.

For related explanations of step 2301, refer to the process in which a terminal device goes online in the embodiment in FIG. 16. Details are not described herein again.

Step 2302. In response to the received forwarding control entry information, after receiving a first keepalive request packet sent by a target terminal device, the second user plane network element sends a first keepalive response packet for the first keepalive request packet to the target terminal device based on the forwarding control entry information.

Step 2303. When the second user plane network element works normally, the control plane network element sends keepalive information of the target terminal device to a first user plane network element.

Step 2304. The first user plane network element stores the keepalive information.

For implementation processes of step 2303 and step 2304, also refer to the embodiment in FIG. 16. Details are not described herein again.

Step 2305. In response to a communication fault occurring between the terminal device and the second user plane network element, the control plane network element sends a migration begin request message to the first user plane network element.

For an implementation process of step 2305, refer to the embodiment shown in FIG. 21. Details are not described herein again.

Step 2306. In response to receiving the migration begin request message, after receiving a second keepalive request packet sent by the target terminal device, the first user plane network element sends a second keepalive response packet for the second keepalive request packet to the target terminal device based on the keepalive information.

In a process in which the target terminal device is migrated from the second user plane network element to the first user plane network element, if the first user plane network element receives a second keepalive request packet sent by the target terminal device, the first user plane network element may first determine, based on information carried in the second keepalive request packet, whether forwarding control entry information corresponding to the target terminal device can be found, and when the forwarding control entry information is not found (that is, the forwarding control entry information is not hit), determine whether the second keepalive request packet can hit (that is, match) the keepalive information.

In other words, after receiving the migration begin request message, if the first user plane network element receives the second keepalive request packet sent by the target terminal device, the first user plane network element first queries stored forwarding control entry information based on the second keepalive request packet. When the second keepalive request packet successfully matches the locally stored forwarding control entry information, the first user plane network element responds to the second keepalive request packet based on the forwarding control entry information. When the second keepalive request packet fails to match the locally stored forwarding control entry information, the first user plane network element responds to the second keepalive request packet based on the keepalive information of the target terminal device.

Optionally, in the process in which the target terminal device is migrated from the second user plane network element to the first user plane network element, if the first user plane network element receives the second keepalive request packet sent by the target terminal device, the first user plane network element may directly determine whether the second keepalive request packet can hit the keepalive information.

It can be learned based on the foregoing explanation of the target keepalive information that, in some embodiments, the target keepalive information includes a terminal identifier, a gateway identifier, and an interface identifier. The terminal identifier is an identifier of the target terminal device, the gateway identifier is an identifier of a BNG system, and the interface identifier is an identifier of an interface that is on the first user plane network element and exchanges traffic with the target terminal device. In this scenario, that the second keepalive request packet can hit the target keepalive information specifically means: if a terminal identifier, a gateway identifier, and an interface identifier that are carried in the second keepalive request packet are respectively consistent with the terminal identifier, the gateway identifier, and the interface identifier that are included in the target keepalive information, determining that the terminal identifier, the gateway identifier, and the interface identifier respectively hit the target keepalive information, and further sending the second keepalive response packet to the target terminal device.

For example, in a scenario that the target terminal device is a PPPOE user, the terminal identifier includes a PPPOE session identifier of the target terminal device and a MAC address of the terminal device, the gateway identifier is a MAC address of a BNG system, and the interface identifier may be an interface index. In this case, that a terminal identifier carried in the second keepalive request packet is consistent with the terminal identifier included in the target keepalive information specifically means: A PPPOE session identifier carried in the second keepalive request packet is consistent with the PPPOE session identifier in the target keepalive information, a MAC address of a terminal device carried in the second keepalive request packet is consistent with the MAC address of the target terminal device in the target keepalive information, a MAC address of a BNG system carried in the second keepalive request packet is consistent with the MAC address of the BNG system included in the target keepalive information, and an interface index carried in the second keepalive request packet is consistent with the interface index included in the target keepalive information.

For another example, in a case that the target terminal device is an IPoE user, the terminal identifier includes a MAC address of the target terminal device, the gateway identifier includes a MAC address and an IP address of a BNG system, and the interface identifier may be an interface index. In this case, that a terminal identifier, a gateway identifier, and an interface identifier that are carried in the second keepalive request packet are respectively consistent with the terminal identifier, the gateway identifier, and the interface identifier that are included in the target keepalive information specifically means: A MAC address of a terminal device carried in the second keepalive request packet is consistent with the MAC address of the target terminal device in the target keepalive information, a MAC address of a BNG system carried in the second keepalive request packet is consistent with the MAC address of the BNG system included in the target keepalive information, an IP address of a BNG system carried in the second keepalive request packet is consistent with the IP address of the BNG system included in the target keepalive information, and an interface index carried in the second keepalive request packet is consistent with the interface index included in the target keepalive information.

In addition, in a scenario that the target terminal device is a PPPOE user, the second keepalive request packet further carries a client magic number in this case, and packet validity verification needs to be further performed based on the client magic number carried in the second keepalive request packet and a client magic number in the target keepalive information. Specifically, if the client magic number carried in the second keepalive request packet is consistent with the client magic number in the target keepalive information, the second keepalive response packet sent to the target terminal device further carries a local magic number in the target keepalive information, so that the target terminal device subsequently performs, based on the local magic number, validity verification on the second keepalive response packet sent by the first user plane network element.

In some other embodiments, in a case that the target terminal device is a terminal device that forwards traffic based on IPOE, if an IP address is allocated to the target terminal device when the target terminal device goes online, the target keepalive information further includes the IP address of the target terminal device. In this case, when the terminal identifier, the gateway identifier, and the interface identifier respectively hit the target keepalive information, the keepalive response packet is sent only when the IP address of the terminal device hits the target keepalive information. That the IP address of the terminal device hits the target keepalive information specifically means: An IP address of a terminal device carried in the second keepalive request packet is consistent with the IP address of the terminal device in the target keepalive information.

In some other embodiments, if the first user plane network element and the second user plane network element are user plane network elements in a same warm backup group, the target keepalive information further includes an index of the warm backup group. In this scenario, when the terminal identifier, the gateway identifier, and the interface identifier respectively hit the target keepalive information, terminal devices that can be migrated to the first user plane network element further need to be determined based on the index of the warm backup group, and if the target terminal device is one of the determined terminal devices, an operation of sending the second keepalive response packet to the target terminal device is performed. Correspondingly, if the target terminal device is not one of the determined terminal devices, the operation of sending the second keepalive response packet to the target terminal device is not performed.

In other words, in a warm backup scenario, when receiving a packet request packet sent by a user, the first user plane network element needs to query, by using a warm backup group index in the stored target keepalive information, whether the user is a user to be migrated to the first user plane network element, and replies a keepalive response packet only after determining that the user is a user to be migrated to the UP. If the user is not a user to be migrated to the first user plane network element, the first user plane network element does not reply a keepalive response packet.

In some other embodiments, if the target terminal device forwards traffic based on a virtual local area network VLAN, in this scenario, when the terminal identifier, the gateway identifier, and the interface identifier respectively hit the target keepalive information, the following operation further needs to be performed, so that the operation of sending the second keepalive response packet to the target terminal device can be performed.

Specifically, in a case that the target keepalive information includes a customer VLAN tag, if a customer VLAN tag carried in the second keepalive request packet is consistent with the customer VLAN tag in the target keepalive information, the operation of sending the second keepalive response packet to the target terminal device is performed. Correspondingly, in a case that the target keepalive information includes a service VLAN tag, if a service VLAN tag carried in the second keepalive request packet is consistent with the service VLAN tag in the target keepalive information, the operation of sending the second keepalive response packet to the target terminal device is performed.

In addition, in some other embodiments, in a case that the target keepalive information further includes a customer VLAN priority, the second keepalive response packet further carries the customer VLAN priority, so that a gateway between the target terminal device and the first user plane network element forwards the keepalive response packet based on the customer VLAN priority. Correspondingly, in a case that the target keepalive information further a service VLAN priority, the second keepalive response packet further carries the service VLAN priority, so that a gateway between the target terminal device and the first user plane network element forwards the keepalive response packet based on the service VLAN priority.

Step 2307. The control plane network element sends a migration end request message to the first user plane network element, where the migration end request message indicates the first user plane network element to send a third keepalive response packet to the target terminal device based on a locally stored forwarding control entry information set, and the third keepalive response packet is a response to the second keepalive request packet sent by the target terminal device.

That is, after receiving the migration end request message, if receiving the third keepalive request packet, the first user plane network element queries the stored forwarding control entry information based on the third keepalive request packet; when the third keepalive request packet successfully matches the locally stored forwarding control entry information, responds to the third keepalive request packet based on the forwarding control entry information; and when the third keepalive request packet fails to match the locally stored forwarding control entry information, discards the third keepalive request packet.

Based on the embodiment shown in FIG. 23A and FIG. 23B, after the first user plane network element receives the migration begin request message and before the first user plane network element receives the migration end request message (that is, the keepalive information valid time period), the first user plane network element can respond, based on the keepalive information, to the keepalive request packet sent by the terminal device, and the first user plane network element is not allowed to respond to the keepalive request packet based on the keepalive information within a time period other than the keepalive information valid time period.

In addition, the first user plane network element may further determine, based on a quantity of received keepalive request packets sent by the terminal device and an interval duration, whether a communication fault exists between the first user plane network element and the terminal device. For a specific implementation, refer to the foregoing related descriptions of keepalive detection. Details are not described herein again.

After the target terminal device accesses the second user plane network element of the BNG, if the target terminal device goes offline, a user plane network element accessed by the target terminal device next time may not be the second user plane network element, and some information (for example, an IP address) of the target terminal device may change when the target terminal device goes online next time, that is, the keepalive information of the target terminal device may change. Therefore, to avoid a system disorder, the target keepalive information stored in the target user plane network element may be deleted when the target terminal device goes offline, so that the control plane network element re-delivers the keepalive information of the target terminal device after the target terminal device goes online next time. The following describes this process.

Figure 24:
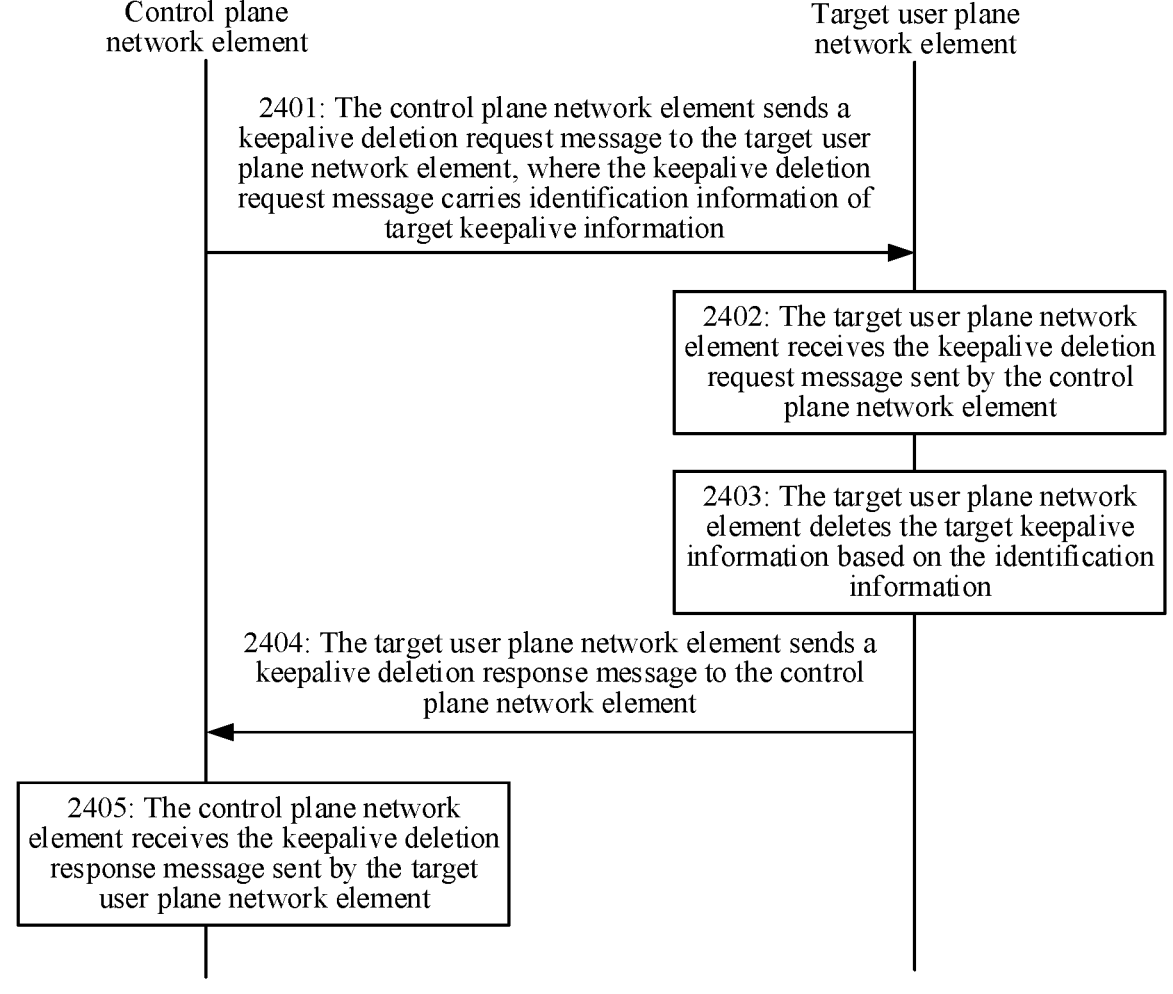
FIG. 24 is a schematic flowchart of notifying a user of beginning migration and ending migration according to an embodiment of this application.

FIG. 24 is a flowchart of a method for deleting keepalive information according to an embodiment of this application. As shown in FIG. 24, the method includes the following steps.

Step 2401. A control plane network element sends a keepalive deletion request message to a target user plane network element, where the keepalive deletion request message carries identification information of target keepalive information.

The target user plane network element herein is consistent with the target user plane network element in the embodiment shown in FIG. 16. That is, the control plane network element sends the keepalive deletion request message to a user plane network element to which the keepalive information is delivered.

In some embodiments, when detecting that the target terminal device goes offline, the control plane network element may send the keepalive deletion request message to the target user plane network element, to trigger the target user plane network element to delete the keepalive information.

For example, that the target terminal device goes offline may include the following steps: The target terminal device sends a going-offline request to the control plane network element by using a currently accessed user plane network element (for example, a second user plane network element), and the control plane network element terminates, based on the going-offline request, a service (for example, a charging service) provided for the target terminal device, and then notifies the second user plane network element to delete forwarding control entry information of the target terminal device.

It can be learned that, going offline by the target terminal device is also a process. Therefore, the control plane network element may deliver the keepalive deletion request message to the target user plane network element at any time point in the process in which the target terminal device goes offline. For example, the control plane network element may deliver the keepalive deletion request message to the target user plane network element when receiving the going-offline request. For another example, after notifying the second user plane network element to delete the forwarding control entry information of the target terminal device, the control plane network element may deliver the keepalive deletion request message to the target user plane network element.

Optionally, in some other embodiments, the control plane network element may alternatively deliver the keepalive deletion request message to the target user plane network element after the target terminal device goes offline. For example, the control plane network element may pre-configure a fixed duration, begin timing after the target terminal device goes offline, and deliver the keepalive deletion request message to the target user plane network element after a duration of the timing exceeds the fixed duration.

In addition, the target user plane network element may store keepalive information of a plurality of terminal devices. To enable the target user plane network element to successfully delete the target keepalive information corresponding to the target terminal device, the keepalive deletion request message carries the identification information of the target keepalive information, so that the target user plane network element can successfully find the target keepalive information based on the identification information, and then delete the target keepalive information.

The identification information of the target keepalive information is used to identify the target keepalive information. In some embodiments, the identification information includes a terminal identifier, a gateway identifier, and an interface identifier for the target terminal device. In some other embodiments, the identification information may further include a customer VLAN tag and/or a service VLAN tag for the target terminal device.

In a scenario that the target terminal device is a PPPOE user, the terminal identifier includes a PPPOE session identifier of the target terminal device and a MAC address of the terminal device, the gateway identifier is a MAC address of a BNG system, and the interface identifier is an interface index. In a case that the target terminal device is an IPoE user, the terminal identifier includes a MAC address of the target terminal device, the gateway identifier includes a MAC address of a BNG system, and the interface identifier may be an interface index.

In addition, for related explanations of the customer VLAN tag and the service VLAN tag in the identification information, refer to related content of the keepalive information, and details are not described herein again.

In addition, the keepalive deletion request message further carries an identifier of the control plane network element, and is used to indicate a sender of the keepalive deletion request message.

A packet format of the keepalive deletion request message is described in detail in a subsequent embodiment, and is not described herein.

Step 2402. The target user plane network element receives the keepalive deletion request message sent by the control plane network element.

The keepalive deletion request message carries the identification information of the target keepalive information.

Based on related content of the interface between the control plane network element and the user plane network element in FIG. 4, the control plane network element may deliver the keepalive deletion request message to the target user plane network element based on the management interface. Correspondingly, the target user plane network element receives the keepalive deletion request message based on the management interface. Optionally, the control plane network element may deliver the keepalive deletion request message to the target user plane network element based on the state control interface. Correspondingly, the target user plane network element receives the keepalive deletion request message based on the state control interface.

Step 2403. The target user plane network element deletes the target keepalive information based on the identification information.

In some embodiments, in a case that the identification information in step 2601 includes the terminal identifier, the gateway identifier, and the interface identifier, an implementation process in which the target user plane network element deletes the target keepalive information based on the identification information may be: if the terminal identifier, the gateway identifier, and the interface identifier in the identification information are respectively consistent with a terminal identifier, a gateway identifier, and an interface identifier included in the target keepalive information, deleting the target keepalive information.

For example, in a scenario that the target terminal device is a PPPOE user, the terminal identifier includes a PPPOE session identifier of the target terminal device and a MAC address of the terminal device, the gateway identifier is a MAC address of a BNG system, and the interface identifier may be an interface index. In this case, that the terminal identifier, the gateway identifier, and the interface identifier in the identification information are respectively consistent with a terminal identifier, a gateway identifier, and an interface identifier included in the target keepalive information specifically means: The PPPOE session identifier in the identification information is consistent with a PPPOE session identifier in the target keepalive information, the MAC address of the terminal device in the identification information is consistent with a MAC address of the target terminal device in the target keepalive information, the MAC address of the BNG system in the identification information is consistent with a MAC address of a BNG system included in the target keepalive information, and the interface index in the identification information is consistent with an interface index included in the target keepalive information.

For another example, in a case that the target terminal device is an IPoE user, the terminal identifier includes a MAC address of the target terminal device, the gateway identifier includes a MAC address of a BNG system, and the interface identifier may be an interface index. In this case, that the terminal identifier, the gateway identifier, and the interface identifier in the identification information are respectively consistent with a terminal identifier, a gateway identifier, and an interface identifier included in the target keepalive information specifically means: The MAC address of the terminal device in the identification information is consistent with a MAC address of the target terminal device in the target keepalive information, the MAC address of the BNG system in the identification information is consistent with a MAC address of a gateway included in the target keepalive information, and the interface index in the identification information is consistent with an interface index included in the target keepalive information.

In some other embodiments, if the target terminal device forwards traffic based on a virtual local area network VLAN, in a case that the identification information may further include a VLAN tag in addition to the terminal identifier, the gateway identifier, and the interface identifier, the target keepalive information is deleted only when the terminal identifier, the gateway identifier, and the interface identifier in the identification information meet a deletion requirement, and the VLAN tag in the identification information also meets the deletion requirement.

Specifically, in a case that the identification information further includes a customer VLAN tag, if the customer VLAN tag in the identification information is consistent with a customer VLAN tag in the target keepalive information, an operation of deleting the target keepalive information is performed. In a case that the identification information further includes a service VLAN tag, if the service VLAN tag in the identification information is consistent with a service VLAN tag in the target keepalive information, an operation of deleting the target keepalive information is performed.

Correspondingly, if the customer VLAN tag in the identification information is inconsistent with the customer VLAN tag in the target keepalive information, or if the service VLAN tag in the identification information is inconsistent with the service VLAN tag in the target keepalive information, the operation of deleting the target keepalive information is not performed.

Step 2404. The target user plane network element sends a keepalive deletion response message to the control plane network element.

In some embodiments, the keepalive deletion response message indicates a processing result of the target user plane network element for the keepalive deletion request message. After deleting the target keepalive information, the target user plane network element needs to feed back a processing result to the control plane network element. Therefore, the target user plane network element returns the keepalive deletion response message to the control plane network element. The keepalive deletion response message carries the processing result of the target user plane network element for the keepalive deletion request message. The processing result of the target user plane network element for the keepalive deletion request message may be a deletion success or a deletion failure.

Optionally, in some other embodiments, the keepalive deletion response message does not carry the processing result either. In this scenario, the keepalive deletion response message may directly indicate the processing result, and therefore does not need to carry the processing result by using another field independently.

Optionally, in some other embodiments, the keepalive deletion response message may be used only to respond to the keepalive deletion request message, and is not related to the processing result of deleting the target keepalive information. In this scenario, the target user plane network element may send the keepalive deletion response message before deleting the target keepalive information, or may send the keepalive deletion response message after deleting the target keepalive information. A sequence of the two operations is not limited in this embodiment of this application.

In addition, the keepalive deletion response message further carries an identifier of the target user plane network element, and is used to indicate a sender of the keepalive deletion response message.

In addition, the keepalive deletion response message and the keepalive deletion request message are sent through a same interface. That is, when the control plane network element sends the keepalive deletion request message to the target user plane network element based on the management interface, the target user plane network element feeds back the keepalive deletion response message to the control plane network element based on the management interface. Optionally, when the control plane network element sends the keepalive deletion request message to the target user plane network element based on the state control interface, correspondingly, the target user plane network element feeds back the keepalive deletion response message to the control plane network element based on the state control interface.

Step 2405. The control plane network element receives the keepalive deletion response message sent by the target user plane network element.

After receiving the keepalive deletion response message sent by the target user plane network element, the control plane network element may determine, based on the keepalive deletion response message, whether the target user plane network element successfully deletes the target keepalive information of the target terminal device. For example, when determining that the target user plane network element does not successfully delete the target keepalive information of the target terminal device, the control plane network element may further resend the keepalive deletion request message to the target user plane network element.

It can be learned that, in this embodiment of this application, the keepalive deletion request message and the keepalive deletion response message are extended, to control, when the target terminal device goes offline, the target user plane network element to delete the locally stored target keepalive information by using the pair of messages.

The following describes in detail packet formats of the keepalive deletion request message and the keepalive deletion response message.

Figure 26:
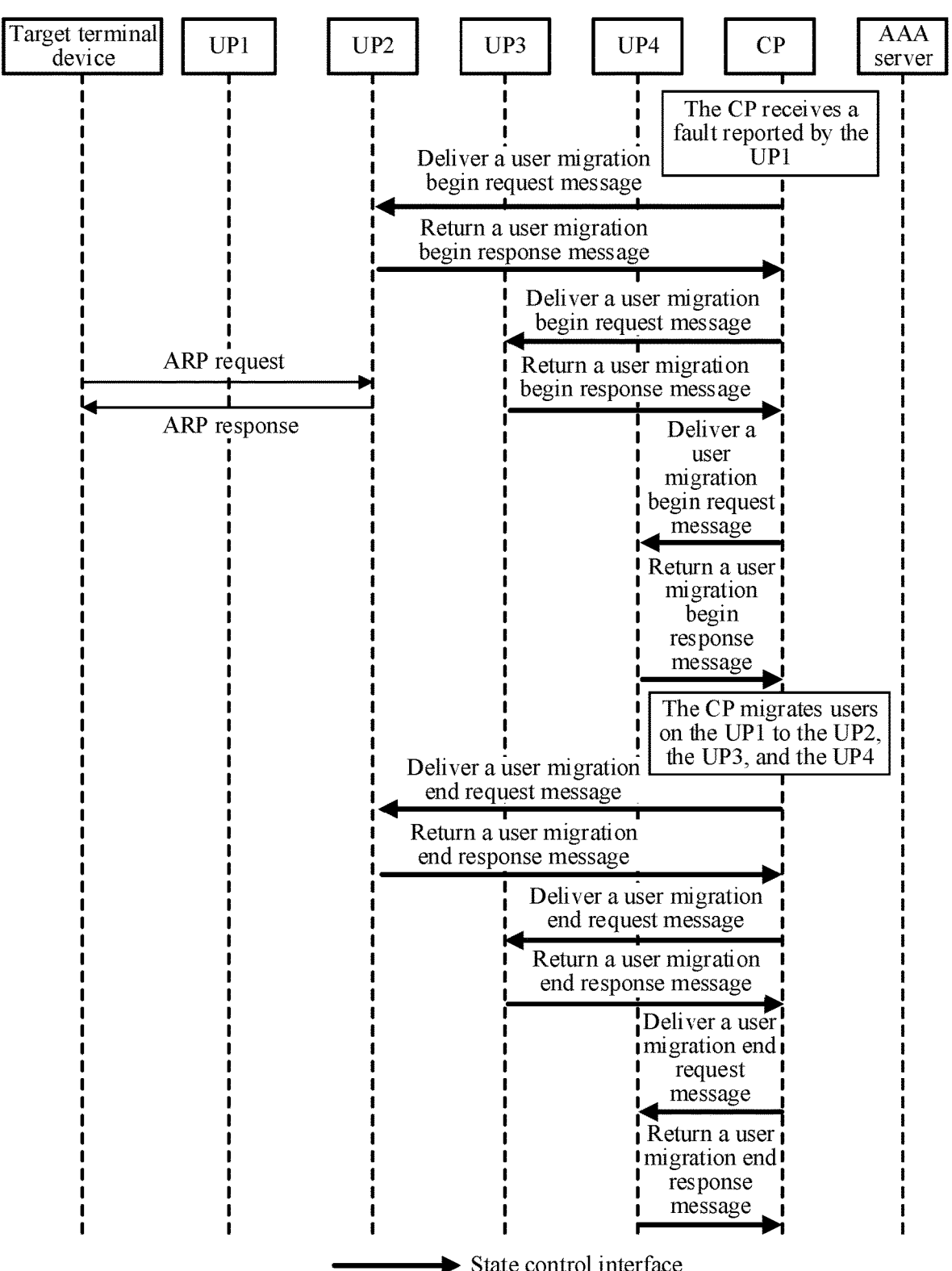
FIG. 26 is a flowchart of a method for deleting keepalive information according to an embodiment of this application.

Because the target keepalive information that needs to be deleted is keepalive information for the target terminal device, the keepalive deletion request message and the keepalive deletion response message in the embodiment in FIG. 26 may be PFCP-based session messages. It should be noted that the keepalive deletion request message and the keepalive deletion response message provided in this embodiment of this application may be messages based on another protocol. A specific protocol depends on a protocol that may be used for information exchange between the control plane network element and the user plane network element in the future.

When both the keepalive deletion request message and the keepalive deletion response message are PFCP-based session messages, both the keepalive deletion request message and the keepalive deletion response message include a message header and an information element, and the message header includes a message type. Table 10 shows message types in message headers of an extended keepalive deletion request message and an extended keepalive deletion response message in this embodiment of this application. As shown in Table 10, the message types in the message headers of the two messages, namely, the keepalive deletion request message and the keepalive deletion response message, are both to-be-determined message types, and functions of corresponding messages may be determined by using the message types.

The message type of the keepalive deletion request message is used to indicate that the current message is a PFCP user keepalive deletion request, that is, the current message is used to indicate to delete keepalive information. The message type of the keepalive deletion response message is used to indicate that the current message is a PFCP user keepalive deletion response, that is, the current message is a response message to the PFCP user keepalive deletion request.

TABLE 10

| Message type | Message |
| --- | --- |
| To be determined | Message: PFCP Session Keepalive Deletion Request PFCP user keepalive deletion request |
| To be determined | Message: PFCP Session Keepalive Deletion Response PFCP user keepalive deletion response |

Table 11 is information elements that need to be included in an information element of a keepalive deletion request message according to an embodiment of this application. The information element includes a node identifier information element, a PPPOE keepalive deletion information element, and an IPoE keepalive deletion information element. The node identifier information element carries an identifier of a control plane network element, and the identifier of the control plane network element may be a device number of a CP, as shown in Table 11. The PPPOE keepalive deletion information element carries identification information of keepalive information corresponding to a PPPOE user, and the IPOE keepalive backup information element carries identification information of keepalive information corresponding to an IPoE user.

TABLE 11

| Message name | Message category | Note (Explanation of information carried in an information element) | IE type |
| --- | --- | --- | --- |
| Node ID | M | Device number of a CP | Node ID |
| PPPoE Keepalive Deletion | C | PPPoE user keepalive table deletion | PPPoE Keepalive Deletion |
| IPoE Keepalive Deletion | C | IPoE user keepalive table deletion | IPoE Keepalive Deletion |

It can be learned from the foregoing description of the identification information of the keepalive information that the identification information of the keepalive information may specifically include a plurality of pieces of different information. Therefore, in this embodiment of this application, the PPPOE keepalive deletion information element and the IPOE keepalive deletion information element may be specifically a grouped information element, and the grouped information element group includes a plurality of embedded information elements.

Table 12 shows embedded information elements corresponding to a PPPOE keepalive deletion information element according to an embodiment of this application. Table 13 shows embedded information elements corresponding to an IPoE keepalive deletion information element according to an embodiment of this application.

The embedded information elements corresponding to the PPPOE keepalive deletion information element are information elements included in the identification information of the keepalive information when the target terminal device is a PPPOE user. As shown in Table 12, the information elements of the identification information carry a terminal identifier, a gateway identifier, and an interface identifier. The terminal identifier includes a MAC address of the target terminal device and a PPPOE session identifier (Session ID) of the target terminal device, and the gateway identifier includes a MAC address of a BNG system. The interface identifier includes an identifier of an interface that is on the target user plane network element and exchanges traffic with the target terminal device. The identifier of the interface may be an index of the interface. The index of the interface is reported by the target user plane network element to the control plane network element in advance. In Table 12, an information element indicating the interface identifier is marked as Out-If-info. Information element categories of the terminal identifier, the gateway identifier, and the interface identifier are M, which are information elements that need to be carried in the message.

TABLE 12

| Information element name | Information element category | Note | IE type |
|---|---|---|---|
| MAC address | M | MAC address, where this IE can carry both a MAC address of a user and a MAC address of a gateway | MAC address |
| PPPoE Session ID | M | PPPoE Session ID | PPPoE Session ID |
| Out-If-info | M | Outbound interface index | If-index |
| C-Tag | C | Customer VLAN | C-Tag |
| S-Tag | C | Service VLAN | S-Tag |

In addition, as shown in Table 12, the embedded information elements corresponding to the PPPOE keepalive deletion information element further includes a customer VLAN tag (marked as C-Tag in Table 12) and a service VLAN tag (marked as S-Tag in Table 12). Information element categories of the two information elements are C, which are information elements that need to be carried in the message when a condition is met.

Specifically, as shown in Table 12, the embedded information elements corresponding to the PPPOE keepalive deletion information element include a MAC address information element, a PPPOE SEID information element, an Out-If-info information element, a C-Tag information element, and an S-Tag information element.

The MAC address information element carries the MAC address of the target terminal device and the MAC address of the gateway. The PPPOE Session ID information element carries a PPPOE Session ID of the target terminal device. The Out-If-info information element carries the index of the interface. The C-Tag information element carries the customer VLAN tag. The S-Tag information element carries the service VLAN tag.

It should be noted that, in some embodiments, the identification information may include only the terminal identifier and the interface identifier. The reason why the MAC address of the gateway is included in Table 12 is that: the MAC address of the gateway and the MAC address of the terminal device (that is, a MAC address of a user) may be carried in a same information element (that is, the MAC address information element). Therefore, in a case that the message includes the MAC address information element, the MAC address of the gateway is also carried in the message.

Table 13 shows embedded information elements corresponding to an IPoE keepalive deletion information element according to an embodiment of this application. The embedded information elements corresponding to the IPOE keepalive deletion information element are information elements included in the identification information of the keepalive information when the target terminal device is an IPoE user. As shown in Table 13, these information elements carry a terminal identifier, a gateway identifier, and an interface identifier. The terminal identifier includes a MAC address of the target terminal device. The gateway identifier includes a MAC address of a gateway that forwards the traffic of the target terminal device to the BNG. The interface identifier includes an identifier of an outbound interface that is on the target user plane network element and receives the traffic of the target terminal device. The identifier of the outbound interface may be an index of the outbound interface, and the index of the outbound interface is reported by the target user plane network element to the control plane network element in advance. In Table 13, an information element indicating the interface identifier is marked as Out-If-info. Information element categories of the information elements such as the terminal identifier, the gateway identifier, and the interface identifier are M, which are information elements that need to be carried in the message.

TABLE 13

| Information element name | Information element category | Note | IE type |
|---|---|---|---|
| MAC address | M | User MAC address, where this IE can carry both a MAC address of a user and a MAC address of a gateway | MAC address |
| Out-If-info | M | Outbound interface index, which needs to be reported by a UPF to a CP | If-index |
| C-Tag | C | Customer VLAN | C-Tag |
| S-Tag | C | Service VLAN | S-Tag |

In addition, as shown in Table 13, the embedded information elements corresponding to the IPOE keepalive deletion information element further includes a customer VLAN tag (marked as C-Tag in Table 13) and a service VLAN tag (marked as S-Tag in Table 13). Information element categories of the two information elements are C, which are information elements that need to be carried in the message when a condition is met.

Specifically, as shown in Table 13, the embedded information elements corresponding to the IPOE keepalive deletion information element include a MAC address information element, an Out-If-info information element, a C-Tag information element, and an S-Tag information element.

The MAC address information element carries the MAC address of the target terminal device and the MAC address of the gateway. The Out-If-info information element carries the index of the interface. The C-Tag information element carries the customer VLAN tag. The S-Tag information element carries the service VLAN tag.

Table 14 is information elements that need to be included in an information element of a keepalive deletion response message according to an embodiment of this application. The information elements include a node identifier and a processing result. The node identifier information element carries an identifier of a target user plane network element, and the identifier of the target user plane network element may be a device number of a UP, as shown in Table 14. The processing result information element carries a processing result of the target user plane network element for the keepalive deletion request message.

In addition, information element categories of the node identifier information element and the processing result information element in Table 14 are both M, indicating that the node identifier information element and the processing result information element are information elements that need to be carried in the keepalive backup response message.

TABLE 14

| Information element name | Information element category | Note | IE type |
|---|---|---|---|
| Node ID | M | Device number of a UP | Node ID |
| Processing result (Cause) | M | Processing result | Cause |

In the foregoing embodiment, an example in which the control plane network element sends the keepalive deletion request to the user plane network element is used to describe how to delete the keepalive information. Optionally, in some other embodiments, the user plane network element may not delete the keepalive information under triggering of the control plane network element, and the user plane network element locally deletes the keepalive information. For example, the user plane network element may monitor a local forwarding control entry information set, and if monitoring that the local forwarding control entry information set includes forwarding control entry information of the target terminal device, delete the target keepalive information corresponding to the target terminal device. For another example, the user plane network element may delete the locally stored target keepalive information after responding to keepalive detection of the target terminal device once based on the target keepalive information. For another example, the user plane network element may perform timing after determining that the target terminal device begins to migrate, and delete the locally stored target keepalive information when a duration of the timing reaches a timing duration of a timer.

The following describes the foregoing embodiment by using an example in which the target terminal device is a DHCP user.

Figure 25:
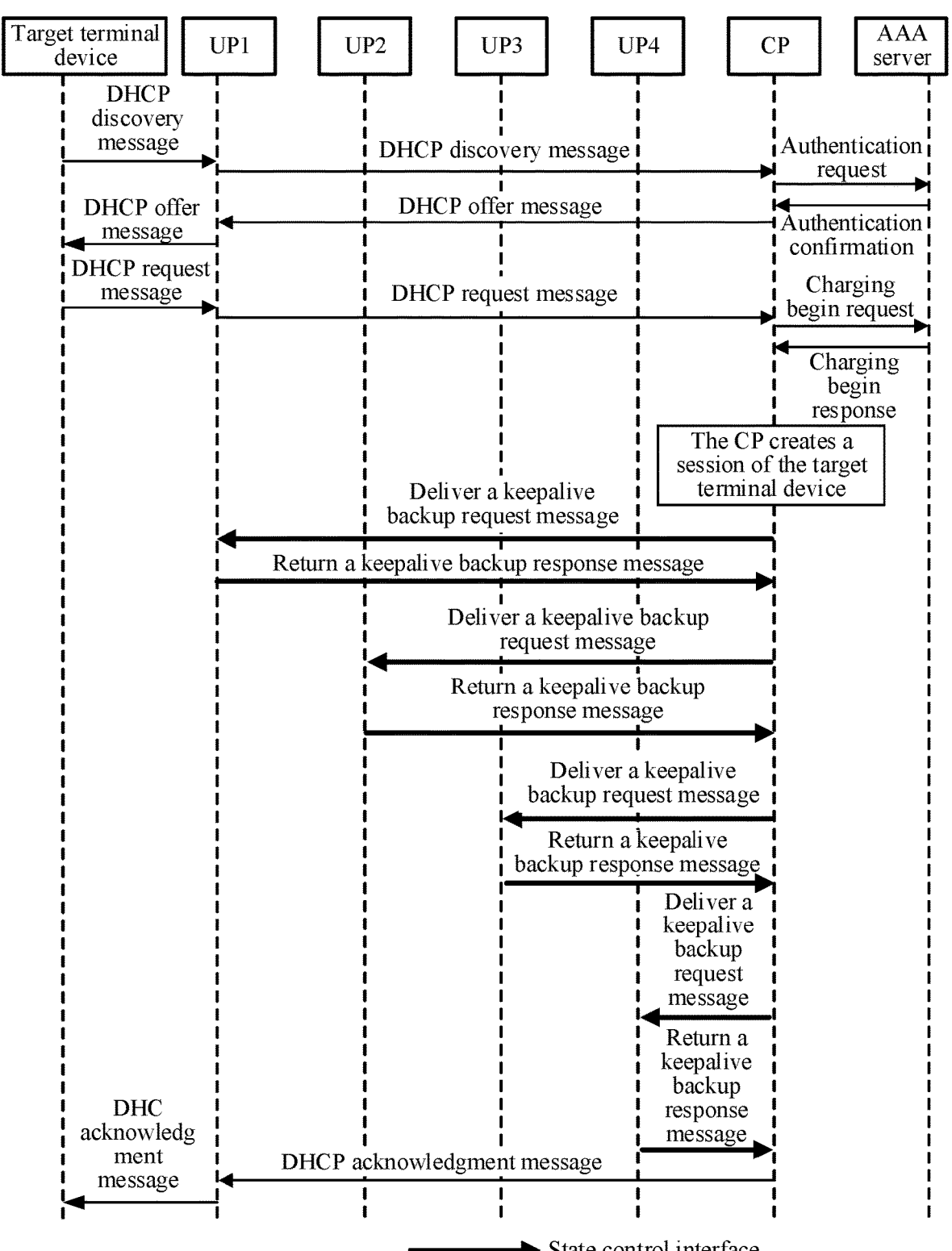
FIG. 25 is a flowchart of a method for responding to a keepalive request packet according to an embodiment of this application.

FIG. 25 illustrates a process of delivering keepalive information by using an example in which a target terminal device is a DHCP user. As shown in FIG. 25, a target terminal device sends a DHCP discover message to a CP based on a default UP (marked as a UP1 in FIG. 25). After receiving the DHCP discover message, the CP sends an authentication request for the target terminal device to an AAA server, so that the AAA server authenticates the target terminal device. After the authentication succeeds, the CP sends a DHCP offer message to the target terminal device by using the UP1. After receiving the DHCP offer message, the target terminal device sends a DHCP request message to the CP by using the UP1. After receiving the DHCP request message, the CP notifies the AAA server to begin charging the target terminal device. The CP sends a DHCP acknowledgment (DHCP ACK) message to the target terminal device by using the UP1. The CP further determines, based on a load sharing policy, a UP (assuming that the UP is the UP1) for forwarding traffic of the target terminal device, and then establishes a session between the CP and the UP1. The session is used to transmit control data of the target terminal device, for example, forwarding control entry information. When receiving the forwarding control entry information, the UP1 advertises a route based on the forwarding control entry information, so that an AN learns the route, to steer the traffic of the target terminal device to the UP1. So far, the target terminal device completes a going-online process. Related content of the forwarding control entry information of the target terminal device delivered by the CP is not shown in FIG. 25.

As shown in FIG. 25, after establishing a session with the UP1, the CP may deliver a keepalive backup request message to the target user plane network element. Because the keepalive backup request message may be a PFCP-based session message, the keepalive backup request message may also be referred to as a PFCP session keepalive backup request. FIG. 25 is described by using an example in which the target user plane network element includes a UP1, a UP2, a UP3, and a UP4. In other words, for the warm backup group shown in FIG. 11, the target user plane network element includes all user plane network elements in the warm backup group. Optionally, it can be learned from the explanation of the target user plane network element in the embodiment shown in FIG. 16 that the target user plane network element in FIG. 25 may not include the UP1, that is, the CP may not send the keepalive backup request message to the UP1.

As shown in FIG. 25, after receiving the keepalive backup request message, the UP1, the UP2, the UP3, and the UP4 each return a keepalive backup response message to the CP. Similarly, because the keepalive backup response message may be a PFCP-based session message, the keepalive backup response message may also be referred to as a PFCP session keepalive backup response.

In addition, as shown in FIG. 25, the keepalive backup request message and the keepalive backup response message may be transmitted through a state control interface between the CP and the UP (transmission shown by a thick line between the CP and the UP in FIG. 25). During a going-online process, the DHCP discovery and request messages are transmitted through a packet redirection interface between the CP and UP (transmission shown by a thin line between the CP and UP in FIG. 25).

In addition, with reference to the process of responding to a keepalive request packet in FIG. 23A and FIG. 23B, it can be learned that, after the target terminal device accesses the UP1, in a process in which the UP1 works normally, if the UP1 receives a keepalive request packet sent by the target terminal device, the UP1 responds to the keepalive request packet based on locally stored forwarding control entry information.

In addition, in a scenario that the keepalive request packet is implemented by using a DHCP (including DHCPv4 and DHCPv6) renewal packet, if the target terminal device needs to perform DHCP renewal, after the target terminal device completes DHCP renewal update, the control plane network element may re-deliver the keepalive information of the target terminal device.

FIG. 26 is a schematic flowchart of notifying a user of beginning migration and ending migration according to an embodiment of this application. As shown in FIG. 26, after receiving a fault reported by a UP1, a CP separately delivers a migration begin request message to three other UPs except the UP1, and separately receives migration begin response messages reported by the three other UPs. After migrating a user on the UP1 to the UP2, the UP3, or the UP4, the CP separately delivers a migration end request message to the other three UPs, and separately receives migration end response messages reported by the other three UPs.

In addition, as shown in FIG. 26, the migration begin request message, the migration begin response message, the migration end request message, and the migration end response message may all be transmitted by using a state control interface between the CP and the UP.

In addition, in FIG. 26, for any one of the UP2, the UP3, or the UP4, if the UP receives a keepalive request packet sent by a target terminal device between receiving the migration begin request message and receiving the migration end request message, the UP1 first determines whether the keepalive request packet can hit locally stored forwarding control entry information, and if the keepalive request packet hits the locally stored forwarding control entry information, responds to the keepalive request packet based on the locally stored forwarding control entry information. If the keepalive request packet does not hit the locally stored forwarding control entry information, the UP1 responds to the keepalive request packet based on keepalive information.

Figure 27:
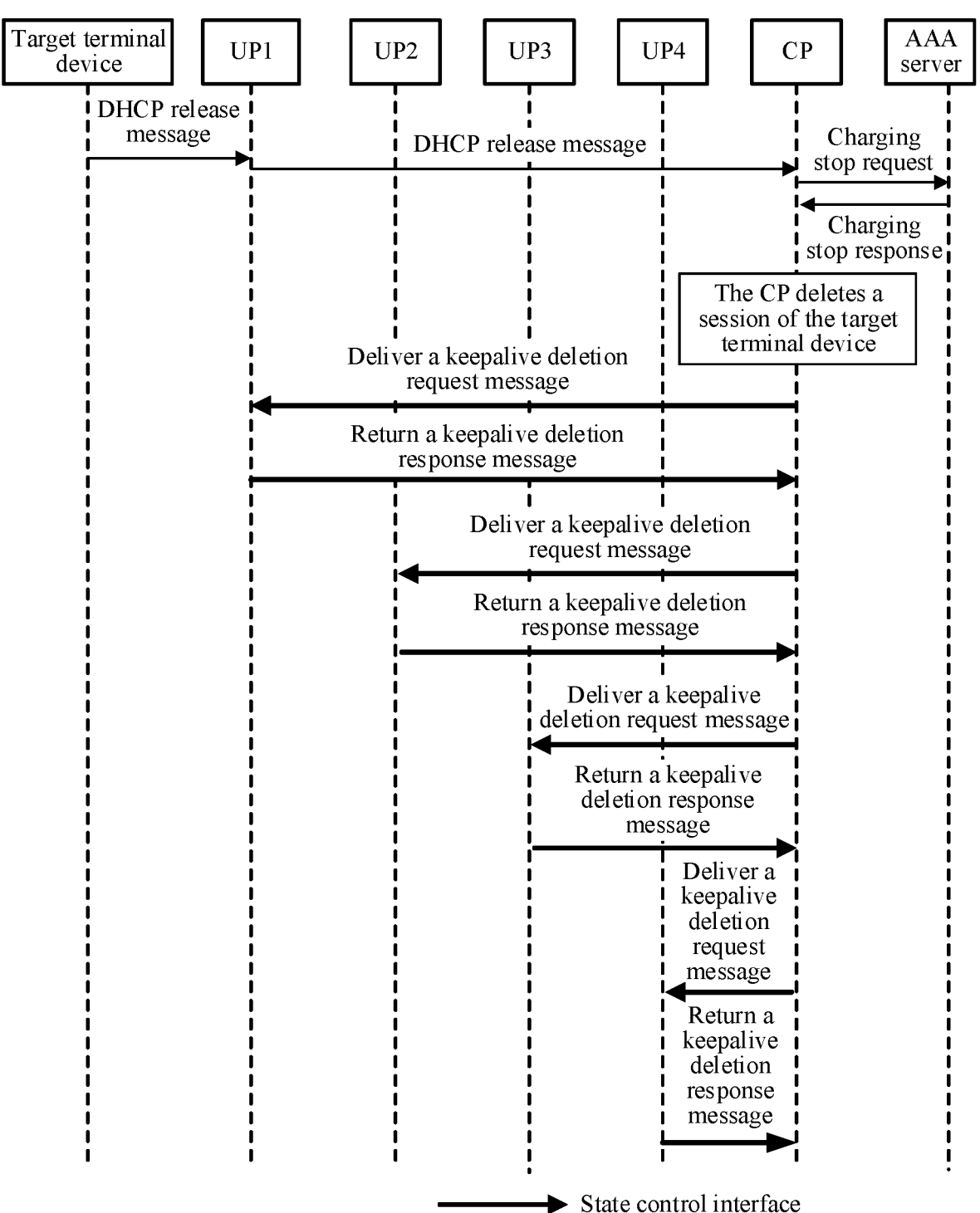
FIG. 27 is a schematic flowchart of deleting keepalive information by using an example in which a target terminal device is a DHCP user.

FIG. 27 illustrates a process of deleting keepalive information by using an example in which a target terminal device is a DHCP user. As shown in FIG. 27, a target terminal device sends a DHCP release message to a CP based on an accessed UP (marked as a UP1 in FIG. 10). After receiving the DHCP release message, the CP performs charging and settlement with an AAA server for the target terminal device. After the charging and settlement are completed, the CP controls the UP1 to delete locally stored session information (for example, forwarding control entry information) related to the target terminal device. So far, the target terminal device completes going offline.

As shown in FIG. 27, after deleting the locally stored session information related to the target terminal device, the CP controls the UP1 to deliver a keepalive deletion request message to a target user plane network element. Because the keepalive deletion request message may be a PFCP-based session message, the keepalive deletion request message may also be referred to as a PFCP session keepalive deletion request. FIG. 27 is described by using an example in which the target user plane network element includes a UP1, a UP2, a UP3, and a UP4.

As shown in FIG. 27, after receiving the keepalive deletion request message, the UP1, the UP2, the UP3, and the UP4 each return a keepalive deletion response message to the CP. Similarly, because the keepalive deletion response message may be a PFCP-based session message, the keepalive deletion response message may also be referred to as a PFCP session keepalive deletion response.

In addition, as shown in FIG. 27, the keepalive deletion request message and the keepalive deletion response message may be transmitted by using a state control interface between the CP and the UP. During a going offline process, the DHCP release message is transmitted through a packet redirection interface between the CP and UP.

In some other embodiments, an embodiment of this application further provides another message receiving method. The method is performed by a broadband network gateway BNG system, and the BNG system includes a first user plane network element, a second user plane network element, and a control plane network element.

In the method, the control plane network element sends keepalive information of a terminal device to the first user plane network element, where the first user plane network element is configured to forward traffic of the terminal device when the second user plane network element is faulty; in response to a communication fault occurring between the terminal device and the second user plane network element, the control plane network element sends a migration begin request message to the first user plane network element; and in response to receiving the migration begin request message, after receiving a first keepalive request packet sent by the terminal device, the first user plane network element sends a first keepalive response packet for the first keepalive request packet to the terminal device based on the keepalive information.

Optionally, the keepalive information includes a terminal identifier, a gateway identifier, and an interface identifier, where the terminal identifier is used to identify the terminal device, the gateway identifier is used to identify the BNG system, and the interface identifier is used to identify an interface that is on the first user plane network element and exchanges traffic with the terminal device.

Optionally, after the first keepalive response packet is sent, the method further includes:

The control plane network element indicates the first user plane network element to update a forwarding control entry information set locally stored by the first user plane network element.

Optionally, an updated forwarding control entry information set includes forwarding control entry information matching a second keepalive request packet sent by the terminal device, and the method further includes:

The control plane network element sends a migration end request message to the first user plane network element;

the first user plane network element receives the second keepalive request packet after receiving the migration end request message; and the first user plane network element sends a second keepalive response packet for the second keepalive request packet to the terminal device based on the forwarding control entry information.

Optionally, an updated forwarding control entry information set does not include forwarding control entry information matching a second keepalive request packet sent by the terminal device, and the method further includes:

The control plane network element sends a migration end request message to the first user plane network element;

the first user plane network element receives the second keepalive request packet after receiving the migration end request message; and the first user plane network element discards the second keepalive request packet.

Optionally, if the first user plane network element and the second user plane network element belong to a same warm backup group, and the warm backup group further includes another user plane network element other than the first user plane network element and the second user plane network element, the method further includes:

The control plane network element sends the keepalive information to the another user plane network element.

For a detailed implementation of the foregoing message receiving method, refer to the embodiments shown in FIG. 16, FIG. 22, and FIG. 25. Details are not described herein again.

The foregoing describes the methods provided in embodiments of this application. The following describes a user plane network element and a control plane network element in embodiments of this application.

The user plane network element and the control plane network element described below each have any function of the user plane network element and the control plane network element in the foregoing method embodiments.

Figure 28:
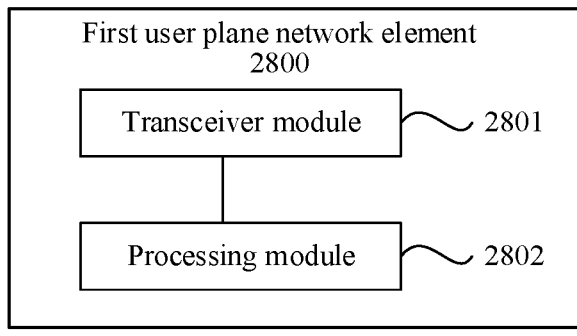
FIG. 28 is a schematic diagram of a structure of a user plane network element according to an embodiment of this application.

FIG. 28 is a schematic diagram of a structure of a user plane network element 2800 according to an embodiment of this application. The user plane network element 2800 is located in the communication system in which a UP and a CP are separated shown in FIG. 10. As shown in FIG. 28, the user plane network element 2800 includes a transceiver module 2801 and a processing module 2802.

The processing module 2802 is configured to obtain keepalive information of a terminal device, where a first user plane network element is configured to forward traffic of the terminal device when a second user plane network element is faulty. For a specific implementation, refer to the embodiments shown in FIG. 12 and FIG. 16.

The transceiver module 2801 is configured to receive a migration begin request message sent by a control plane network element. For a specific implementation, refer to the embodiments shown in FIG. 12 and FIG. 22.

The transceiver module 2801 is further configured to: in response to receiving the migration begin request message, after receiving a first keepalive request packet sent by the terminal device, send a first keepalive response packet for the first keepalive request packet to the terminal device based on the keepalive information. For a specific implementation, refer to the embodiments shown in FIG. 12 and FIG. 25.

Optionally, the transceiver module is configured to: when the first user plane network element does not store forwarding control entry information matching the first keepalive request packet, send the first keepalive response packet to the terminal device based on the keepalive information. Correspondingly, when the first user plane network element stores the forwarding control entry information matching the first keepalive request packet, the transceiver module sends the first keepalive response packet to the terminal device based on the forwarding control entry information.

Optionally, the processing module is further configured to: before the transceiver module sends the first keepalive response packet for the first keepalive request packet to the terminal device based on the keepalive information, determines that the first keepalive request packet successfully matches the keepalive information of the terminal device.

Optionally, the keepalive information includes a terminal identifier, a gateway identifier, and an interface identifier. The terminal identifier is used to identify the terminal device, the gateway identifier is used to identify the BNG system, and the interface identifier is used to identify an interface that is on the first user plane network element and exchanges traffic with the terminal device.

Optionally, if the first user plane network element and the second user plane network element belong to a same warm backup group, the keepalive information further includes an index of the warm backup group.

Optionally, the terminal identifier includes a MAC address of the terminal device, and the gateway identifier includes a MAC address of the BNG system.

Optionally, in a case that the terminal device is a terminal device that sends traffic based on PPPOE, that is, the terminal device is a PPPOE user, the terminal identifier includes a PPPOE session identifier of the terminal device and a MAC address of the terminal device, and the gateway identifier includes a MAC address of the BNG system.

Optionally, in a case that the terminal device is a terminal device that sends traffic based on IPOE, that is, the terminal device is an IPoE user, the terminal identifier includes a MAC address of the terminal device, and the gateway identifier includes a MAC address and an IP address of the BNG system.

Optionally, the keepalive information further includes a local magic number and a client magic number of the terminal device. In this scenario, the first keepalive response packet carries the local magic number.

Optionally, the keepalive information further includes an IP address of the terminal device.

Optionally, the keepalive information further includes a customer VLAN tag and/or a service VLAN tag.

Optionally, when the keepalive information includes the customer VLAN tag, the keepalive information further includes a customer VLAN priority. In this scenario, the first keepalive response packet further carries the customer VLAN priority, to indicate a forwarding device between the first user plane network element and the terminal device to forward the first keepalive response packet based on the customer VLAN priority.

Optionally, when the keepalive information includes the service VLAN tag, the keepalive information further includes a service VLAN priority, and the first keepalive response packet further carries the service VLAN priority. In this scenario, the first keepalive response packet further carries the service VLAN priority, to indicate a forwarding device between the first user plane network element and the terminal device to forward the first keepalive response packet based on the service VLAN priority.

Optionally, the migration begin request message carries a slot identifier, and the slot identifier indicates a slot that is on the first user plane network element and exchanges traffic with the terminal device. The first user plane network element responds to the first keepalive request packet by using the slot indicated by the slot identifier.

Optionally, the transceiver module is further configured to send a migration begin response message to the control plane network element in response to receiving the migration begin request message.

Optionally, the migration begin response message carries a processing result of the first user plane network element for the migration begin request message. The processing result may be that the migration begin request message is successfully received currently, or the migration begin request message is not successfully received currently.

Optionally, both the migration begin request message and the migration begin response message are packet forwarding control protocol PFCP-based node messages.

Optionally, the processing module is further configured to update, based on an indication of the control plane network element, a forwarding control entry information set locally stored by the first user plane network element.

Optionally, in a scenario that the updated forwarding control entry information set includes forwarding control entry information matching a second keepalive request packet sent by the terminal device, the transceiver module is further configured to: receive a migration end request message sent by the control plane network element, receive the second keepalive request packet after receiving the migration end request message, and send a second keepalive response packet for the second keepalive request packet to the terminal device based on the forwarding control entry information.

Correspondingly, in a scenario that the updated forwarding control entry information set does not include the forwarding control entry information matching the second keepalive request packet, the transceiver module is further configured to: receive a migration end request message sent by the control plane network element; after receiving the migration end request message, receive the second keepalive request packet sent by the terminal device; and discard the second keepalive request packet.

Optionally, the transceiver module is further configured to send a migration end response message to the control plane network element in response to receiving the migration end request message.

Optionally, the migration end response message further carries a processing result of the first user plane network element for the migration end request message. The processing result may be that the migration end request message is successfully received currently, or the migration end request message is not successfully received currently.

Optionally, both the migration end request message and the migration end response message are PFCP-based node messages.

Optionally, the transceiver module is configured to receive, by the first user plane network element, a keepalive backup request message sent by the control plane network element, where the keepalive backup request message carries the keepalive information.

Optionally, the transceiver module is further configured to send a keepalive backup response message to the control plane network element in response to receiving the keepalive backup request message.

Optionally, the keepalive backup response message further carries a processing result of the first user plane network element for the keepalive backup request message.

Optionally, both the keepalive backup request message and the keepalive backup response message are packet forwarding control protocol PFCP-based session messages.

Optionally, the keepalive backup request message includes a keepalive information grouped information element, where the keepalive information grouped information element includes a plurality of embedded information elements, and the plurality of embedded information elements carry a plurality of pieces of information in the keepalive information.

Optionally, the transceiver module is further configured to receive a keepalive deletion request message sent by the control plane network element, where the keepalive deletion request message carries identification information of the keepalive information. Correspondingly, the processing module is further configured to delete the keepalive information based on the keepalive deletion request message.

Optionally, the identification information includes the terminal identifier and the interface identifier in the keepalive information of the terminal device.

Optionally, the transceiver module is further configured to send a keepalive deletion response message to the control plane network element in response to receiving the keepalive deletion request message.

Optionally, the keepalive deletion response message further carries a processing result of the first user plane network element for the keepalive deletion request message.

Optionally, both the keepalive deletion request message and the keepalive deletion response message are PFCP-based session messages.

Optionally, the processing module is further configured to determine, based on a quantity of received keepalive request packets sent by the terminal device and an interval duration, whether a communication fault exists between the processing module and the terminal device.

In conclusion, when a communication fault occurs between the terminal device and the second user plane network element, the terminal device is migrated from the second user plane network element to the first user plane network element. In a process in which the terminal device is migrated from the second user plane network element to the first user plane network element, the first user plane network element receives the migration begin request message delivered by the control plane network element. The migration begin request message is used to notify that the terminal device is currently in a migration process. In this scenario, if the terminal device sends the first keepalive request packet to the first user plane network element, even if the first user plane network element has not obtained forwarding control entry information of the terminal device, for example, the first user plane network element has not received the forwarding control entry information of the terminal device delivered by the control plane network element, the first user plane network element can still send the first keepalive response packet based on the keepalive information. Therefore, a case that the terminal device goes offline due to a keepalive detection failure in a migration process of the terminal device is avoided.

Figure 29:
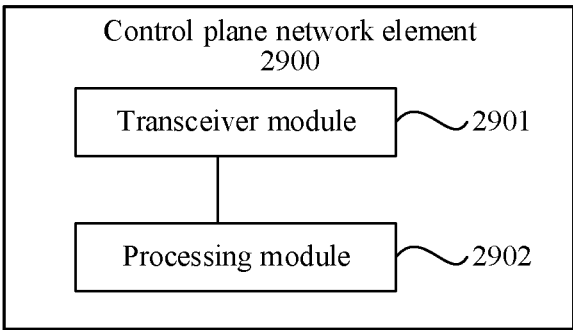
FIG. 29 is a schematic diagram of a structure of a control plane network element according to an embodiment of this application.

FIG. 29 is a schematic diagram of a structure of a control plane network element 2900 according to an embodiment of this application. The control plane network element 2900 is located in the communication system in which a UP and a CP are separated shown in FIG. 10. As shown in FIG. 29, the control plane network element 2900 includes a transceiver module 2901 and a processing module 2902.

The transceiver module 2901 is configured to send keepalive information of a terminal device to a first user plane network element, where the first user plane network element is configured to forward traffic of the terminal device when a second user plane network element is faulty. For a specific implementation, refer to the embodiments shown in FIG. 13 and FIG. 16.

The transceiver module 2901 is further configured to send a migration begin request message to the first user plane network element in response to a communication fault occurring between the terminal device and the second user plane network element, where the migration begin request message indicates the first user plane network element to send a first keepalive response packet to the terminal device based on the keepalive information, and the first keepalive response packet is a response to the first keepalive request packet sent by the terminal device. For a specific implementation, refer to the embodiments shown in FIG. 13, FIG. 22, and FIG. 25.

Optionally, the keepalive information includes a terminal identifier, a gateway identifier, and an interface identifier, where the terminal identifier is used to identify the terminal device, the gateway identifier is used to identify a BNG system, and the interface identifier is used to identify an interface that is on the first user plane network element and exchanges traffic with the terminal device.

Optionally, the transceiver module is further configured to: after sending the migration begin request message to the first user plane network element, send a migration end request message to the first user plane network element, where the migration end request message is used to indicate the first user plane network element to send a second keepalive response packet to the terminal device based on a locally stored forwarding control entry information set, and the second keepalive response packet is a response to the second keepalive request packet sent by the terminal device.

Optionally, the processing module is configured to: before the transceiver module sends the migration end request message to the first user plane network element, indicate the terminal device to update the locally stored forwarding control entry information set.

Optionally, both the migration begin request message and the migration end request message are packet forwarding control protocol PFCP-based node messages.

Optionally, the first user plane network element and the second user plane network element belong to a same warm backup group. In this scenario, the transceiver module is configured to send the keepalive information to another user plane network element other than the first user plane network element in the warm backup group.

Optionally, the transceiver module is configured to send a keepalive backup request message to the first user plane network element, where the keepalive backup request message carries the keepalive information.

Optionally, the transceiver module is configured to send the keepalive information to the first user plane network element after receiving a going-online request of the terminal device.

Optionally, the transceiver module is configured to: when determining that the terminal device goes offline, send a keepalive deletion request message to the first user plane network element, where the keepalive deletion request message carries identification information of the keepalive information.

Optionally, both the keepalive backup request message and the keepalive deletion request message are PFCP-based session messages.

In conclusion, when a communication fault occurs between the terminal device and the second user plane network element, the terminal device is migrated from the second user plane network element to the first user plane network element. In a process in which the terminal device is migrated from the second user plane network element to the first user plane network element, the control plane network element delivers the migration begin request message to the first user plane network element, to notify the first user plane network element that the terminal device is currently in a migration process. In this scenario, if the terminal device sends the first keepalive request packet to the first user plane network element, even if the first user plane network element has not obtained forwarding control entry information of the terminal device, for example, the first user plane network element has not received the forwarding control entry information of the terminal device delivered by the control plane network element, the first user plane network element can still send the first keepalive response packet based on the keepalive information. Therefore, a case that the terminal device goes offline due to a keepalive detection failure in a migration process of the terminal device is avoided.

In some other embodiments, the processing module and the transceiver module in the first user plane network element shown in FIG. 28 further have the following functions.

The processing module is configured to obtain the keepalive information of the terminal device when the second user plane network element works normally, where the first user plane network element is configured to forward traffic of the terminal device when the second user plane network element is faulty. For a specific implementation, refer to the embodiments shown in FIG. 16 and FIG. 25.

The processing module is further configured to store the keepalive information. For a specific implementation, refer to the embodiments shown in FIG. 16 and FIG. 25.

Optionally, the transceiver module is configured to: after receiving the first keepalive request packet sent by the terminal device, send the first keepalive response packet for the first keepalive request packet to the terminal device based on the keepalive information.

Optionally, the BNG system further includes a control plane network element, and the transceiver module is configured to receive the keepalive information sent by the control plane network element.

In conclusion, to enable the first user plane network element to respond to keepalive detection of the terminal device in time when the second user plane network element is faulty, the first user plane network element needs to obtain the keepalive information of the terminal device when the second user plane network element works normally.

In some other embodiments, the processing module and the transceiver module in the control plane network element shown in FIG. 29 further have the following functions.

The transceiver module is configured to send forwarding control entry information to the second user plane network element, where the forwarding control entry information is used by the second user plane network element to generate the first keepalive response packet, and the first keepalive response packet is a response to the first keepalive request packet sent by the terminal device.

The transceiver module is further configured to send the keepalive information of the terminal device to the first user plane network element when the second user plane network element works normally, where the keepalive information is used by the first user plane network element to generate the second keepalive response packet, the second keepalive response packet is a response to the second keepalive request packet sent by the terminal device, and the first user plane network element is configured to forward traffic of the terminal device when the second user plane network element is faulty.

In conclusion, when the terminal device accesses a network, the control plane network element sends the forwarding control entry information to the second user plane network element, so that the second user plane network element forwards the traffic of the terminal device based on the forwarding control entry information, and responds to keepalive detection of the terminal device based on the forwarding control entry information. In addition, to enable the first user plane network element to respond to the keepalive detection of the terminal device in time when the second user plane network element is faulty, the control plane network element needs to deliver the keepalive information of the terminal device to the first user plane network element to which the terminal device is to be migrated when the second user plane network element works normally.

The following describes a hardware structure of a user plane network element or a control plane network element.

Figure 30:
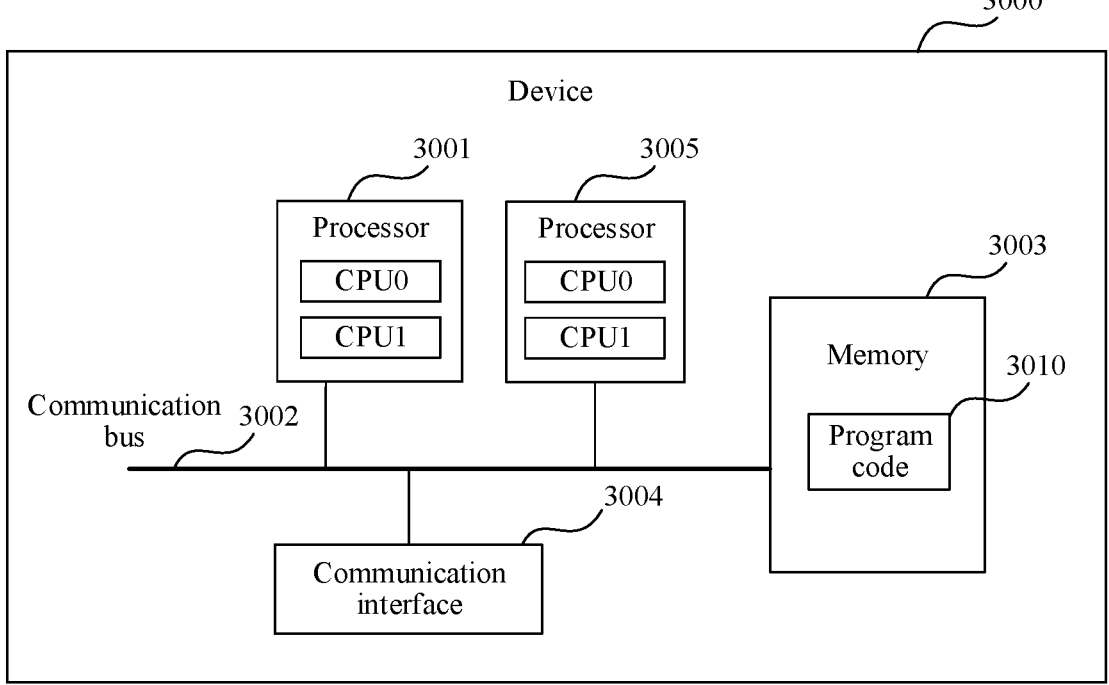
FIG. 30 is a schematic diagram of a structure of a device 3000 according to an embodiment of this application.
Figure 31:
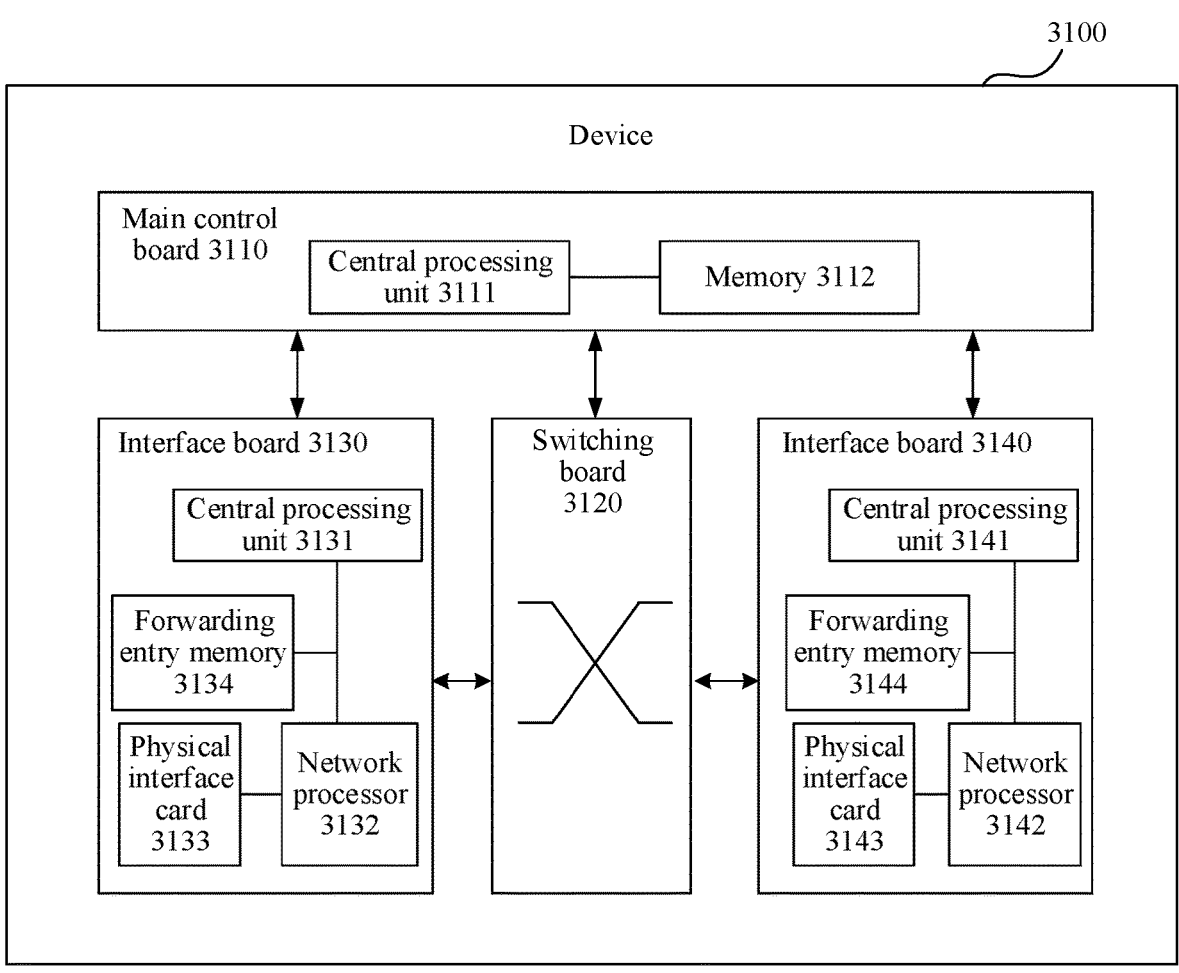
FIG. 31 is a schematic diagram of a structure of another device 3100 according to an embodiment of this application.

FIG. 30 is a schematic diagram of a structure of a device 3000 according to an embodiment of this application. FIG. 31 is a schematic diagram of a structure of another device 3100 according to an embodiment of this application. The following describes structures of the two devices.

It should be noted that the device 3000 or the device 3100 described below corresponds to the user plane network element or the control plane network element in the foregoing method embodiments. The hardware, the modules, and the foregoing other operations and/or functions of the device 3000 or the device 3100 are respectively used to implement various steps and methods implemented by the user plane network element or the control plane network element in the method embodiments. For a detailed procedure of how the device 3000 or the device 3100 processes a packet, refer to the foregoing method embodiments. For brevity, details are not described herein again. The steps in the foregoing method embodiments are implemented by using an integrated logic circuit of hardware in a processor of the device 3000 or the device 3100 or by using instructions in a form of software. The steps of the method disclosed with reference to embodiments of this application may be directly performed by a hardware processor, or may be performed by using a combination of hardware in a processor and a software module. The software module may be located in a mature storage medium in the art, such as a random access memory, a flash memory, a read-only memory, a programmable read-only memory, an electrically erasable programmable memory, or a register. The storage medium is located in a memory. The processor reads information in the memory, and completes the steps of the foregoing methods in combination with hardware of the processor. To avoid repetition, details are not described herein again.

The device 3000 corresponds to the user plane network element 2800 or the control plane network element 2900, and each functional module in the user plane network element 2800 or the control plane network element 2900 is implemented by using software of the device 3000. In other words, the functional modules included in the user plane network element 2800 or the control plane network element 2900 are generated after the processor of the device 3000 reads program code stored in the memory.

The device 3100 corresponds to the user plane network element 2800, and each functional module in the user plane network element 2800 is implemented by using software of the device 3100. In other words, the functional modules included in the user plane network element 2800 are generated after the processor of the device 3100 reads the program code stored in the memory.

Refer to FIG. 30, FIG. 30 is a schematic diagram of a structure of a device 3000 according to an example embodiment of this application. Optionally, the device 3000 is configured as a user plane network element or a control plane network element. In other words, the user plane network element or the control plane network element in the foregoing method embodiments may be optionally implemented by using the device 3000.

The device 3000 is, for example, a network device. For example, the device 3000 is a switch, a router, or the like. Alternatively, the device 3000 is, for example, a computing device. For example, the device 3000 is a host, a server, or a personal computer. The device 3000 may be implemented by using a general bus system structure.

The device 3000 includes at least one processor 3001, a communication bus 3002, a memory 3003, and at least one communication interface 3004.

The processor 3001 is, for example, a general-purpose central processing unit (CPU), a network processor (NP), a graphics processing unit (GPU), a neural-network processing unit (NPU), a data processing unit (DPU), a microprocessor, or one or more integrated circuits configured to implement the solutions of this application. For example, the processor 3001 includes an application-specific integrated circuit (ASIC), a programmable logic device (PLD), or a combination thereof. For example, the PLD is a complex programmable logic device (CPLD), a field programmable logic gate array (field programmable gate array, FPGA), a universal array logic (generic array logic, GAL), or any combination thereof.

The communication bus 3002 is configured to transmit information between the foregoing components. The communication bus 3002 may be classified into an address bus, a data bus, a control bus, and the like. For ease of representation, only one thick line is used to represent the bus in FIG. 30, but this does not mean that there is only one bus or only one type of bus.

For example, the memory 3003 may be a read-only memory (ROM) or another type of static storage device that can store static information and instructions, or may be a random access memory (RAM) or another type of dynamic storage device that can store information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile disc, a Blu-ray disc, or the like), a magnetic disk storage medium or another magnetic storage device, or any other medium that can carry or store expected program code in a form of an instruction or a data structure and can be accessed by a computer. However, the memory is not limited thereto. For example, the memory 3003 exists independently, and is connected to the processor 3001 by using the communication bus 3002. The memory 3003 may alternatively be integrated with the processor 3001.

The communication interface 3004 is configured to communicate with another device or communication network by using any apparatus such as a transceiver. The communication interface 3004 includes a wired communication interface, and may further include a wireless communication interface. The wired communication interface may be, for example, an Ethernet interface. The Ethernet interface may be an optical interface, an electrical interface, or a combination thereof. The wireless communication interface may be a wireless local area network (WLAN) interface, a cellular network communication interface, or a combination thereof.

During specific implementation, in an embodiment, the processor 3001 may include one or more CPUs, for example, a CPU0 and a CPU1 shown in FIG. 30.

During specific implementation, in an embodiment, the device 3000 may include a plurality of processors, for example, a processor 3001 and a processor 3005 shown in FIG. 30. Each of the processors may be a single-core processor (single-CPU) or may be a multi-core processor (multi-CPU). The processor herein may refer to one or more devices, circuits, and/or processing cores configured to process data (for example, a computer program instruction).

During specific implementation, in an embodiment, the device 3000 may further include an output device and an input device. The output device communicates with the processor 3001, and may display information in a plurality of manners. For example, the output device may be a liquid crystal display (LCD), a light emitting diode (LED) display device, a cathode ray tube (CRT) display device, a projector, or the like. The input device communicates with the processor 3001, and may receive an input of a user in a plurality of manners. For example, the input device may be a mouse, a keyboard, a touchscreen device, or a sensing device.

In some embodiments, the memory 3003 is configured to store program code 3010 for executing the solutions of this application, and the processor 3001 may execute the program code 3010 stored in the memory 3003. That is, the device 3000 may implement, by using the processor 3001 and the program code 3010 in the memory 3003, the packet processing method provided in the method embodiment.

The device 3000 in this embodiment of this application may correspond to the user plane network element or the control plane network element in the foregoing method embodiments. In addition, the processor 3001, the communication interface 3004, and the like in the device 3000 may implement functions of the user plane network element or the control plane network element and/or various steps and methods implemented by the user plane network element or the control plane network element in the foregoing method embodiments. For brevity, details are not described herein again.

When the user plane network element is implemented by using the device 3000, in some embodiments, the transceiver module and the processing module in the first user plane network element 2800 shown in FIG. 28 are software modules in the program code 3010 in the device 3000, and the processor 3001 in the device 3000 executes the program code 3010 to implement functions of the transceiver module and the processing module in the first user plane network element 2800 in FIG. 28.

When the control plane network element is implemented by using the device 3000, in some embodiments, the transceiver module and the processing module in the control plane network element 2900 shown in FIG. 29 are software modules in the program code 3010 in the device 3000, and the processor 3001 in the device 3000 executes the program code 3010 to implement functions of the transceiver module and the processing module in the control plane network element 2900 in FIG. 29.

Refer to FIG. 31, FIG. 31 is a schematic diagram of a structure of a device 3100 according to an example embodiment of this application. Optionally, the device 3100 is configured as a user plane network element. In other words, the user plane network element in the foregoing method embodiment may be optionally implemented by using the device 3100.

The device 3100 is, for example, a network device. For example, the device 3100 is a switch, a router, or the like. The device 3100 includes a main control board 3110 and an interface board 3130.

The main control board is also referred to as a main processing unit (MPU) or a route processing. The main control board 3110 is configured to control and manage each component in the device 3100, including functions of route calculation, device management, device maintenance, and protocol processing. The main control board 3110 includes a central processing unit 3111 and a memory 3112.

The interface board 3130 is also referred to as a line interface unit (line processing unit, LPU) card, a line card, or a service board. The interface board 3130 is configured to provide various service interfaces and forward data packets. The service interface includes but is not limited to an Ethernet interface, a POS (Packet over SONET/SDH) interface, and the like. The Ethernet interface is, for example, a flexible Ethernet service interface (Flexible Ethernet Clients, FlexE Clients). The interface board 3130 includes a central processing unit 3131, a network processor 3132, a forwarding entry memory 3134, and a physical interface card (PIC) 3133.

The central processing unit 3131 on the interface board 3130 is configured to control and manage the interface board 3130 and communicate with the central processing unit 3111 on the main control board 3110.

The network processor 3132 is configured to implement packet forwarding processing. A form of the network processor 3132 may be a forwarding chip. Specifically, the network processor 3132 is configured to forward a received packet based on a forwarding table stored in the forwarding entry memory 3134, and if a destination address of the packet is an address of the device 3100, send the packet to a CPU (for example, the central processing unit 3111) for processing; and if the destination address of the packet is not the address of the device 3100, find a next hop and an outbound interface corresponding to the destination address in the forwarding table based on the destination address, and forward the packet to the outbound interface corresponding to the destination address. Processing of an uplink packet includes: processing of a packet ingress interface and forwarding table lookup; and processing of a downlink packet includes forwarding table lookup.

The physical interface card 3133 is configured to implement a physical layer interconnection function. Original traffic enters the interface card 3130 from the physical interface card, and a processed packet is sent out from the physical interface card 3133. The physical interface card 3133 is also referred to as a sub-card, and may be installed on the interface board 3130, and is responsible for converting an optical/electrical signal into a packet, performing a validity check on the packet, and then forwarding the packet to the network processor 3132 for processing. In some embodiments, the central processing unit may also perform a function of the network processor 3132, for example, implement software forwarding based on a general-purpose CPU, so that the physical interface card 3133 does not need the network processor 3132.

Optionally, the device 3100 includes a plurality of interface boards. For example, the device 3100 further includes an interface board 3140. The interface board 3140 includes a central processing unit 3141, a network processor 3142, a forwarding entry memory 3144, and a physical interface card 3143.

Optionally, the device 3100 further includes a switching board 3120. The switching board 3120 may also be referred to as a switch fabric unit (SFU). When the network device includes a plurality of interface boards 3130, the switching board 3120 is configured to complete data exchange between the interface boards. For example, the interface board 3130 and the interface board 3140 may communicate with each other by using the switching board 3120.

The main control board 3110 is coupled to the interface board 3130. For example, the main control board 3110, the interface board 3130, the interface board 3140, and the switching board 3120 are connected to a system backplane by using a system bus to implement interworking. In a possible implementation, an inter-process communication (IPC) protocol channel is established between the main control board 3110 and the interface board 3130, and the main control board 3110 and the interface board 3130 communicate with each other by using the IPC channel.

Logically, the device 3100 includes a control plane and a forwarding plane, the control plane includes the main control board 3110 and the central processing unit 3131, and the forwarding plane includes components for performing forwarding, such as the forwarding entry memory 3134, the physical interface card 3133, and the network processor 3132. The control plane performs functions such as a router, forwarding table generation, signaling and protocol packet processing, and device state configuration and maintenance. The control plane delivers a generated forwarding table to the forwarding plane. On the forwarding plane, the network processor 3132 looks up the table and forward a packet received by the physical interface card 3133 based on the forwarding table delivered by the control plane. The forwarding table delivered by the control plane may be stored in the forwarding entry memory 3134. In some embodiments, the control plane and the forwarding plane may be completely separated, and are not on a same device.

The following briefly describes the foregoing method embodiments with reference to the device 3100.

The user plane network element receives a packet by using the physical interface card 3133, determines that a destination IP address of the packet is an address of the device 3100, and sends the packet to the central processing unit 3131 for processing. The central processing unit 3131 accesses the forwarding entry memory 3134 to obtain first-type user information stored in the forwarding entry memory 3134. The central processing unit 3131 matches first information included in the packet with the first-type user information. The central processing unit 3131 determines that the first information and the first-type user information meet a first matching condition, and the physical interface card 3133 sends the packet to the control plane network element.

When the user plane network element (UPF) is implemented by using the device 3100, in some embodiments, the transceiver module in the user plane network element 2800 shown in FIG. 28 is equivalent to the physical interface card 3133 in the device 3100, and the processing module in the user plane network element 2800 is equivalent to the network processor 3132, the central processing unit 3131, or the central processing unit 3111.

It should be understood that an operation on the interface board 3140 is consistent with an operation on the interface board 3130 in this embodiment of this application. For brevity, details are not described again. It should be understood that the device 3100 in this embodiment may correspond to the user plane network element in the foregoing method embodiments, and the main control board 3110, the interface board 3130, and/or the interface board 3140 in the device 3100 may implement functions of the user plane network element and/or various steps implemented by the user plane network element in the foregoing method embodiments. For brevity, details are not described herein again.

It should be noted that, there may be one main control board or a plurality of main control boards, and when there are a plurality of main control boards, the main control boards may include an active main control board and a standby main control board. There may be one or more interface boards, and a network device having a stronger data processing capability provides more interface boards. There may also be one or more physical interface cards on the interface board. There may be no, one, or more switching boards. If there are a plurality of switching boards, load balancing and redundancy backup can be implemented. In a centralized forwarding architecture, the network device may not need the switching board, and the interface board provides a function of processing service data of an entire system. In a distributed forwarding architecture, the network device may have at least one switching board, and data exchange between a plurality of interface boards is implemented by using the switching board, to provide a large-capacity data exchange and processing capability. Therefore, data access and a processing capability of a network device in the distributed architecture is better than those of a device in the centralized architecture. Optionally, the network device may have only one card. That is, there is no switching board, and functions of the interface board and the main control board are integrated on the card. In this case, the central processing unit on the interface board and the central processing unit on the main control board may be combined into one central processing unit on the card, to perform functions obtained after the two central processing units are combined. A device in this form (for example, a network device such as a low-end switch or router) has a weak data exchange and processing capability. A specific architecture that is to be used depends on a specific networking deployment scenario. This is not limited herein.

Figure 32:
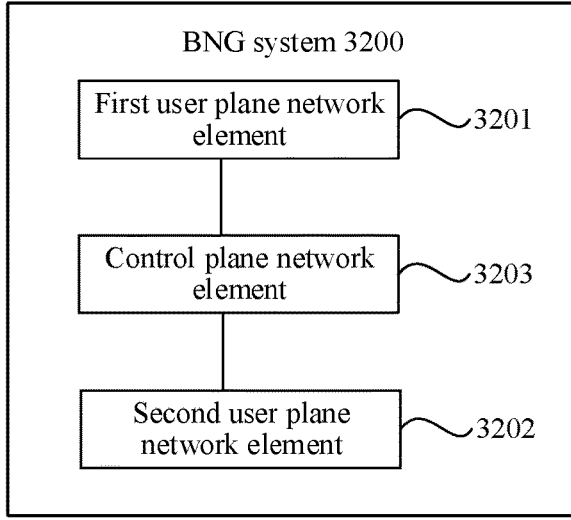
FIG. 32 is a schematic diagram of a structure of a BNG system according to an embodiment of this application.

In some other embodiments, an embodiment of this application further provides a BNG system. As shown in FIG. 32, the BNG system 3200 includes a first user plane network element 3201, a second user plane network element 3202, and a control plane network element 3203.

The control plane network element 3203 is configured to: send keepalive information of a terminal device to the first user plane network element, where the first user plane network element is configured to forward traffic of the terminal device when the second user plane network element is faulty; and send a migration begin request message to the first user plane network element in response to a communication fault occurring between the terminal device and the second user plane network element.

The first user plane network element 3201 is configured to: in response to receiving the migration begin request message, after receiving a first keepalive request packet sent by the terminal device, send a keepalive response packet for the first keepalive request packet to the terminal device based on the keepalive information.

For detailed functions of the network elements in the foregoing BNG system, refer to the embodiments shown in FIG. 16, FIG. 22, FIG. 25, and FIG. 26, and details are not described herein again.

A person of ordinary skill in the art may be aware that, in combination with the method steps and modules described in embodiments disclosed in this specification, the functions may be implemented by electronic hardware, computer software, or a combination thereof. To clearly describe the interchangeability between hardware and software, the foregoing has generally described steps and compositions of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It can be clearly understood by a person skilled in the art that, for the purpose of convenient and brief description, as for a specific working process of the foregoing system, device, and module, refer to the corresponding process in the foregoing method embodiments, and the details are not described herein again.

In the several embodiments provided in this application, it should be understood that the disclosed system, device, and method may be implemented in other manners. For example, the device embodiment described above is merely an example. For example, the division of modules is merely logical function division and there may be other division manners during actual application. For example, a plurality of modules or components may be combined or may be integrated to another system, or some features may be ignored or not performed. In addition, the displayed or discussed mutual couplings or direct couplings or communication connections may be implemented through some interfaces, and the indirect couplings or communication connections between devices or modules may be implemented in electronic, mechanical, or other forms.

The modules described as separate parts may or may not be physically separate, and parts displayed as modules may or may not be physical modules, that is, may be located in one position, or may be distributed on a plurality of network modules. Some or all of the modules may be selected based on an actual requirement to achieve the objectives of the solutions of embodiments of this application.

In addition, the functional modules in embodiments of this application may be integrated into one processing module, or each of the modules may exist alone physically, or two or more modules may be integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

In this application, the terms such as "first" and "second" are used to distinguish between same items or similar items that have basically the same effects and functions. It should be understood that "first" and "second" do not have a logical or time sequence dependency relationship, and do not limit a quantity and an execution sequence. It should also be understood that although the following description uses the terms such as first and second to describe various elements, these elements should not be limited by the terms. These terms are merely used to distinguish one element from another element. For example, without departing from the scope of the various examples, first information may be referred to as second information, and similarly, the second information may be referred to as the first information. Both the first information and the second information may be information, and in some cases, may be independent and different information.

In this application, the term "at least one" means one or more, and the term "a plurality of" means two or more. The terms "system" and "network" are often interchangeable in this specification.

It should be further understood that the term "if" may be interpreted as "when" ("when" or "upon"), "in response to determining", or "in response to detecting". Similarly, according to the context, the phrase "if it is determined that" or "if it (a stated condition or event) is detected" may be interpreted as a meaning of "when it is determined that" or "in response to determining" or "when it (the stated condition or event) is detected" or "in response to detecting (the stated condition or event)".

The foregoing descriptions are merely specific implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

All or some of the foregoing embodiments may be implemented by software, hardware, firmware, or any combination thereof. When software is used to implement the embodiments, all or some of the embodiments may be implemented in a form of a computer program product. The computer program product includes one or more computer program instructions. When the computer program instructions are loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer program instructions may be transmitted from one website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), or a semiconductor medium (for example, a solid-state drive).

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

The foregoing descriptions are merely optional embodiments of this application, but are not intended to limit this application. Any modification, equivalent replacement, or improvement made within the spirit and principle of this application should fall within the protection scope of this application.

What is claimed is:

1. A network device configured to be applied to a first user plane network element comprised in a broadband network gateway (BNG) system, the network device comprising:

one or more processors; and one or more memories coupled to the one or more processors with instructions stored thereon, wherein the instructions, when executed by the one or more processors, enable the network device to:

obtain keepalive information of a terminal device, wherein the first user plane network element is configured to forward traffic of the terminal device when a second user plane network element in the BNG system is faulty, receive a migration begin request message sent by a control plane network element in the BNG system, in response to both receiving the migration begin request message and receiving a first keepalive request packet sent by the terminal device, send a first keepalive response packet corresponding to the first keepalive request packet to the terminal device based on the keepalive information.

2. The network device according to claim 1, wherein the instructions, when executed by the one or more processors, further enable the network device to:

in response to the first user plane network element not storing forwarding control entry information matching the first keepalive request packet, send the first keepalive response packet to the terminal device based on the keepalive information.

3. The network device according to claim 1, wherein:
the keepalive information comprises a terminal identifier, a gateway identifier, and an interface identifier;
the terminal identifier is used to identify the terminal device; the gateway identifier is used to identify the BNG system;
and the interface identifier is used to identify an interface that is on the first user plane network element and exchanges traffic with the terminal device.

4. The network device according to claim 3, wherein, in response to the first user plane network element and the second user plane network element belonging to a same warm backup group, the keepalive information further comprises an index of the warm backup group.

5. The network device according to claim 3, wherein:
the terminal identifier comprises a point-to-point protocol over Ethernet (PPPoE) session identifier of the terminal device and a media access control MAC address of the terminal device; and
the gateway identifier comprises a MAC address of the BNG system.

6. The network device according to claim 3, wherein:
the terminal identifier comprises a MAC address of the terminal device; and
the gateway identifier comprises a MAC address and an Internet protocol IP address of the BNG system.

7. The network device according to claim 4, wherein:
the keepalive information further comprises a local magic number and a client magic number of the terminal device; and
the first keepalive response packet carries the local magic number.

8. The network device according to claim 4, wherein the keepalive information further comprises an IP address of the terminal device.

9. The network device according to claim 4, wherein the keepalive information further comprises a customer virtual local area network (VLAN) tag and/or a service VLAN tag.

10. The network device according to claim 9, wherein, in response to the keepalive information comprising the customer VLAN tag:
the keepalive information further comprises a customer VLAN priority; and the first keepalive response packet further carries the customer VLAN priority.

11. The network device according to claim 9, wherein, in response to the keepalive information comprising the service VLAN tag:
the keepalive information further comprises a service VLAN priority; and
the first keepalive response packet further carries the service VLAN priority.

12. The network device according to claim 1, wherein:
the migration begin request message carries a slot identifier; and
the slot identifier indicates a slot that is on the first user plane network element and exchanges traffic with the terminal device.

13. A network device, configured to be applied to a control plane network element comprised in a broadband network gateway (BNG) system, the network device comprising:
one or more processors; and
one or more memories coupled to the one or more processors with instructions stored thereon, wherein the instructions, when executed by the one or more processors, enable the network device to:
send keepalive information of a terminal device to a first user plane network element in the BNG system, wherein the first user plane network element is configured to forward traffic of the terminal device when a second user plane network element in the BNG system is faulty; and
send a migration begin request message to the first user plane network element in response to a communication fault occurring between the terminal device and the second user plane network element, wherein the migration begin request message indicates the first user plane network element to send a first keepalive response packet to the terminal device based on the keepalive information, and the first keepalive response packet is a response to and corresponds to a first keepalive request packet sent by the terminal device.

14. The network device according to claim 13, wherein:
the keepalive information comprises a terminal identifier, a gateway identifier, and an interface identifier;
the terminal identifier is used to identify the terminal device;
the gateway identifier is used to identify the BNG system; and
the interface identifier is used to identify an interface that is on the first user plane network element and exchanges traffic with the terminal device.

15. The network device according to claim 13, wherein the instructions, when executed by the one or more processors, further enable the network device to:
send a migration end request message to the first user plane network element, wherein the migration end request message indicates the first user plane network element to send a second keepalive response packet to the terminal device based on a locally stored forwarding control entry information set, and the second keepalive response packet is a response to a second keepalive request packet sent by the terminal device.

16. The network device according to claim 15, wherein the instructions, when executed by the one or more processors, further enable the network device to:
indicate the terminal device to update the locally stored forwarding control entry information set.

17. The network device according to claim 15, wherein both the migration begin request message and the migration end request message are packet forwarding control protocol (PFCP)-based node messages.

18. The network device according to claim 13, wherein the instructions, when executed by the one or more processors, further enable the network device to:

send the keepalive information to a user plane network element other than the first user plane network element in a warm backup group.

19. The network device according to claim 13, wherein the instructions, when executed by the one or more processors, further enable the network device to:

send a keepalive backup request message to the first user plane network element, wherein the keepalive backup request message carries the keepalive information.

20. A method performed by a broadband network gateway (BNG) system comprising a first user plane network element, a second user plane network element, and a control plane network element, the method comprising:

sending, by the control plane network element, keepalive information of a terminal device to the first user plane network element, wherein the first user plane network element is configured to forward traffic of the terminal device when the second user plane network element is faulty;

sending, by the control plane network element, a migration begin request message to the first user plane network element in response to a communication failure occurring between the terminal device and the second user plane network element; and in response to both receiving the migration begin request message and receiving a first keepalive request packet sent by the terminal device, sending, by the first user plane network element, a first keepalive response packet corresponding to the first keepalive request packet to the terminal device based on the keepalive information.

* * * * *